United States Patent [19]
Herbst et al.

[11] 3,983,535
[45] Sept. 28, 1976

[54] SIGNATURE VERIFICATION METHOD AND APPARATUS

[75] Inventors: Noel M. Herbst, Mount Kisco; John H. Morrissey, Chappaqua, both of N.Y.

[73] Assignee: International Business Machines Corporation, Armonk, N.Y.

[22] Filed: Mar. 4, 1975

[21] Appl. No.: 555,216

[52] U.S. Cl. .................... 340/146.3 SY; 235/181; 340/146.3 Q
[51] Int. Cl.² ........................................... G06K 9/10
[58] Field of Search .......... 340/146.3 SY, 146.3 SG, 340/146.3 AQ, ; 235/181

[56] References Cited
UNITED STATES PATENTS

| | | | |
|---|---|---|---|
| 3,579,186 | 5/1971 | Johnson et al. | 340/146.3 SY |
| 3,618,019 | 11/1971 | Nemirovsky et al. | 340/146.3 SY |
| 3,699,517 | 10/1972 | Dyche | 340/146.3 SY |

Primary Examiner—Leo H. Boudreau
Attorney, Agent, or Firm—Roy R. Schlemmer

[57] ABSTRACT

Method and apparatus are disclosed for verifying a sample signature based on comparison of the dynamics of a reference and a sample signature. More particularly, second derivative values of pen displacements (i.e. acceleration) are periodically sampled for both a reference and sample signature and a comparison of these second derivative values is made. According to the disclosed verification method, the two lists of second derivative values are segmented and similar segments are individually compared and also correlated utilizing shifting of the segments during successive comparisons to find regions of high correlation. A running account of cross correlation values between successive segments of the two signatures are kept. Finally, the maximums of the cross correlation values obtained for each segment comparison are combined and this maximum correlation value is utilized as a verification indicator.

30 Claims, 56 Drawing Figures

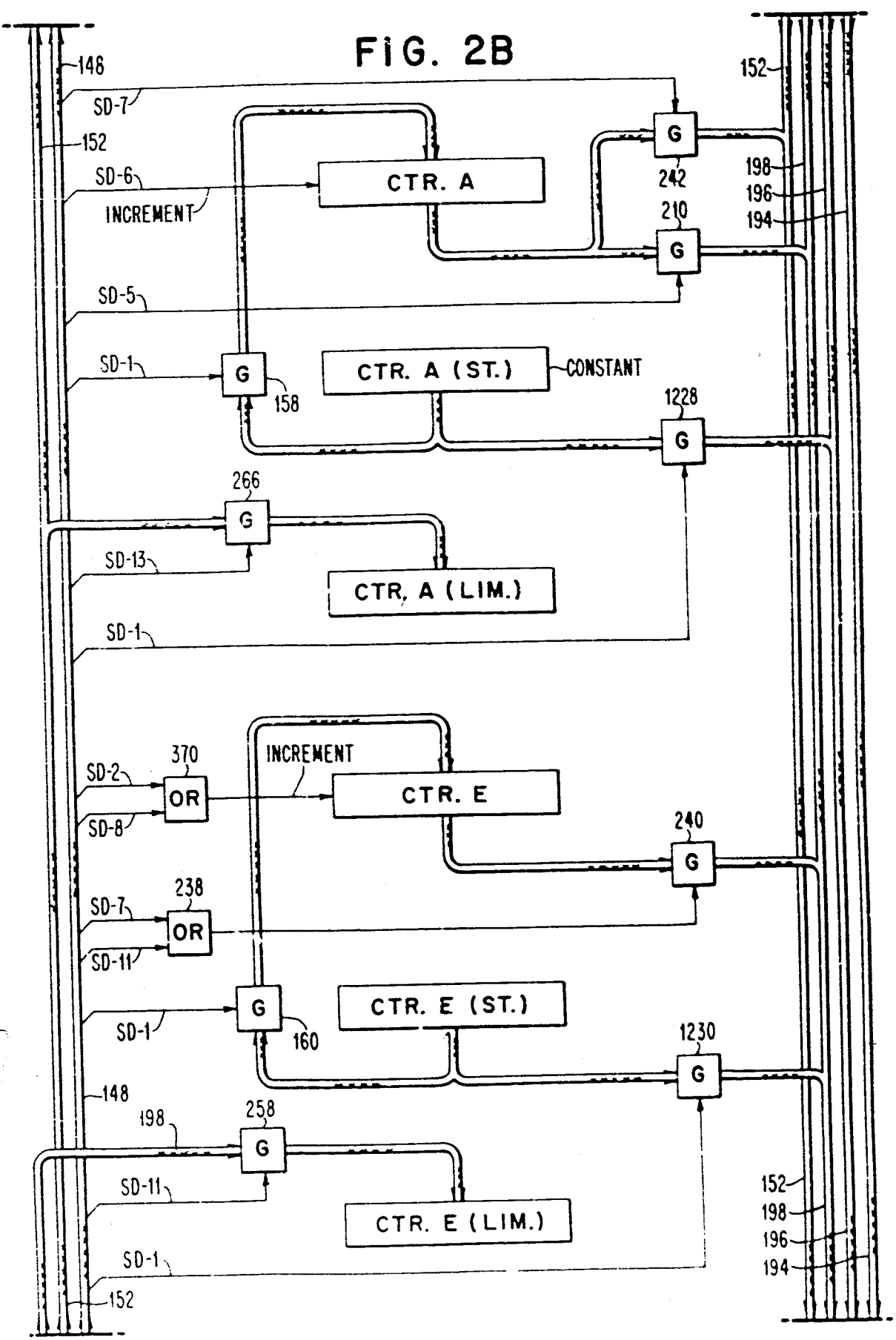

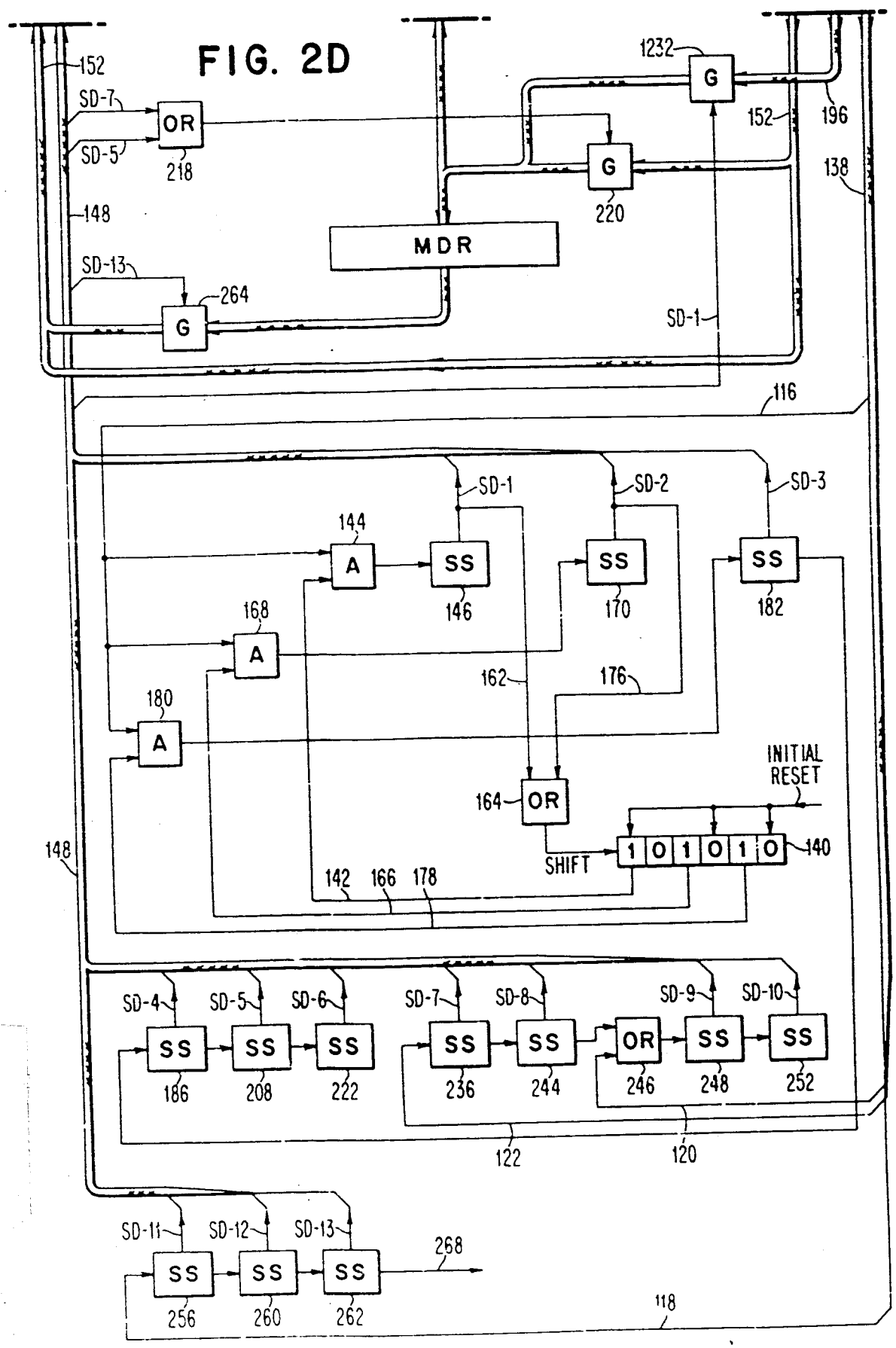

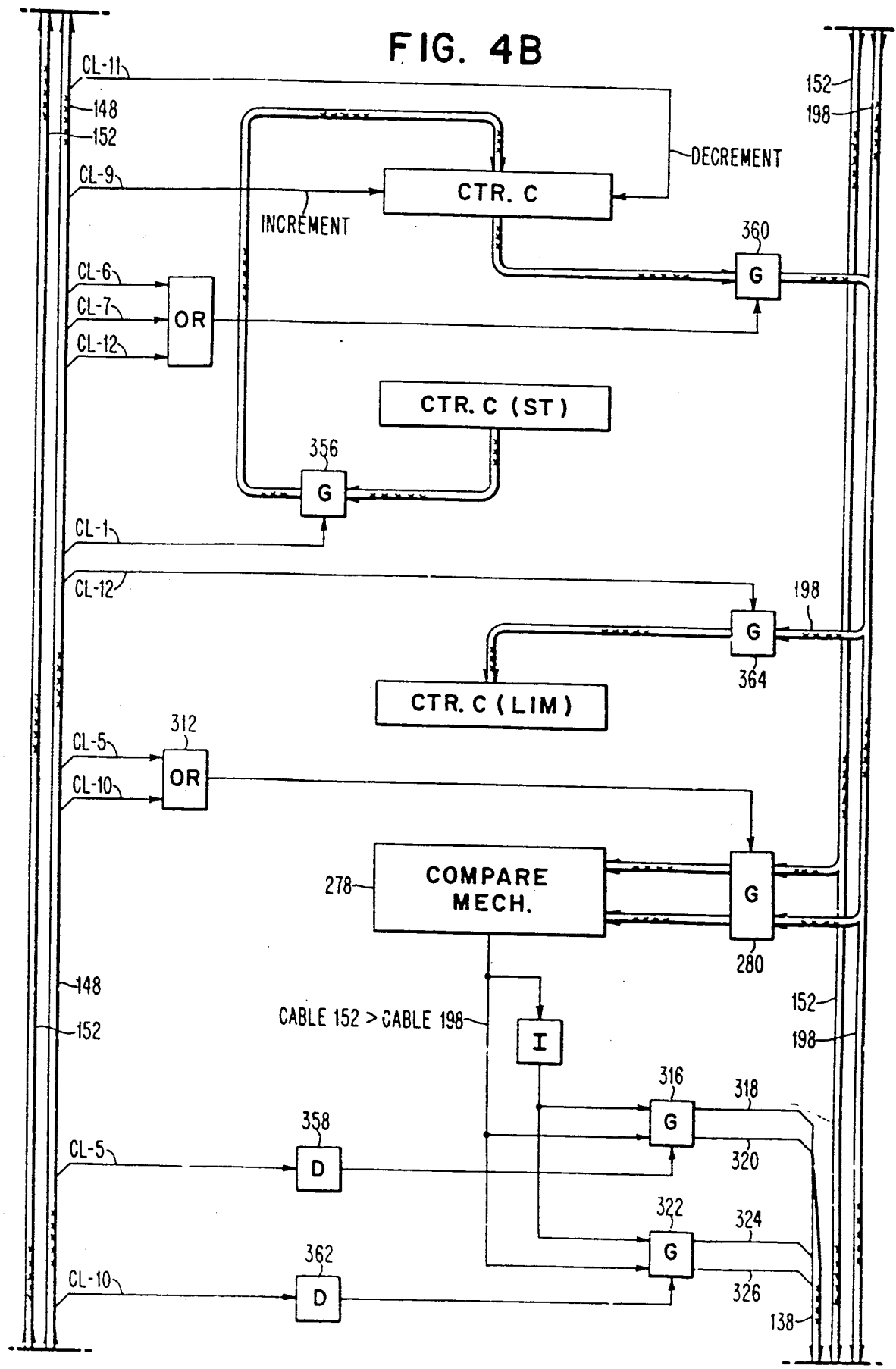

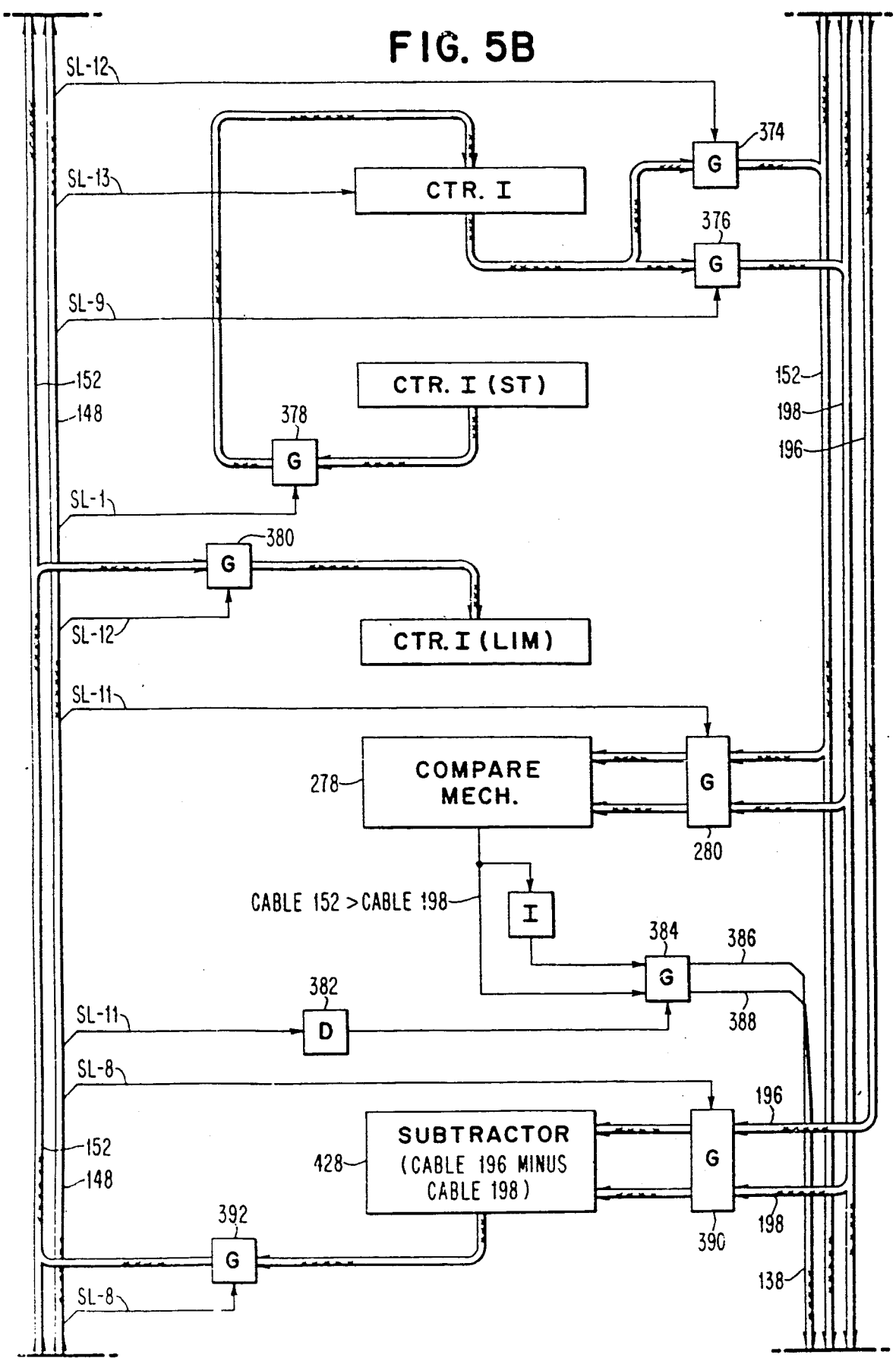

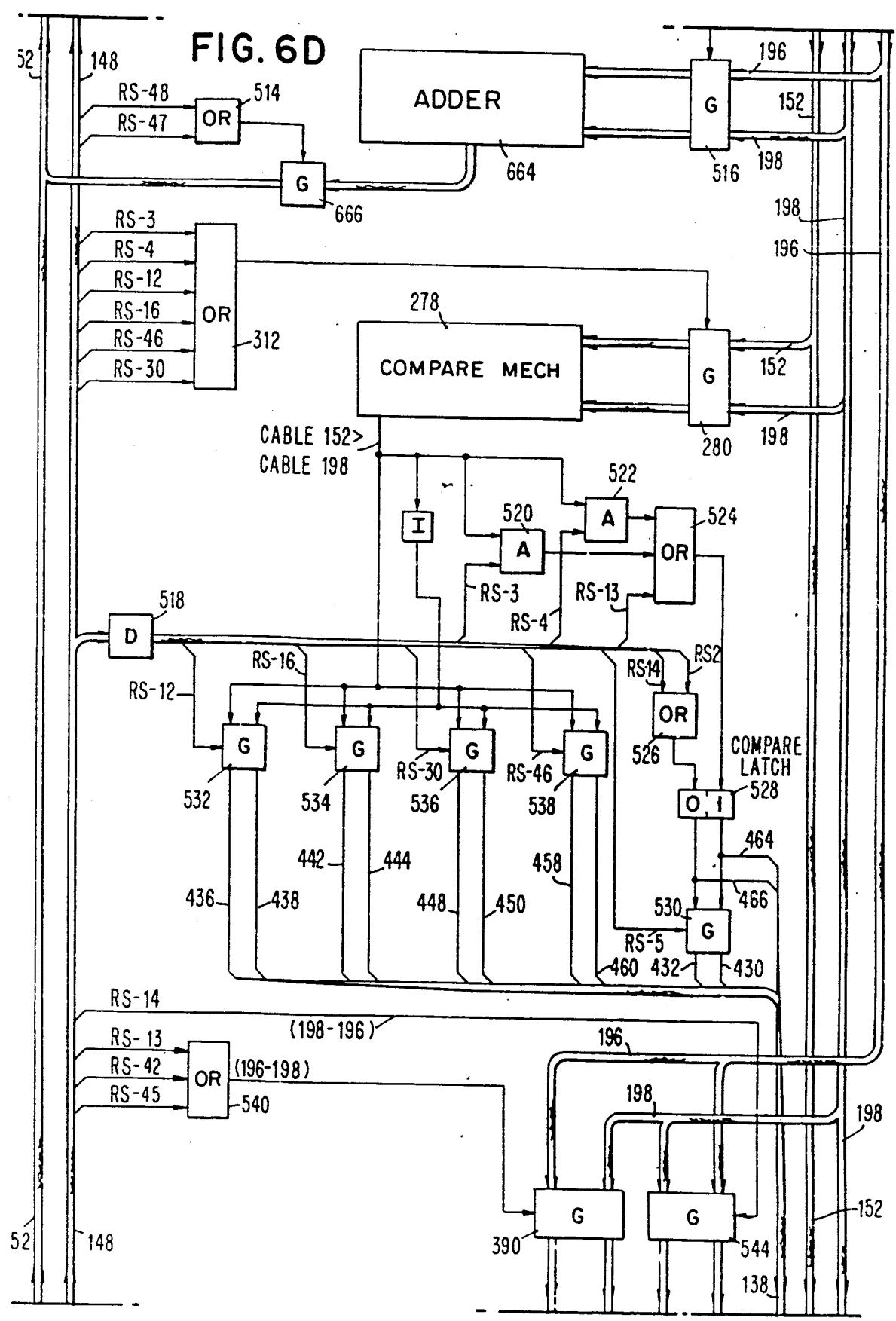

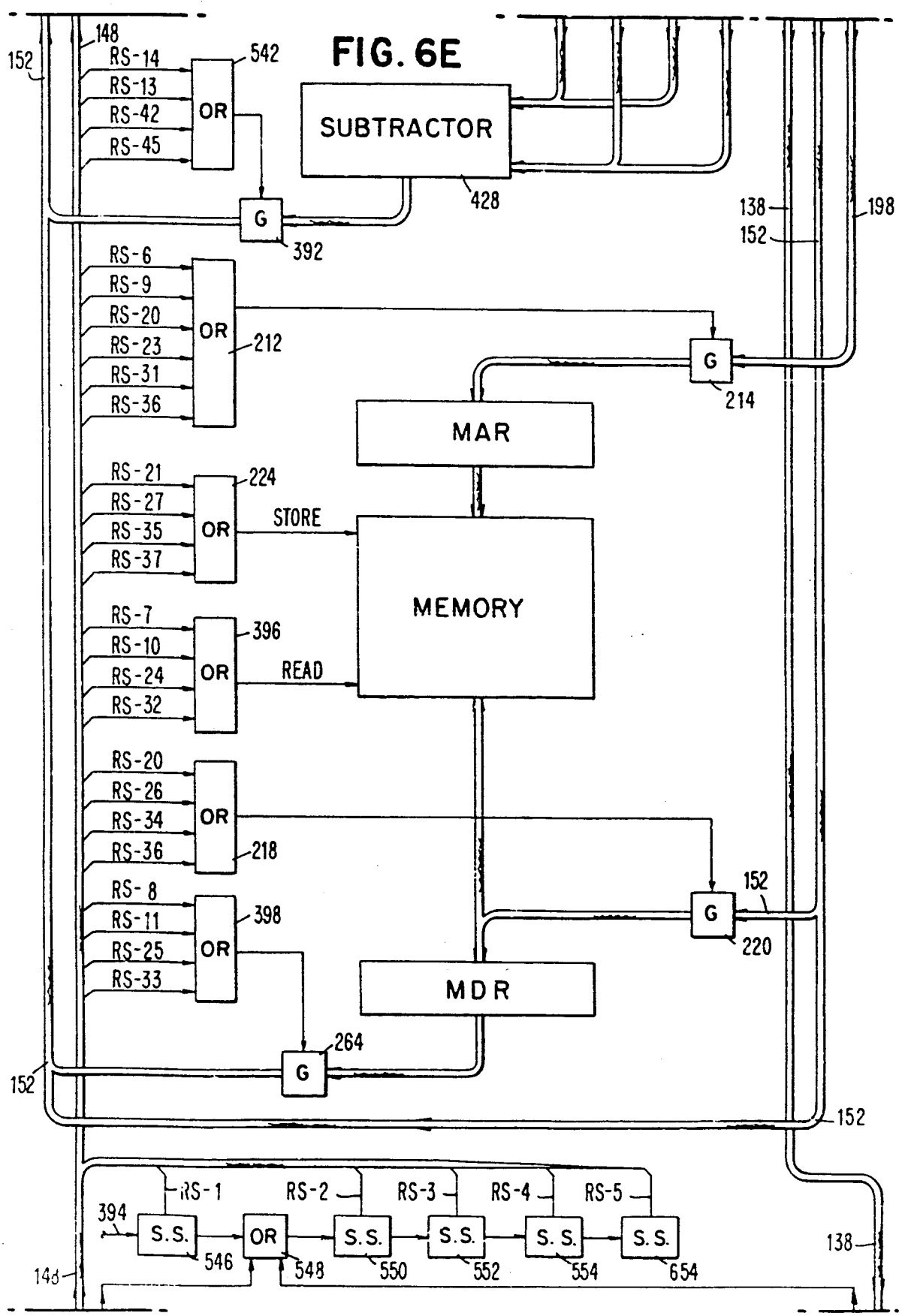

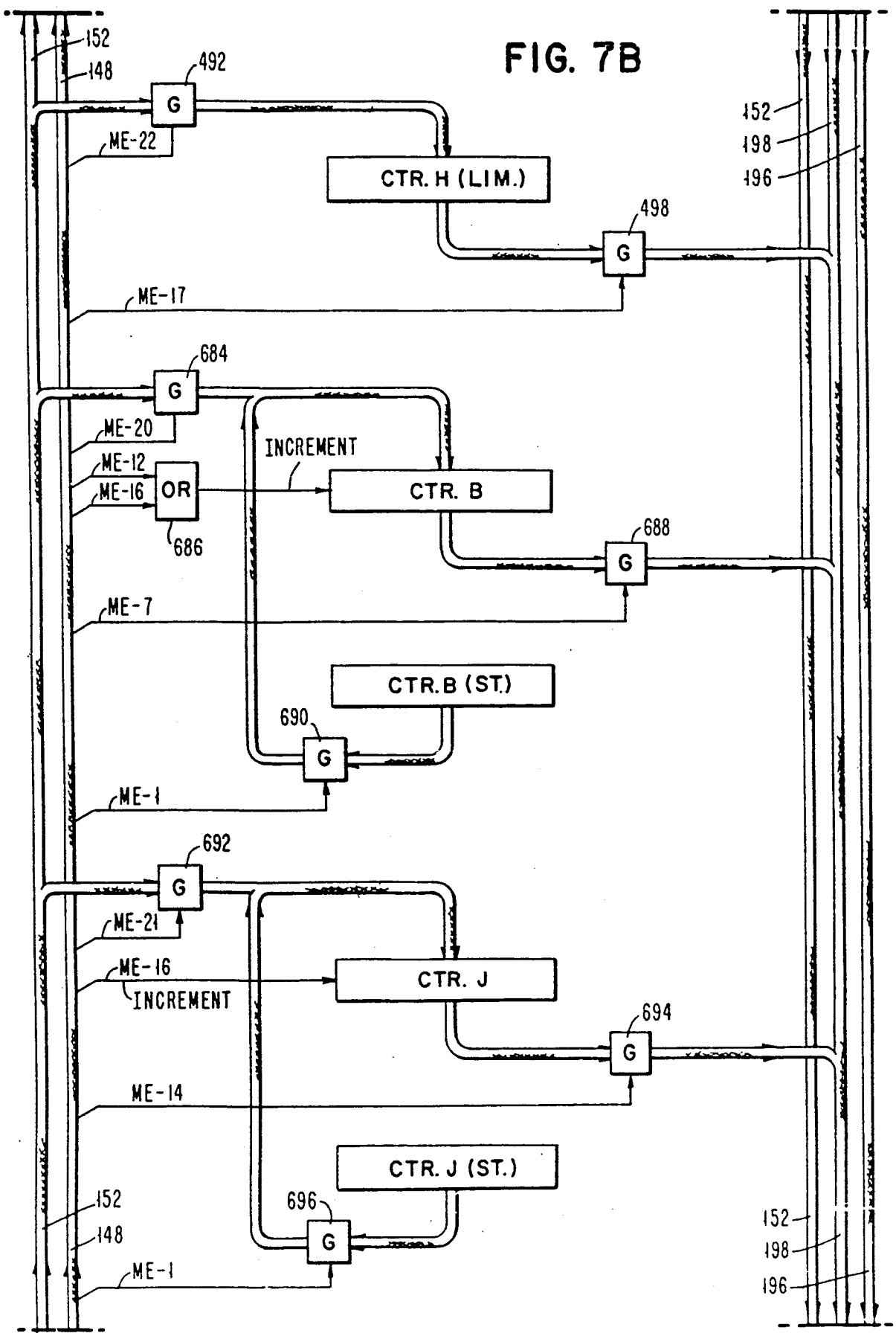

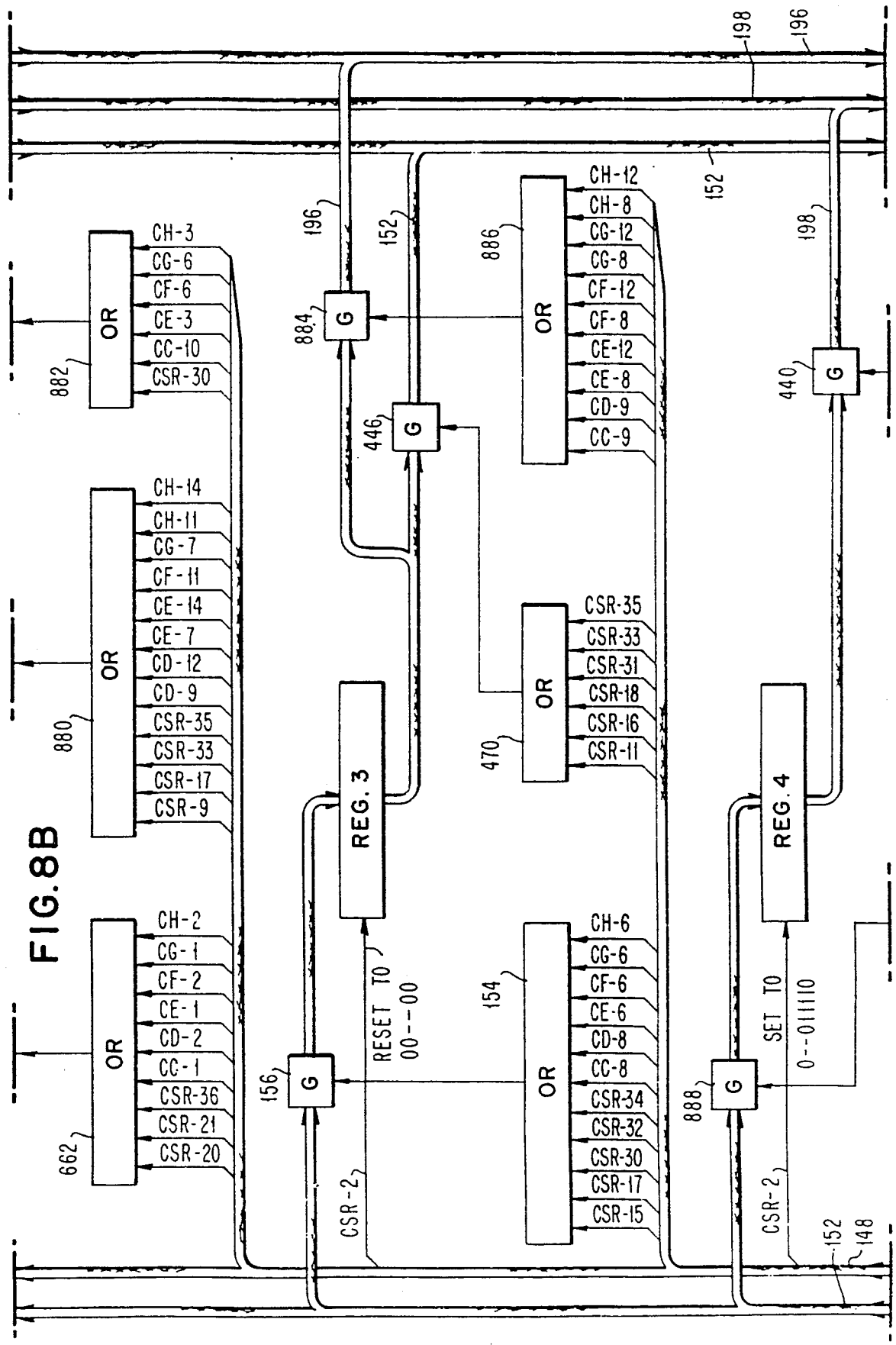

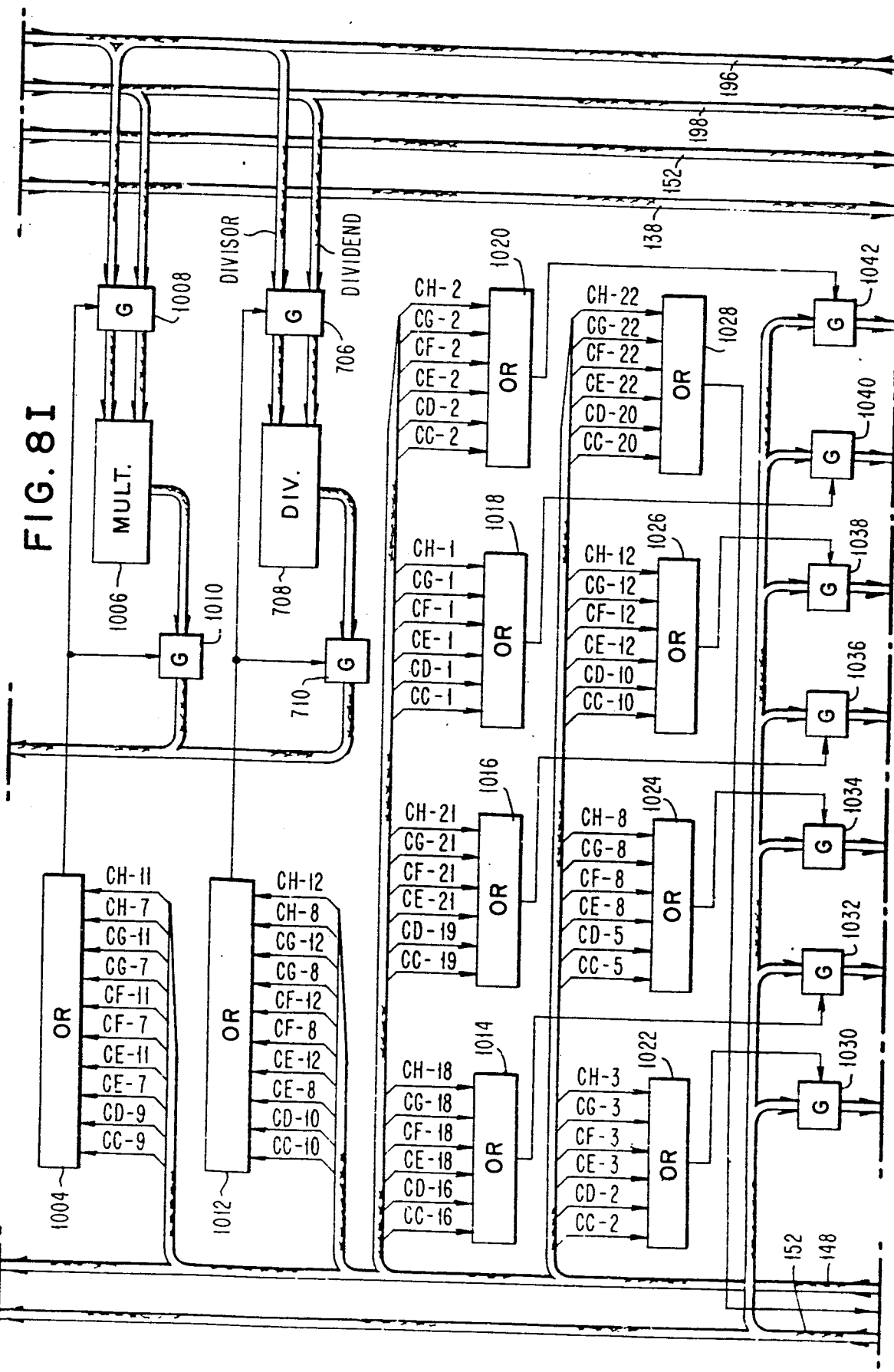

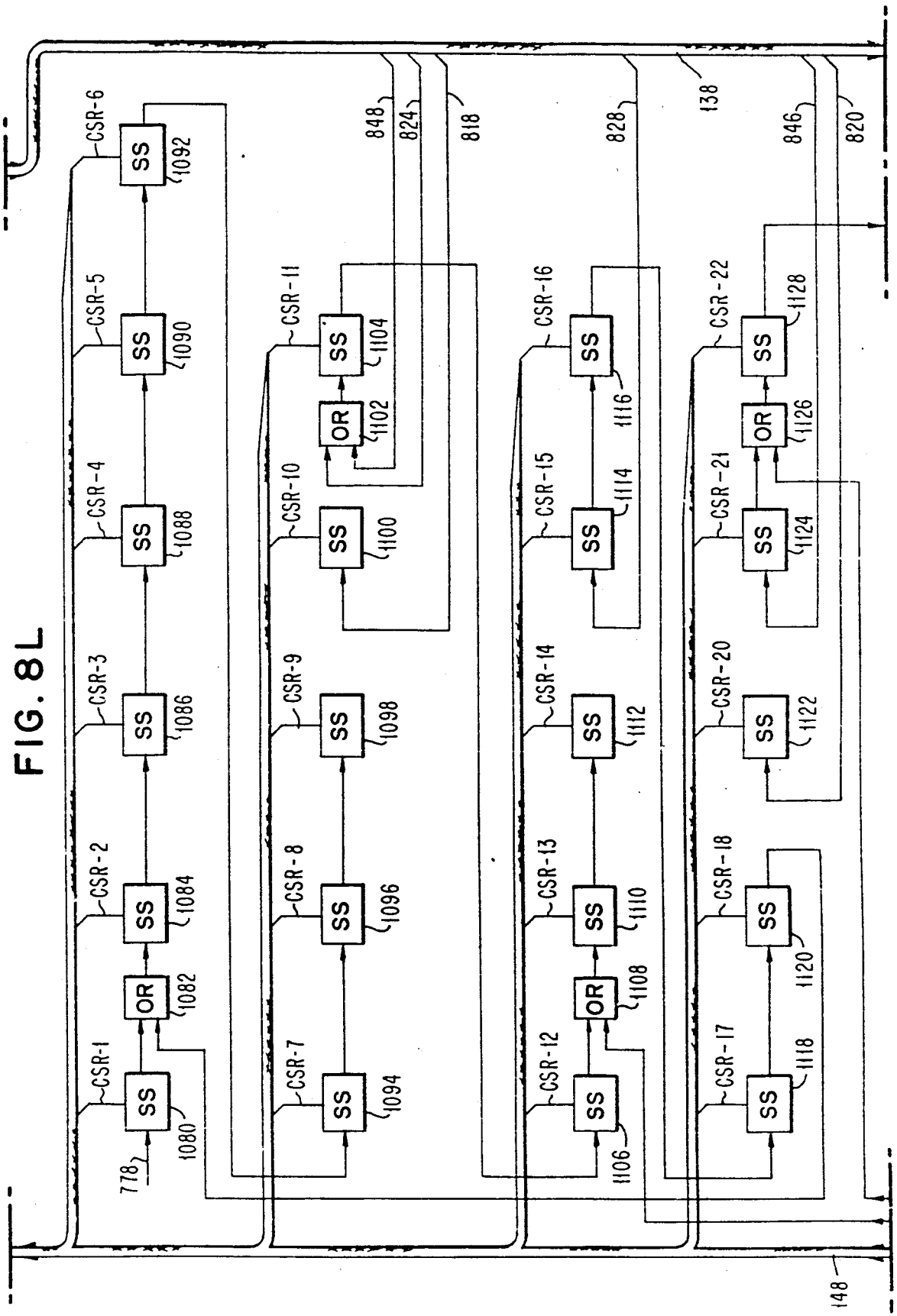

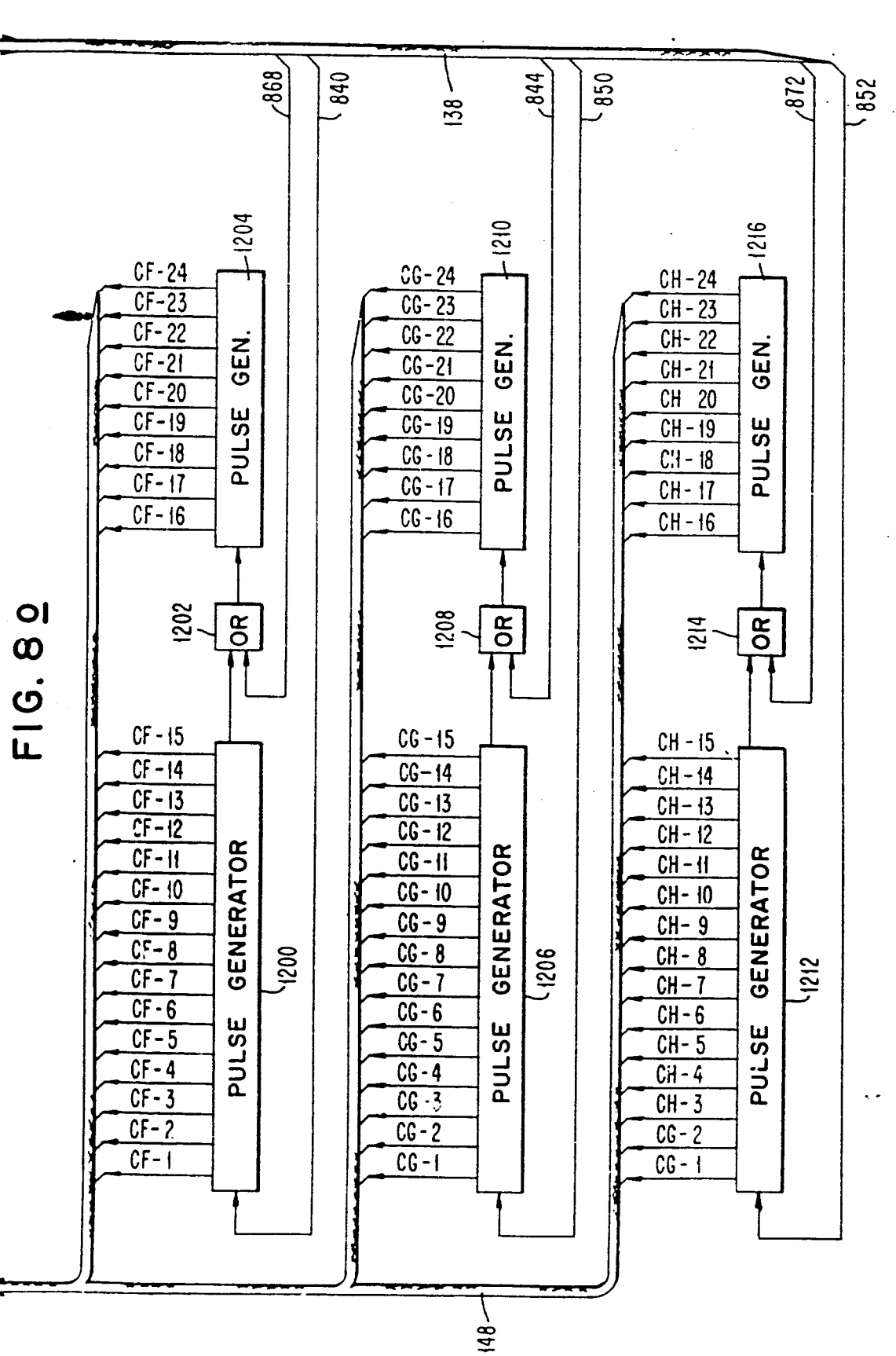

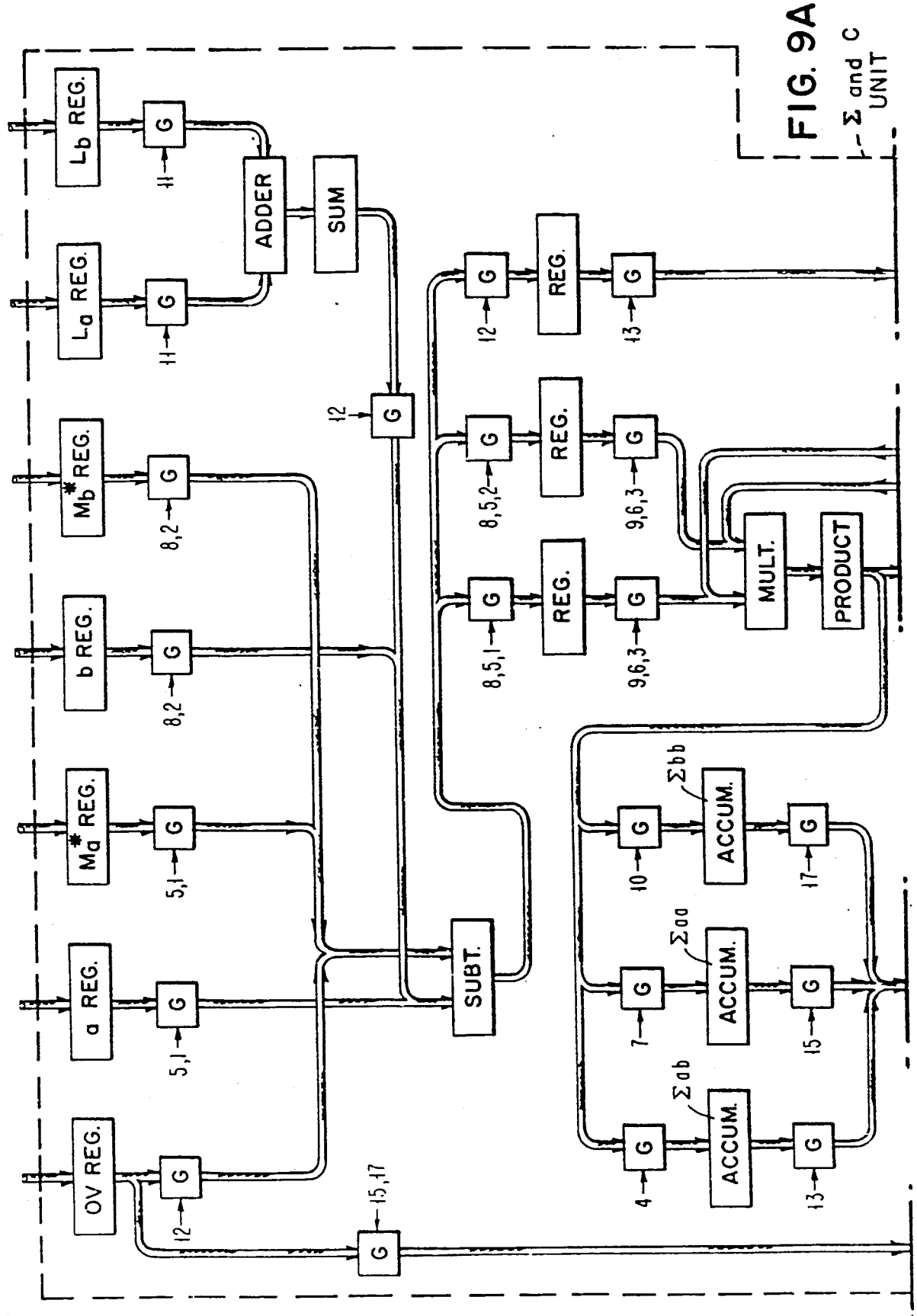
FIG. 9A — Σ and C UNIT

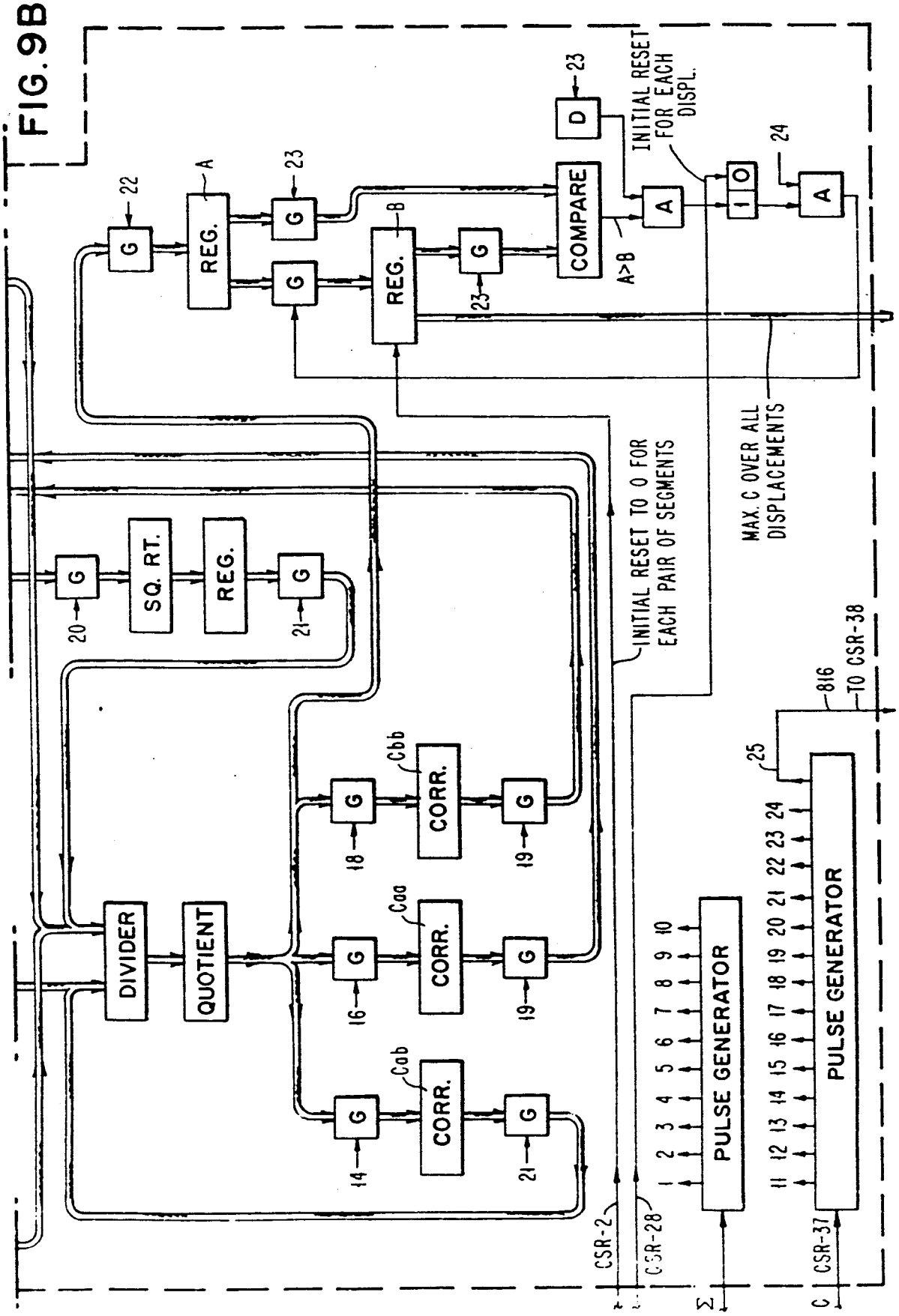

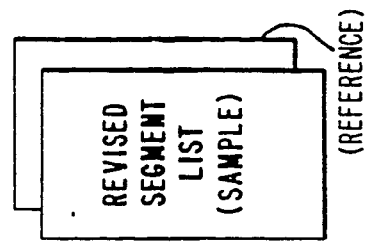
FIG. 10E
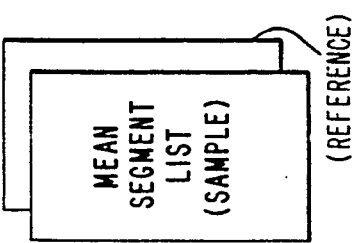
FIG. 10F
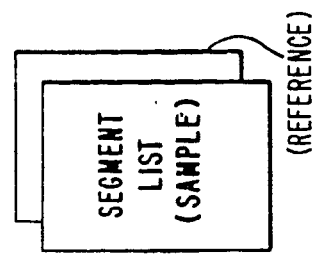
FIG. 10D
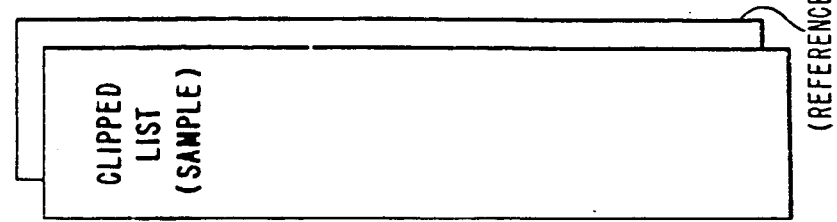
FIG. 10C
FIG. 10B
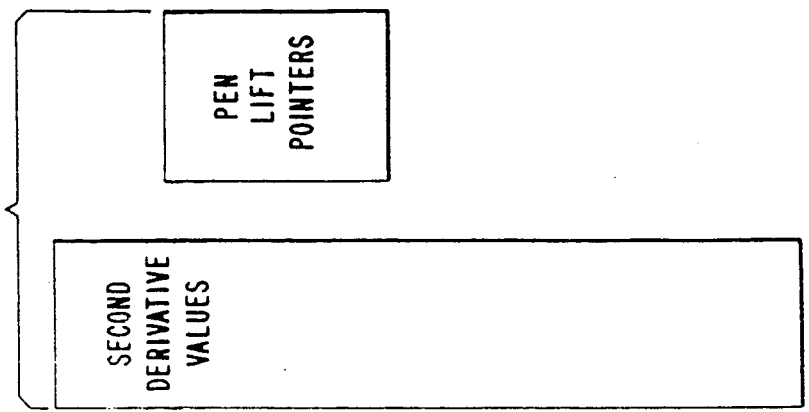
FIG. 10A

SIGNATURE VERIFICATION METHOD AND APPARATUS

BACKGROUND OF THE INVENTION

With the growing use of remote access computer networks which provide a large number of subscribers, access to "data banks" for receiving, storing, processing and otherwise furnishing information of a confidential, financial, or otherwise proprietary nature, the question of security has come to be of increasing concern. Generally, present day computing and/or banking centers have elaborate procedures for maintaining physical security at locations where the central processor, data storage, or cash issuing facilities are located. Examples of this type of security are guards, special keys, special password codes that must be entered into a terminal device at the door of the computing or banking central location, etc. Such security procedures, while providing a measure of safety in keeping out unauthorized individuals with respect to physical areas of the facility, are not really effective for remote terminal applications where unauthorized people may, for example, obtain someone else's password, code number, etc., which will then allow them unauthorized access to central system records which could further allow access to unauthorized data, unauthorized issuance of money at a cash issuing terminal, etc.

In relatively recent years, some rather sophisticated cryptographic security systems have been devised and built into banking and other highly secure systems where unauthorized access is undesirable. However, even with these sophisticated systems, if a person somehow penetrates the main system and obtains a secret "key," it is usually possible to penetrate the system in an unauthorized manner.

It has long been thought possible to devise means for having a remote subscriber or user utilize has own signature as a key to gain entry into the system as with a "voice print," "fingerprint," etc. However, no system has ever been implemented which provides the required degree of security in such handwriting or signature recognition systems without an unacceptable rejection of authorized or valid signatures. Some prior art techniques rely essentially on character recognition and pattern super-position types of analysis methods based on x-y positional data. However, such systems do not work well due to the inherent variability of such positional information.

What is desired is a system which can successfully provide rejection of forged signatures and yet allow a very high percentage of authorized signatures to successfully pass through the system as satisfactory matches. This latter necessity is due to the face that many people's signatures vary considerably from time to time depending upon such factors as fatigue, general mental and physical state, writing position, etc. It is, of course, a prime requisite, if such a system is to be successful in a commercial environment, to be able to allow for reasonable variations in an individual's signature and still be able to recognize same as a non-forgery.

PRIOR ART

U.S. Pat. No. 3,133,266 teaches the recognition of cursive handwriting. The process used in the patent makes an ordered listing of extremals of each letter in a word. The extremals are normalized to permit operation on different sized handwritings. Positional information as a function of time, is used within the machine disclosed for determining such extremals. Comparison is performed by means of a table look-up of the ordered extremal listing, which is in binary form. Extremals are determined by looking for zero values of the first derivatives of $x$ and $y$.

U.S. Pat. No. 3,480,911 teaches the use of a signature identification machine which is sensitive to the pressure applied to the stylus. Comparisons of signature are performed on signals which indicate the stylus pressure as a function of time. It should be noted that this type of mechanism detects jumps of the pen or stylus. Experiments have shown that pressure as a function of time, is not consistent from signature to signature. Pressure is consciously determined more in response to what sort of trail the writing instrument happens to be leaving.

U.S. Pat. No. 3,127,588 discloses a mechanism for automatic reading of cursive script. This mechanism does not recognize a particular handwriting with respect to some reference sample, but merely presents a means for detecting characters. This latter patent is characteristic of the character recognition art.

U.S. Pat. No. 3,621,720 discloses an identification system for recognizing individuals by comparing the force exerted during signature as a function of time with a stored pattern of similar information. These are vertical forces as before. U.S. Pat. Nos. 3,113,461 and 3,618,019 disclose similar identification systems.

U.S. Pat. No. 3,699,517 discloses a signature verification system using many signature dynamic signals including velocity, pen lifts, accelerations and even cross correlations of some of these patterns.

SUMMARY AND OBJECTS OF THE INVENTION

It has been discovered that the accelerations of the stylus, which are proportional to the muscle forces exerted by the signer, are of predetermined consistent durations when forming particular strokes in a habitual signature. The nature of the process gives rise to various distortions in the time axis; e.g. pauses between sections of the name, skipped strokes, decorative rubrics, etc. Thus the signal is marked by regions of high correlation of unknown duration separated by variable regions of low correlation. Accordingly, this invention deals with a method of regional correlation which attempts to register these regions, at first based on stylus contact, shift them individually to find the maximal of a correlation function weighted to penalize shifting, and then combine the results to make an overall verification decision.

OBJECTS OF THE INVENTION

It is accordingly a primary object of the present invention to provide a signature verification system capable of accepting widely varying but valid signatures and rejecting forgeries.

It is a further object of the present invention to provide a signature vertification system wherein verification is based essentially on the measurement and comparison of muscle force durations.

It is another object to provide such a system which utilizes signature dynamics in its verification philosophy.

It is yet aother object of the invention to provide such a method and apparatus which utilizes the second derivative or accelerations of the stylus during a person's signature in constructing reference tables for the signature and in constructing argument or sample tables which are to be compared against said reference subsequently.

It is a still further object of the invention to provide such a method and apparatus wherein the recognition feature is greatly enhanced by utilizing a novel segmentation and shifting technique wherein a higher correlation function may be obtained for an apparently unsuccessful match.

It is a still further object of the invention to provide such a method and apparatus wherein the ultimate verification decision is based upon a cross correlation of the second derivative values for a reference and sample and a weighted combination of such cross correlation values obtained for the various segments between the reference and sample.

Other objects, features and advantages of the invention will be apparent from the following description of a preferred embodiment of the invention which follows.

DESCRIPTION OF DRAWINGS

FIGS. 2A through 2D comprise a combination logical and functional diagram of the subsystem of the present invention which produces a lift of second derivative values for a given signature sample.

FIGS. 4A through 4C comprise a combination logical and functional diagram of the subsystem of the present invention which produces the "clipped list" of second derivative values.

FIGS. 5A through 5C comprise a combination logical and functional diagram of the subsystem of the present invention which produces the "segment list" for a given signature sample.

FIGS. 6A through 6G comprise a combination logical and functional diagram of the subsystem of the present invention which produces the "revised segment list" for a given signature sample.

FIGS. 7A through 7E comprise a combination logical and functional diagram of the subsystem of the present invention which produces the "mean segment list" for a given signature sample.

FIGS. 9A and 9B comprise a combination logical and functional drawing of the summation and correlation block ($\Sigma$ & C) shown on FIG. 8J which perform the major summation and correlation operations required of the system.

FIGS. 10A through 10F comprise a diagrammatic representation of the seven data tables relating to a given signature prepared by the six subsystems of FIGS. 2 through 7.

DESCRIPTION OF THE DISCLOSED EMBODIMENT

Figure 1:
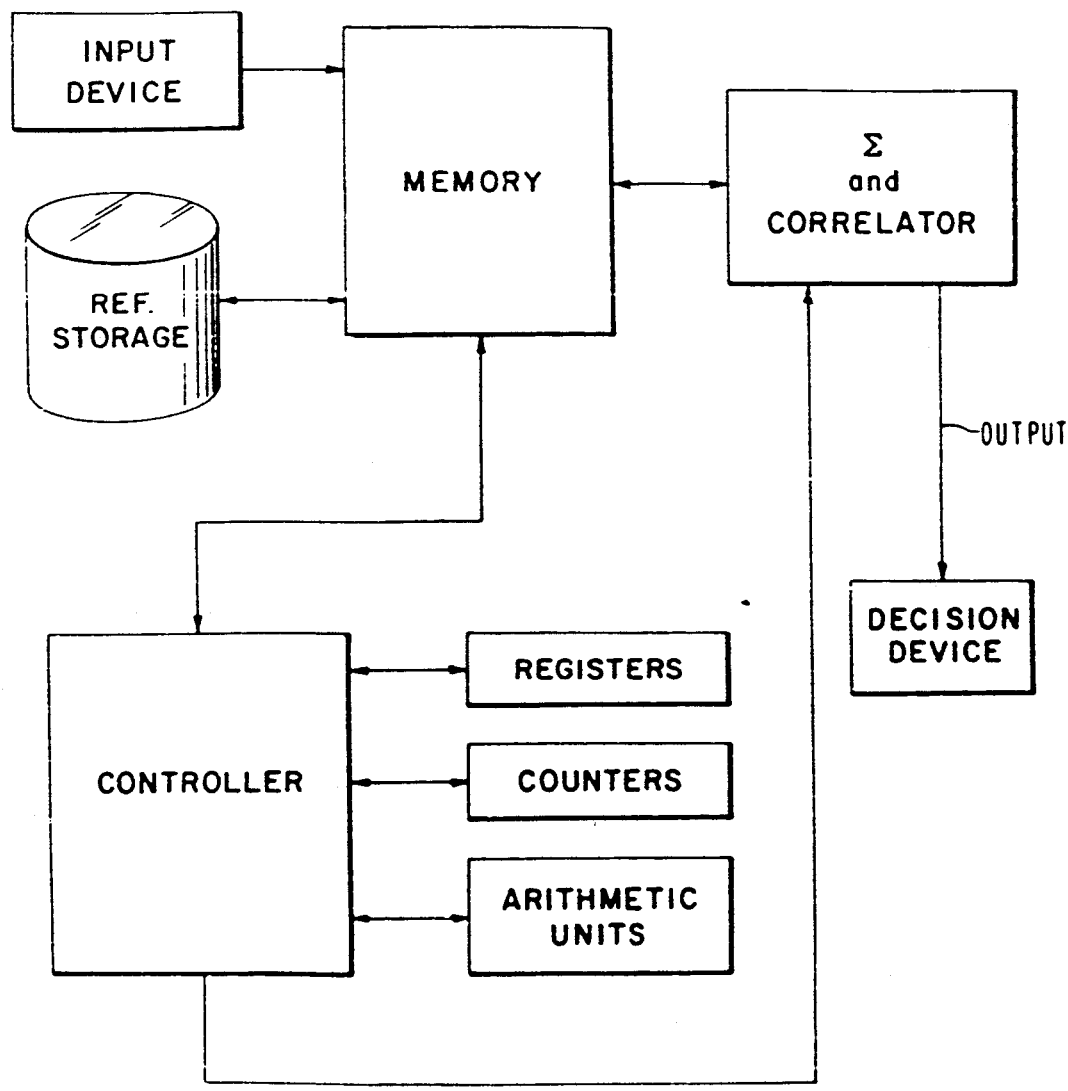
FIG. 1 comprises an overall block diagram of a signal signature verification system organized in accordance with the teachings of the present invention.

The objects of the present invention are accomplished in general by a unique method for verifying signatures which comprises utilizing a step-wise analysis of the acceleration components of pen movement to develop a unique signal pattern characteristic of a given person's signature. The actual analysis and verification technique involves correlating a reference set of signature values with a sample set of such values which latter sample serves as a verification argument. In effect, the time durations between the zero crossings of the characteristic acceleration pattern is compared using cross-correlation techniques.

It has further been found that segmenting the list of acceleration values in a unique fashion, allows cross correlation techniques to be used in an extremely effective manner to determine whether the argument sample was, in fact, produced by the same person making the reference sample. The effectiveness and reliability of the cross correlation technique is greatly enhanced and, in fact, rendered practical by a technique for sliding or shifting any two segments of the reference and the sample to obtain a maximum or optimal match.

The final output or result of the system is a composite correlation factor for the argument sample against the reference which composite signal may be used directly or further weighted in making a final verification decision.

The dynamics of the way a person signs his name offers an important opportunity to do automatic identity verification. The advantages of such a system are clear, the foremost being the acceptability of a signature for identification from a human viewpoint, the high demands placed upon a forger by having to perform dynamically, and the probability of having economically justifiable hardware, dynamic properties being readily measureable.

Previous work in this direction has not been fruitful. Various investigators have tried to use different combinations of timings, pen pressures, spatial positions and velocities, and even accelerations, i.e. the Dyche U.S. Pat. No. 3,699,517. But none have been operable because they could not find reliable invariant properties of an individual's signature. This set of invariants, based on a physiological model of how we write, is believed to offer the best prospect of solving signature verification problems.

Research in physiology has shown that in highly practiced compound motions, such as signatures or golf swings, sensory feedback is not used. (More precisely, it applies only over a relatively long time scale). The propagation time between hand-brain-hand restricts feedback effects to be greater than 100 msec, but the muscle contractions, as actually measured, are of shorter duration and are apparently controlled to an accuracy of about 5 msec.

To use a mechanistic analogy, the signer loads a program in his brain calling for his signature. It takes as an input parameter, the desired height. When the program is executed, a sequence of impulses is sent to the individual muscles. The duration and relative timings of these pulses, and hence contractions are completely predetermined. The magnitude of the forces is a variable which is derived from the desired height.

This model has much experimental data and other evidence to support it. In brief, experiments show that the time to write a signature is highly repeatable and fixed to within milliseconds. (The subjects are instructed to write "normally".) The time is invariant with height within broad limits (so long as the mechanical motions of the arm do not have to be changed). Attempting to slow up and write more carefully, generally spoils the accuracy, while to some limit, accurcy increases with speed.

The presently described system extracts pulses from the pen dynamics which correspond to the actual muscle forces, which are the acceleration components of the pen displacement.

The system is shown in general terms in FIG. 1. In the disclosed embodiment, a transducer capable of developing accelerations in either the $x$ or $y$ directions (plane of the paper) or both is required. The $y$-direction is believed to contain the most significant information. If the input device senses position, then some processing is required to yield the accelerations.

The measured acceleration are corrupted by noise and quantization effects. These may be removed by suitable low pass filtering. It is important that the time scale be adequate to resolve events to at least 5 milliseconds, as this is the accuracy of the muscle timings.

The timings of these pulses are then noted relative to the start of motion. (Start of motion may be determined by for instance, the first down motion following a pen switch closure confirming that the pen is in contact with the paper).

These time sequences serve as input data to the decision procedure which also has access to the signer's putative identity and his previously stored signature timings. (A closed system, with a moderate number of users, such as a computer system or perhaps a branch bank, might dispense with inputting the putative identity and operate in an identification mode. When entering a new user in an identification system, it will be necessary to compare his timing profile with all other current users, to assure that the system can reliably identify him. This is not necessary for a verification system except for people with the same or similar names, whose putative identities might be confused also.)

The time sequences are compared on a word basis, allowing for the "glitches" or skips that may momentarily interrupt the process. This requires that the matching be done in segments, neglecting or shifting part of the input data stream if required. Which is to say that the decision scheme must tolerate a certain amount of temporal misalignment even though the start and finish of each pen-down section is well defined.

The significant feature of the present invention is that potential forgers have almost no information or way of knowing how a person writes his name insofar as acceleration components of the writer's hand are concerned. In fact, experiments have shown that even when a prospective forger has been thoroughly apprised of the way in which the present system works, he is unable to even approximate the acceleration patterns in the forged signature.

As stated previously, one of the more difficult decisions which a signature verification system must ideally make, is that one person is a forger and that another person has a valid identity i.e., his signature is a true one which should meet the test of verification. As will be readily apparent if a cash issuing terminal, remote access computer terminal, or some other similar system for verification of a person's identity is critical, it is very important that forgers and/or unauthorized persons be identified with an extremely high degree of reliability. It is, however, just as important that people who are whom they say they are must be correctly identified by the verification system as not forgers or otherwise unauthorized persons. This latter factor causes considerable difficulty in any situation where a person's signature is utilized as a test for identity because many individual's signatures are considerably from sample to sample. This has been found to be the case even when successive samples are taken literally consecutively and also in those situations where there was considerable time separation between successive samples where environmental factors could be expected to cause signature differences.

The unique feature of the present invention which allows a truly operable and highly accurate verification to be made, is really two-fold. The first is a discovery of the extremely unique pattern that exists in each person's handwriting relative to the time duration between the zero crossings of the acceleration pattern or curve as detected by a suitable device connected to the writing instrument. The additional significant contribution of the present invention lies in the discovery and utilization of the fact that even though there may be many spurious noise and other low correlation factors which tend to cause the characteristic acceleration waveform to change shape, that there are still extremely high correlation components within certain areas of said pattern.

Applying this principle to the present method and apparatus, the total handwriting sample waveform is segmented, in this case, utilizing pen lift indicators to achieve such segmenting, and each segment of the reference and sample are paired to each other in a series of steps or shifts. The most obvious way to do such a cross correlation, would be to line the segments up so that they began at the same point and simply do the cross correlation calculations, however, this has been found to be almost totally worthless or at best, unreliable due to the variable factors mentioned above. By shifting the start of one segment with respect to the other and in effect, doing the correlation in the overlapping portions of the segments and repeating the shifting and correlating operations a number of times in both directions from the situation when the starting points are aligned, it is possible to discover high correlation areas.

The correlation figure for each shift position is computed and held until the complete correlation process at all displacement positions has occurred and the system then selects the highest correlation value and takes this as the optimum possible correlation for this segment of the signature.

It will be noted from the subsequent detailed descriptions of the various subsystems, that the present embodiment utilizes a maximum displacement of one-fourth or 25 percent of the length of the longest of the two segments, whether they be the reference or the sample. Then the shorter of the two segments is shifted with respect to the larger segment. On each successive shift, the shift registers which are used to store the actual second derivative values are shifted by a value of eight until the maximum negative shift has been obtained.

It should of course be understood that each storage position of the shift registers will store an address index or pointer to a value of the particular point on the second derivative waveform or curve for that segment. It will of course be appreciated that a different number may be chosen for the maximum shift, either greater or lesser, as well as the magnitude of the shift between successive correlation steps. The numbers one-fourth and eight were chosen as being very convenient to implement in a digital computer of the type utilized in the present embodiment.

As will be apparent from the further more specific description of the operation, both the reference and sample signature values will be forced to have the same number of segments of an approximately equal length although the exact length will, in fact, usually be slightly different. The system automatically analyzes each pair of segments (reference and sample) and automatically performs the above-described shifting operation to obtain the maximum correlation value for each segment comparison until all segments have been appropriately compared and finally, the maximum values are added to produce a final correlation value for the reference and the sample.

This totalized correlation value may itself be further manipulated to provide what are considered to be more accurate figures from a statistical point of view, however, for the purposes of describing the present embodiment, it is considered that this is the ultimate output of the system.

Figure 8:
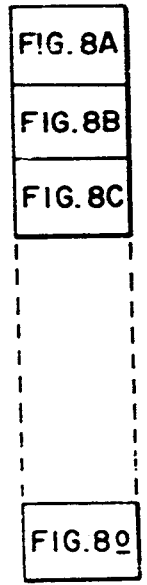
FIG. 8 comprises an organizational drawing for FIGS. 8A through 8O.

It will be noted, especially in the description of the actual comparison of the subsystem shown in FIG. 8, (A through O), that there are a number of statistical operations or manipulations performed on the correlation data automatically by the system. These include the computation of the $M_a$, $M_b$ values for a given segment which provide for the removal of any DC level from the signals, and also the computation of the $M^*_a$ and $M^*_b$ values in which the means are adjusted for the effects of shifting. The correlation function used in the final computations has been designed to, in effect, penalize a given correlation value where shifting has been done. State differently, it has been found in some signatures, that there may be an extremely high correlation factor for extreme shifts; i.e. maximum shifting between two segments. The machine would really be comparing different strokes of the signatures. To avoid erroneous conclusions, it is necessary to penalize high correlation values with respect to other values where reasonably good correlation was obtained but over a wider correlation period. Again, the specific way in which this is achieved will be set forth subsequently, particularly with the description of the operation of the subsystem set forth in FIG. 8.

Having set forth the general philosophy of operation and the broad general features of the present invention, insofar as they incorporate these broad features, the invention will now be more fully set forth and described in basically two steps. The first will be a general description of each of the subsystems of the present invention shown in FIGS. 2 through 8. Subsequently, will follow a highly detailed data flow description of the operation of each of these subsystems going from the initiation of the controlling clock sequences down through the termination of said sequences. In the majority of this descriptive material, reference will simply be made to FIGS. 2 through 9, however, as will be understood, these figures in all cases are merely organizational drawings for the actual subsystem figures shown in the individual sheets making up one of the other figures; i.e. FIG. 7 will refer to FIGS. 7A through 7E.

Another significant feature of the presently disclosed embodiment and, more particularly, with regard to the way it is described, is that each of the FIGS. 2 through 8 is shown as representing a separate subsystem. It should, however, be clearly understood that this is done for the sake of clarity only and that it would be readily possible to show all the FIGS. 2 through 8 and even including 9, as a single, extremely large composite sheet wherein such items as the main memory, MAR, MDR and many other registers and counters, are utilized in a plurality of the different subsystems. In all cases where the same element appears commonly throughout all of the subsystems, the same name; i.e. memory, MAR, MDR, or reference numeral such as the output gate 210 from counter AA is used. In a composite embodiment, of course, it would be recognized that the input to the gate 210, for example, would have to go through an OR-circuit to handle all of the various clock pulses which actuate same. It will be further noted that at the bottom of each of the subsystems are located the controlling clocks which, in a great majority of cases, are simply single shots having a fixed period between when a turn on pulse, produced when the clock is energized, and a turn off pulse which may be utilized to turn on the next clock pulse in the sequence. It will also be noted in the subsequent descriptions, that the functions of the various subsystems are sometimes referred to as microprograms for convenience in terminology. However, the disclosed embodiments are pure hardware.

DESCRIPTION OF FIG. 1

FIG. 1 comprises a broad functional block diagram showing the overall configuration of the system required to perform the requisite signature verification set forth and disclosed herein. The input device is basically a special-purpose tablet and pen assembly including mechanisms for providing a start signal when the pen touches the device and also having appropriate circuitry for indicating pen lifts. Specific devices shown in the prior art capable of performing this function will be specified in the subsequent general description of FIG. 2.

In the present embodiment, the input device disclosed and described, is basically a displacement indicator wherein the acceleration or second derivative components, must be computed. This is done in the subsystem disclosed in FIG. 2 which, as stated above, will be described more specifically subsequently. The input device is shown connected to the memory, however, as will be apparent from the subsequent description depending on the exact nature of the input device, the actual values placed in memory are appropriately controlled by the box marked controller to provide the requisite acceleration lists, pen lift lists, etc. The box marked reference storage contains the records necessary for the comparison of a putative signature against the reference records. As will be apparent, these records would be made-up in the same way as the putative or argument signatures. In essence, all of the records shown in FIG. 10(A through F) must be computed and stored for each reference signature as well as for the putative signatures which are to be compared against said references.

Figure 9:
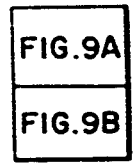
FIG. 9 is an organizational drawing for FIGS. 9A and 9B.
Figure 2A:
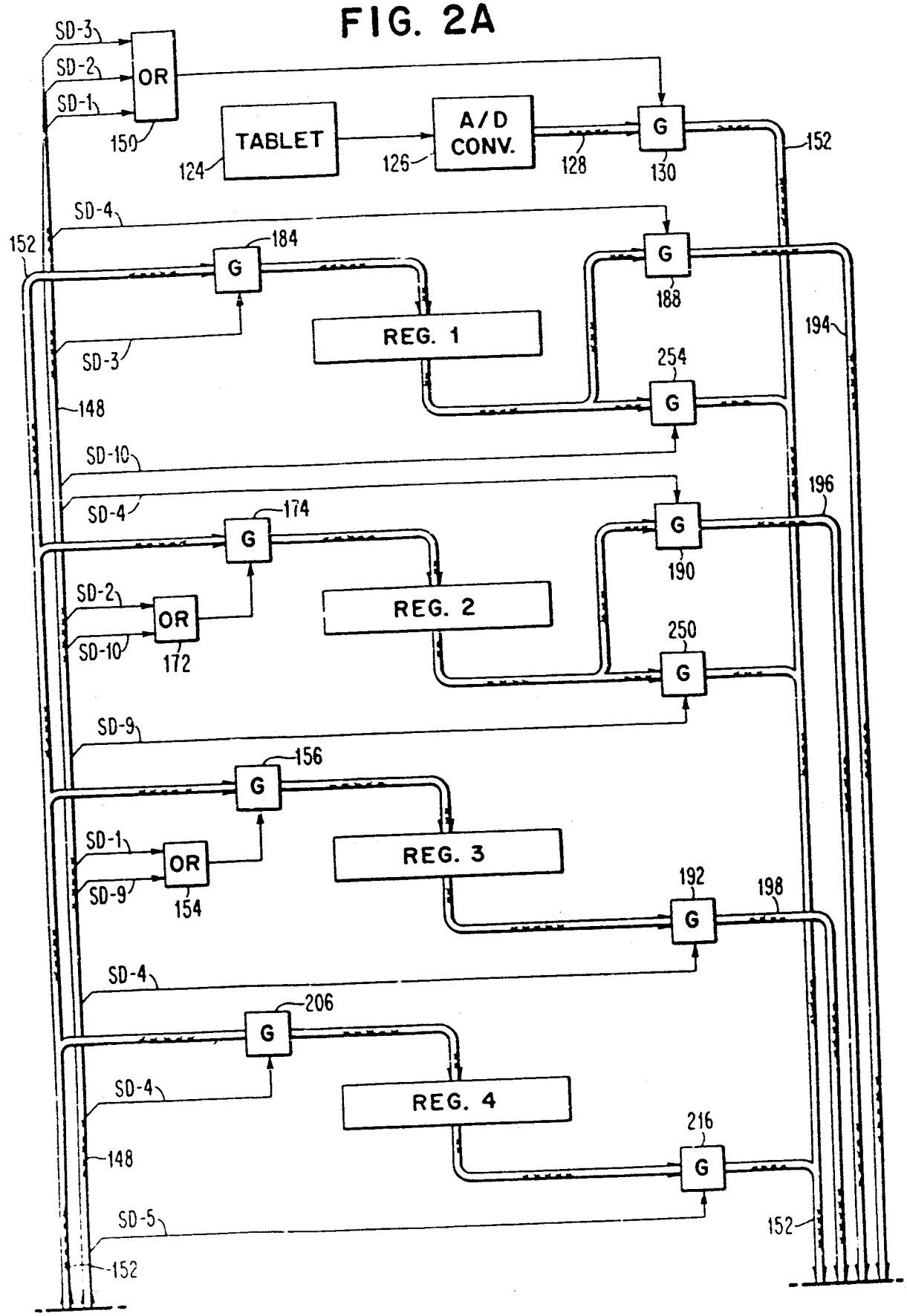
Figure 2C:
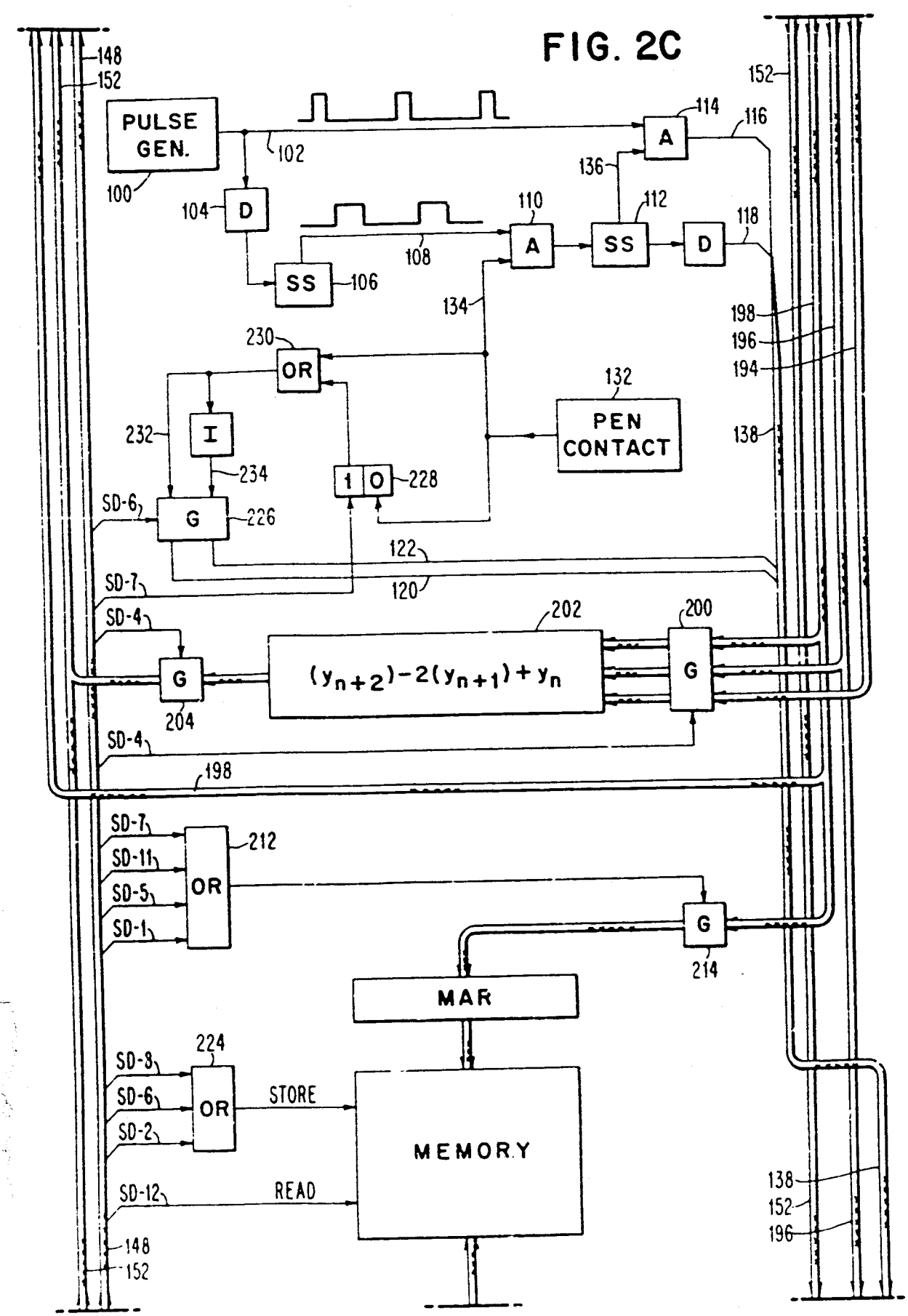

The box marked summation and correlator performs the primary complex arithmetic operation of the present system and, more particularly, that performed in the subsystem shown in FIG. 8. The details of the summation and correlation unit are shown in FIG. 9. The output labeled $C_i$ coming from the summation and correlation unit, comprise the composite correlation value output for a particular argument signature and, although the dotted line is shown going to the decision device, it is not considered that this final function the unit performs is part of the instant invention since it modifies the conclusion $C_i$ based on some particular statistical weighting or sampling technique in addition to those to be described.

The box marked controller has various registers, counters and arithmetic units connected thereto and includes the various subsystem individual clocks which are primarily shown at the bottom of FIGS. 2 through 8. The controller controls the operations of making the various data lists shown in FIGS. 10A through 10F and also controls the final comparison operation between the reference and sample. It should be noted in passing that the summation and correlation unit shown in FIG. 9, contains its own separate clock system which comprises two different pulse generators activated by the summation ($\Sigma$) or the correlation (C) signals from the CSR microprogram clock. This clock differs from the other subsystem clocks in that the two pulse generators each produces a series of evenly spaced pulses of 10 and 15 pulses respectively.

GENERAL DESCRIPTION OF THE SECOND DERIVATIVE SUBSYSTEM

This subsystem compares the list of second derivative values for the handwriting sample and also prepares a list of pen lift indicators. For purposes of the present embodiment, the tablet shown by reference 124 is shown to be an $x$–$y$ displacement tablet capable of producing a continuous output of analog $x$ and $y$ values which are continuously fed into the A/D converter 126. There are a number of commercial $x$–$y$ pen devices currently available on the market such as typified by U.S. Pat No. 3,668,313 of Dym et al, dated June 6, 1972 and U.S. Pat. No. 3,582,962 of Mazza dated June 1, 1971. Either of these two systems would be relatively easy to utilize in the presently disclosed system. U.S. Pat. No. 3,662,377 of Herbert Dym et al, dated Apr. 30, 1970, discloses a form of analog to digital converter that could be utilized with either of the two above-referenced tablets. The Dym patent also gives proximity information for the pen relative to the tablet from which pen lift information may readily be obtained.

As stated previously, it is assumed with the present system that it is necessary to generate the second derivative of pen displacement or acceleration from the positional output information emanating from the tablet 124. This is essentially done by sampling the positional information periodically to obtain consecutive position measurements and then to perform the necessary algebraic operation to obtain the acceleration component. As will be explained more specifically in the description of this subsystem, the time sampling is done under control of the pulse generator 100 and the arithmetic operation are performed by the logic block 202. What is obtained from this unit, is a series of second derivative values which are placed in the second derivative list in memory together with the pen lift pointers which point to those locations in said second derivative list; i.e. addresses, at which pen lifts occurred.

It is these pen lift pointers which are utilized to construct the segments of the given reference and sample lists. As will be noted, the second derivative value list is much larger; i.e. on the order of several thousand entries compared to the list of pen lift pointers which would typically be from three to ten depending on a particular person's handwriting sample.

GENERAL DESCRIPTION OF THE MAXIMUM SECOND DERIVATIVE SUBSYSTEM

Figure 2:
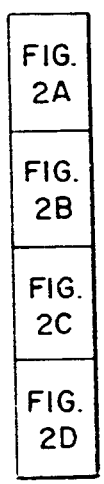
FIG. 2 comprises an organizational drawing for FIGS. 2A through 2D.
Figure 3:
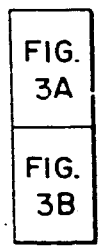
FIG. 3 comprises an organizational drawing for FIGS. 3A and 3B.
Figure 4:
FIG. 4 comprises an organizational drawing for FIGS. 4A through 4C.
Figure 5:
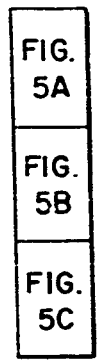
FIG. 5 comprises an organizational diagram for FIGS. 5A through 5C.
Figure 6:
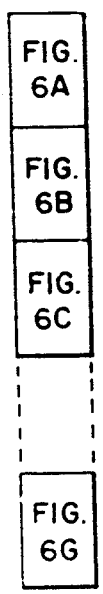
FIG. 6 comprises an orgnizational drawing for FIGS. 6A through 6G.

This subsystem as set forth in FIG. 2, goes through a complete list of second derivative values prepared and placed in storage by the second derivative subsystem and by means of successive comparisons, selects the maximum value in the entire second derivative list. This value is utilized as will be explained in the clipped list program.

GENERAL DESCRIPTION OF THE "CLIPPED LIST" SUBSYSTEM

This subsystem is utilized as a quantization step which in effect, reduces any second derivative value to either plus one, minus one, or zero. The maximum second derivative value is utilized to determine the clipping level for this subsystem and, as will be apparent, it is divided by four, by shifting the contents of register three positions to obtain the value for the clipping operation. Subsequently, comparisons are made with this value and any value which is greater, is given a value of one and depending on whether its sign was positive or negative, a positive or negative will be affixed to the one. Any second derivative value less than this clipping level, is assigned value of zero regardless of its sign.

The clipped list subsystem essentially reconstructs the second derivative list into a series of plus one, zero, minus one values of exactly the same length as the original second derivative list which is shown diagrammatically in FIG. 10C. It will be noticed in FIG. 10C that a similar clipped list is stored in memory for the reference as well as for the sample which, as will be apparent subsequently, is utilized during the actual comparison or correlation operations between the reference and the sample.

It should be clearly understood, however, that the formation and utilization of the clipped list in accordance with the present embodiment, is not absolutely necessary to the operation of the presently disclosed signature verification system. It has been utilized in the present embodiment as it greatly simplifies the arithmetic operations and the hardware utilized in, for example, the correlation circuitry. It further eliminates many small transient effects in the signature which have not been found to be significant in making the overall second derivative correlations. However, the second derivative list in a non-clipped form, could equally be used in accordance with the teachings of the present invention. Or the values could be quantized into an arbitrary number of levels. e.g., 4, 10.

GENERAL DESCRIPTION OF THE "MAKE SEGMENT LIST" SUBSYSTEM

This subsystem performs a relatively simple operation on the pen lift pointer list. As will be recalled, the pen lift pointer list is simply an address index list which points to those locations in the second derivative or clipped list where pen lifts occur. Thus, the pen lift pointer list is merely a sequential list of addresses which, in essence, define segments of the clipped second derivative values. It is necessary for subsequent operations to known the length of each segment. The "make segment list" is accordingly a successive list of numbers the magnitude of which represents the number of total entries in each segment of a handwriting reference or sample. The list is made in the subsystem by successively subtracting consecutive numbers of the pen lift pointer list and these results are stored and form the segment list. As will be noted, the segment list is one entry shorter since the pointer list, in addition to showing each segment break point and the end of the segment, must also show the beginning address in memory which, of course, may be assumed to be zero in which case the pen lift pointer list and segment list would be the same size.

Again, referring to FIG. 10D, it is noticed that the segment list is shown for a reference as well as a sample signature. These two segment lists are utilized in the revised segment list subsystem to be described wherein the two segment lists are, in effect, merged so that they both become the same size or have the same number of entries although each entry may be somewhat different in size.

GENERAL DESCRIPTION OF THE "REVISED SEGMENT LIST" SUBSYSTEM

As stated previously, the function of this subsystem is to, in effect, merge the two segment lists for the sample and the reference signatures. The way that this is done is to examine the two lists simultaneously and if either list is missing a segment breakpoint or indicator (which had been defined previously by the pen lift pointer list which was originally utilized making the segment list), the particular segment list missing this breakpoint will have one inserted. This is to allow a segment-by-segment comparison of the reference and sample signatures on a more realistic and statistically accurate basis.

This operation is accomplished in the following manner. The segment lists for the reference and sample are each accessed starting, of course, at the beginning and the two numbers stored therein (indicative of the number of entries in this segment) are compared. If the difference between the two is less than one hundred clock counts, the next pair of entries in the two lists are accessed and the program will continue in this fashion until the situation arises where there is a difference greater than 100. In this event, the list having the longer segment is modified so that two short segments are created which adds one member to this list. The effect of this is to push down all the entries in the modified list by one position. As will be apparent, the arithmetic for achieving these functions involves simple addition and subtraction and will not be set forth specifically as these operations are very clearly explained in the subsequent detailed description of the logic.

The operation immediately following a segment list modification will cause the second segment of the modified list to be brought into the comparison register and compared with the next number of the unmodified lists wherein an identical comparison will take place. In the presently disclosed embodiment, either of the lists may be modified as representing the best mode of practicing the invention, however, as will also be understood, the system could be designed so that only one list would be modified with what would probably be a loss of accuracy.

When the end of one of the segment lists has been reached and it is determined that the other segment list still has one or more entries, the longer of the two lists will simply be truncated or cut off at this point as to do otherwise would require not only a revision of the segment list as previously outlined, but also the insertion of zeros in the shorter of the two lists which would in no way improve the correlation results. It should be noted in passing that if there is a substantial difference in the length of the list at this point, that rather low correlation of the last segments will probably result.

GENERAL DESCRIPTION OF THE "MEAN SEGMENT LIST" SUBSYSTEM

The function of this subsystem is to compute the mathematical mean for each segment in the sample signature. It is assumed that a similar computation has already been performed for the reference signature in back-up storage. It is to be noted that the way that the reference signature mean list would be computed is exactly the same as for the sample segment list. The reason for computing these "means" is to remove the DC level from subsequent computation of cross-correlation values which, in effect, prevents undue weights or unduly high correlations to be found in certain areas where DC levels have not been so considered.

It is not believed relevant to discuss all of the mathematical reasons necessitating this computation, it being generally noted that in the mathematics of correlation techniques, this is one factor that is usually considered when doing cross correlations between two wave forms.

Mathematically the function that is performed by the present subsystem on each individual segment is expressed by the following formula:

$$M_{a_j} = \sum_{j=start}^{j=end} a_i / N_j$$

where:

$a_i$ = ith element of segment j;

$j$ = a particular segment;

$N_j$ = number of elements in segment j.

The actual computation of the means for each segment comprises extracting each value for that segment list from the clipped list in memory and placing it in an accumulator; i.e. 780, and dividing the accumulated algebraic sum of all of the elements of the segment by $N_j$, the total number of elements within said segment. The result of these computations are appropriately placed in memory and there will be as many entries in this list as there are segments therefor, as will be noted in FIG. 7. The mean segment list is essentially the same size as the revised segment list of FIG. 10E. It will also be noted that there is a mean segment list for both the sample and the reference which are stored in memory and which are utilized in the final comparison as performed by the subsystem set forth and described in FIG. 8.

It will further be noted that the actual means thus computed and referred to as $M_a$ or $M_b$ must be adjusted during subsequent computations during the "comparison" operation and, in each case, the newly computed value becomes $M^*_a$ or $M^*_b$. Again, this will be specifically set forth in the description of the comparison subsystem.

GENERAL DESCRIPTION OF THE COMPARE SAMPLE TO REFERENCE SUBSYSTEM

Figure 4A:
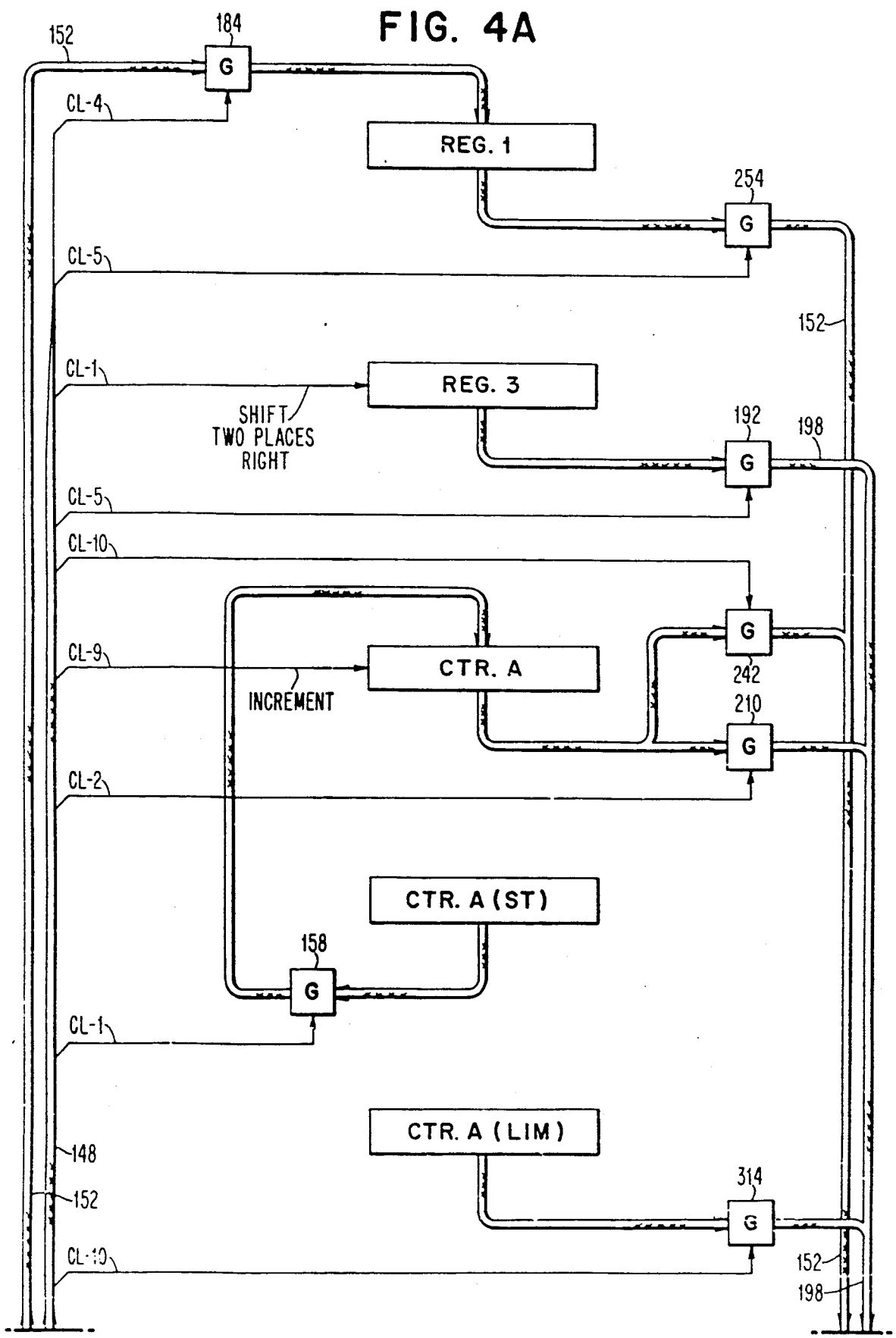
Figure 4C:
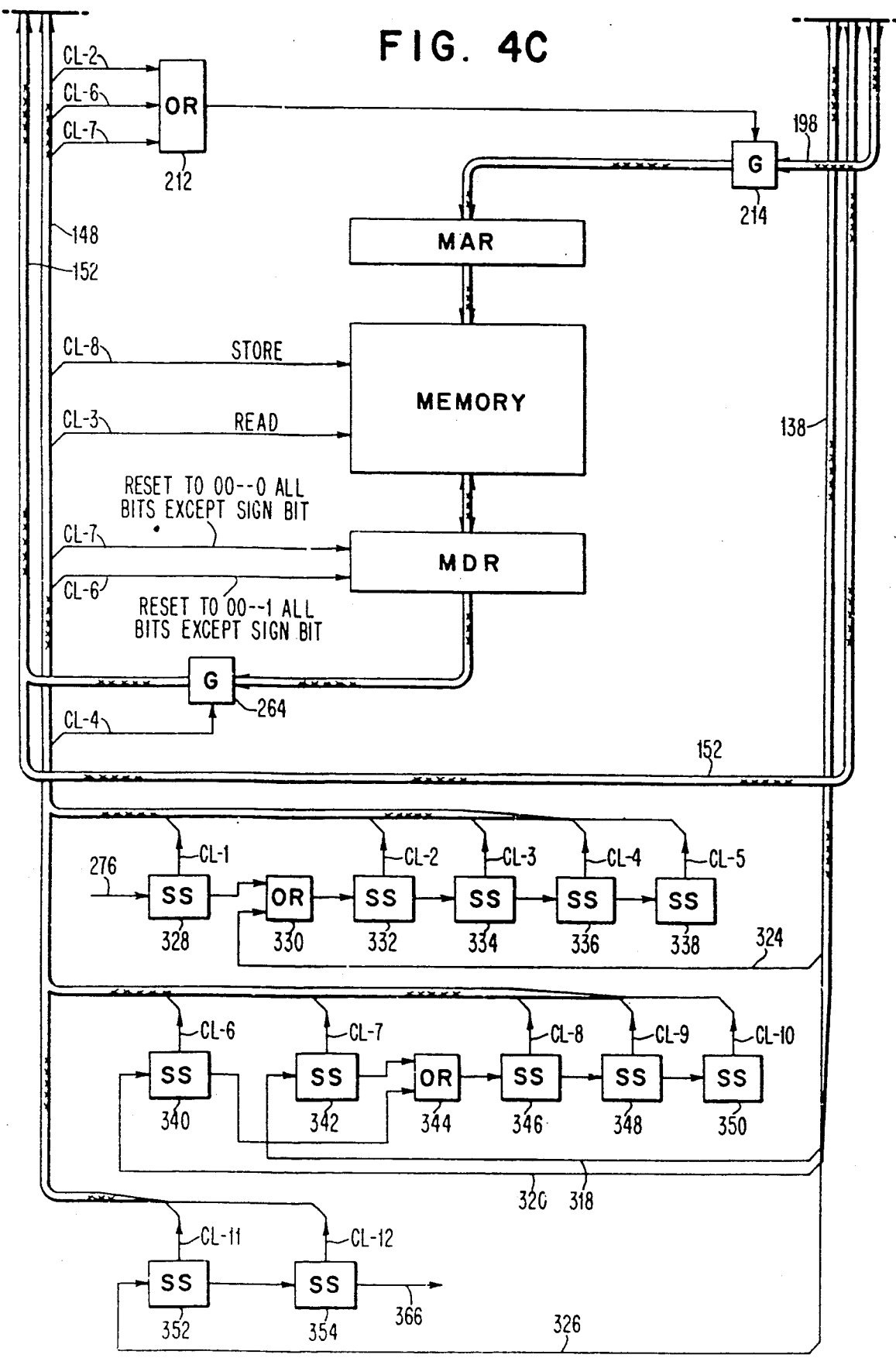
Figure 5A:
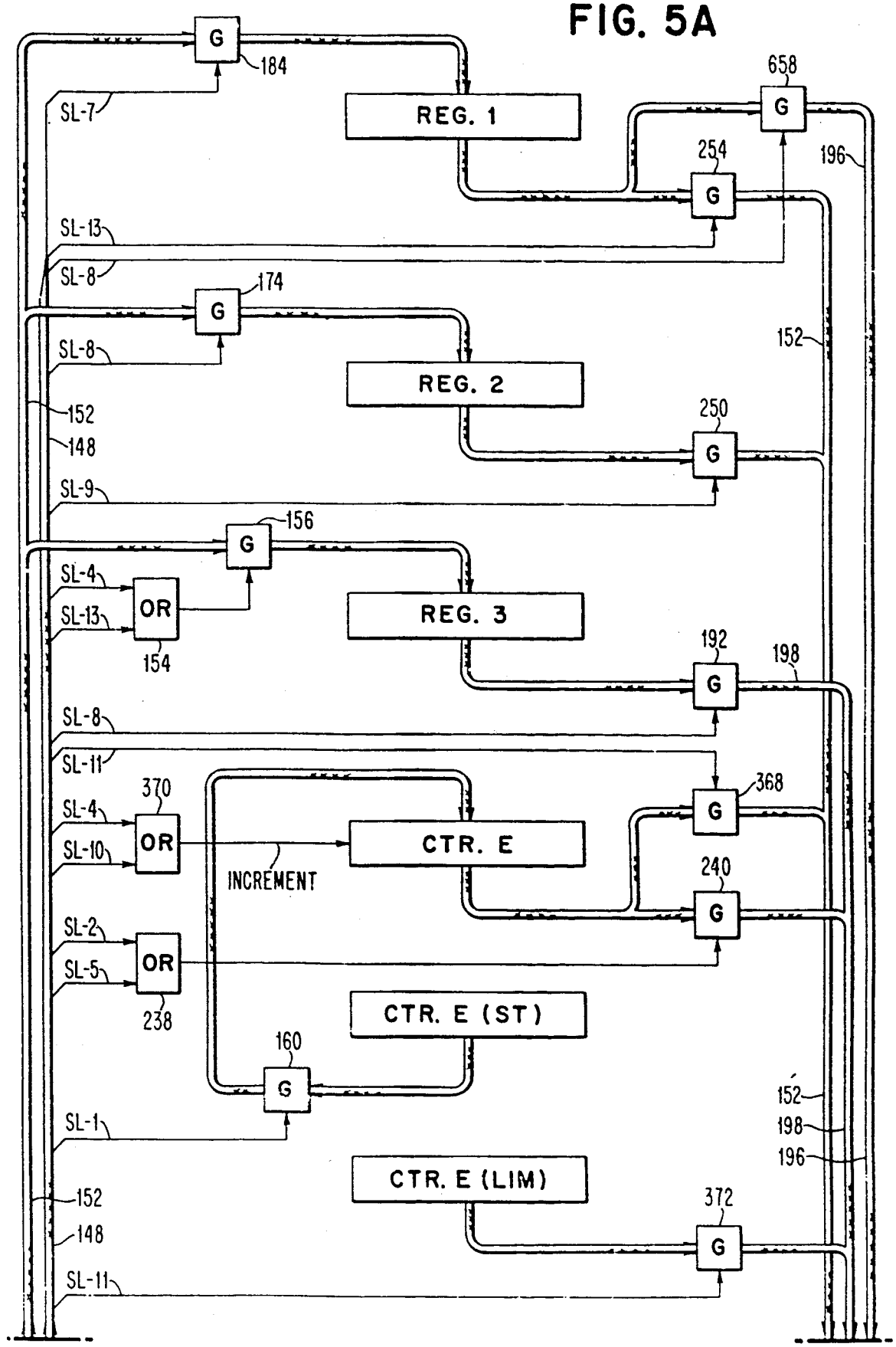
Figure 5C:
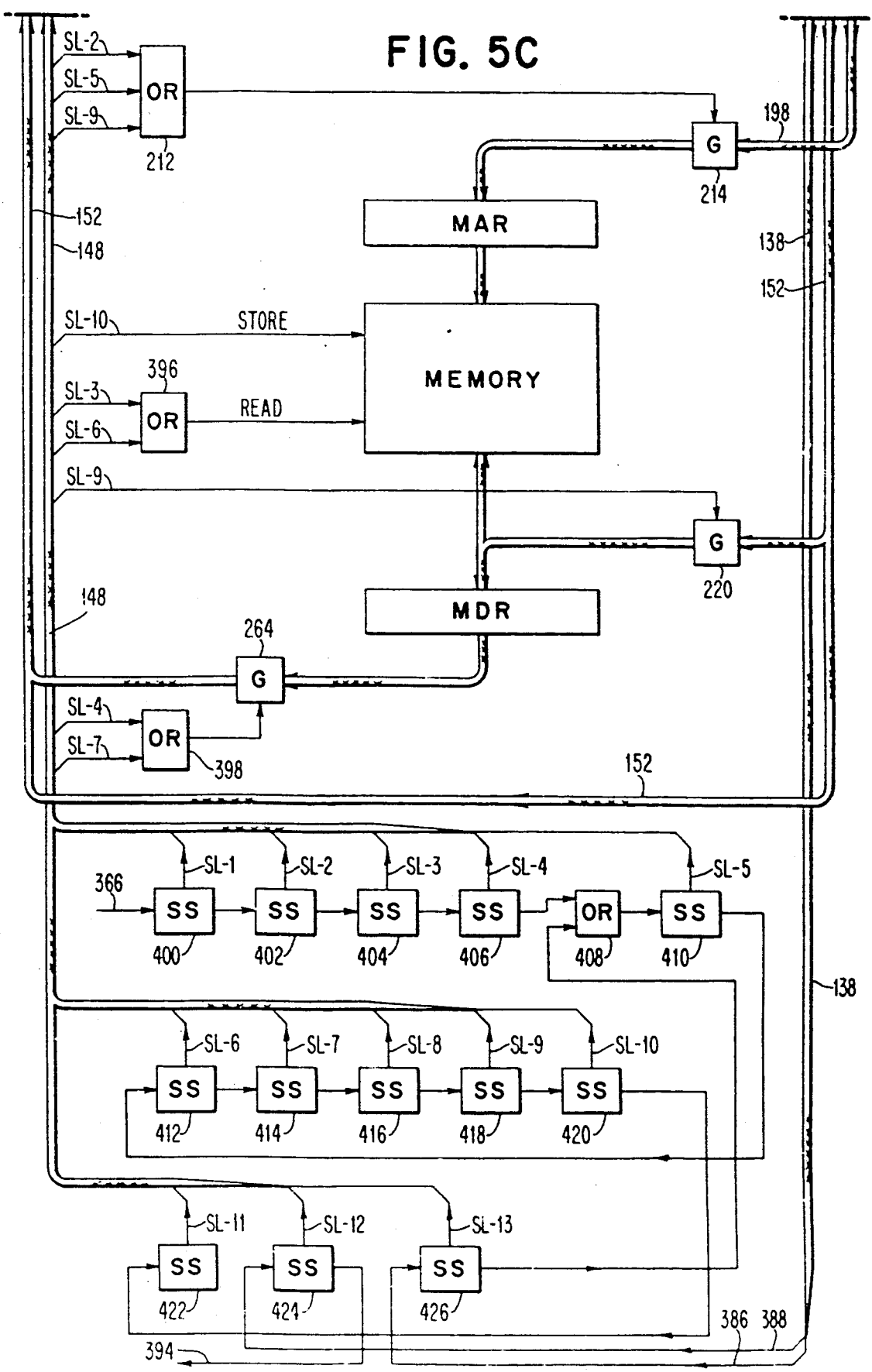
Figure 6A:
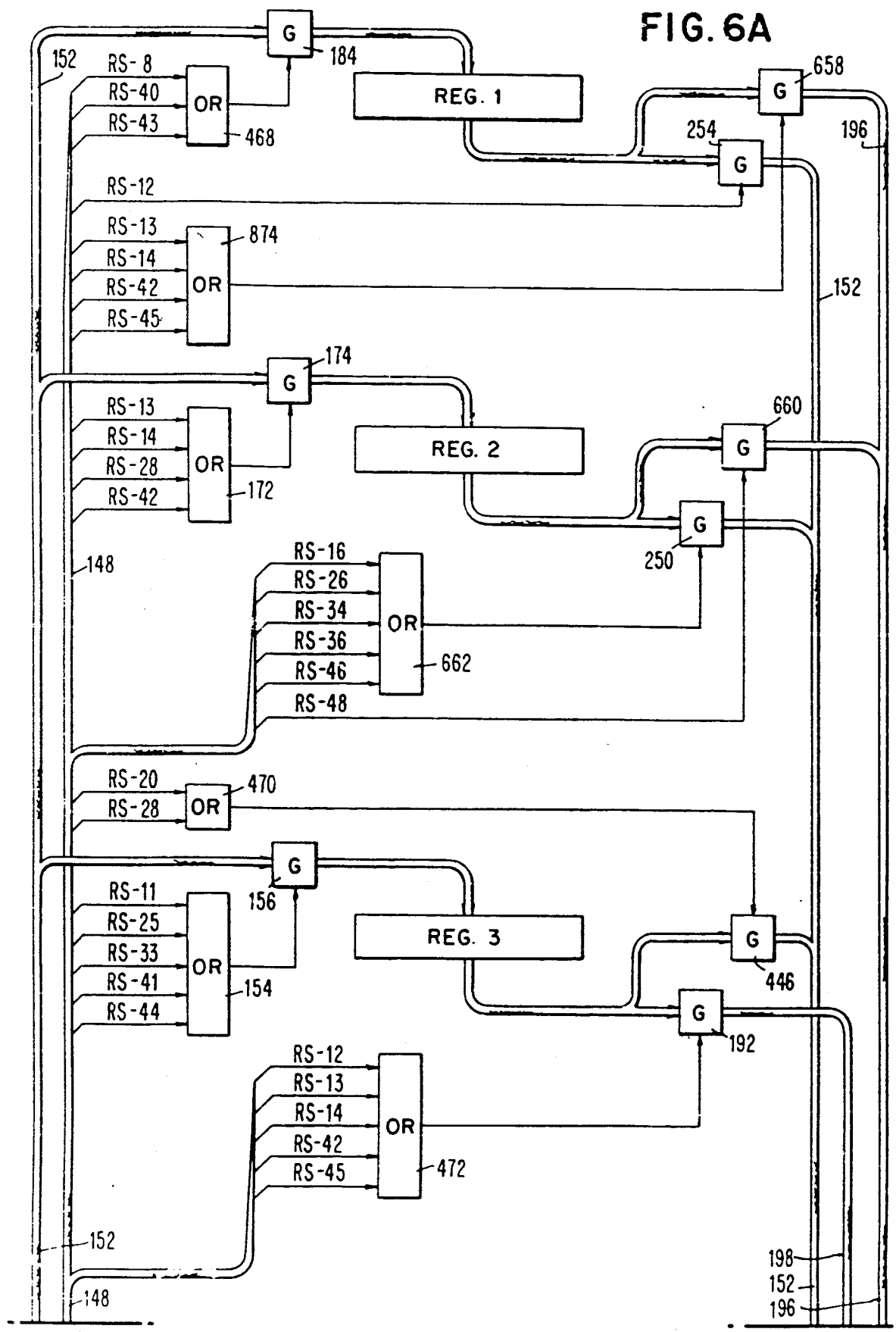
Figure 6B:
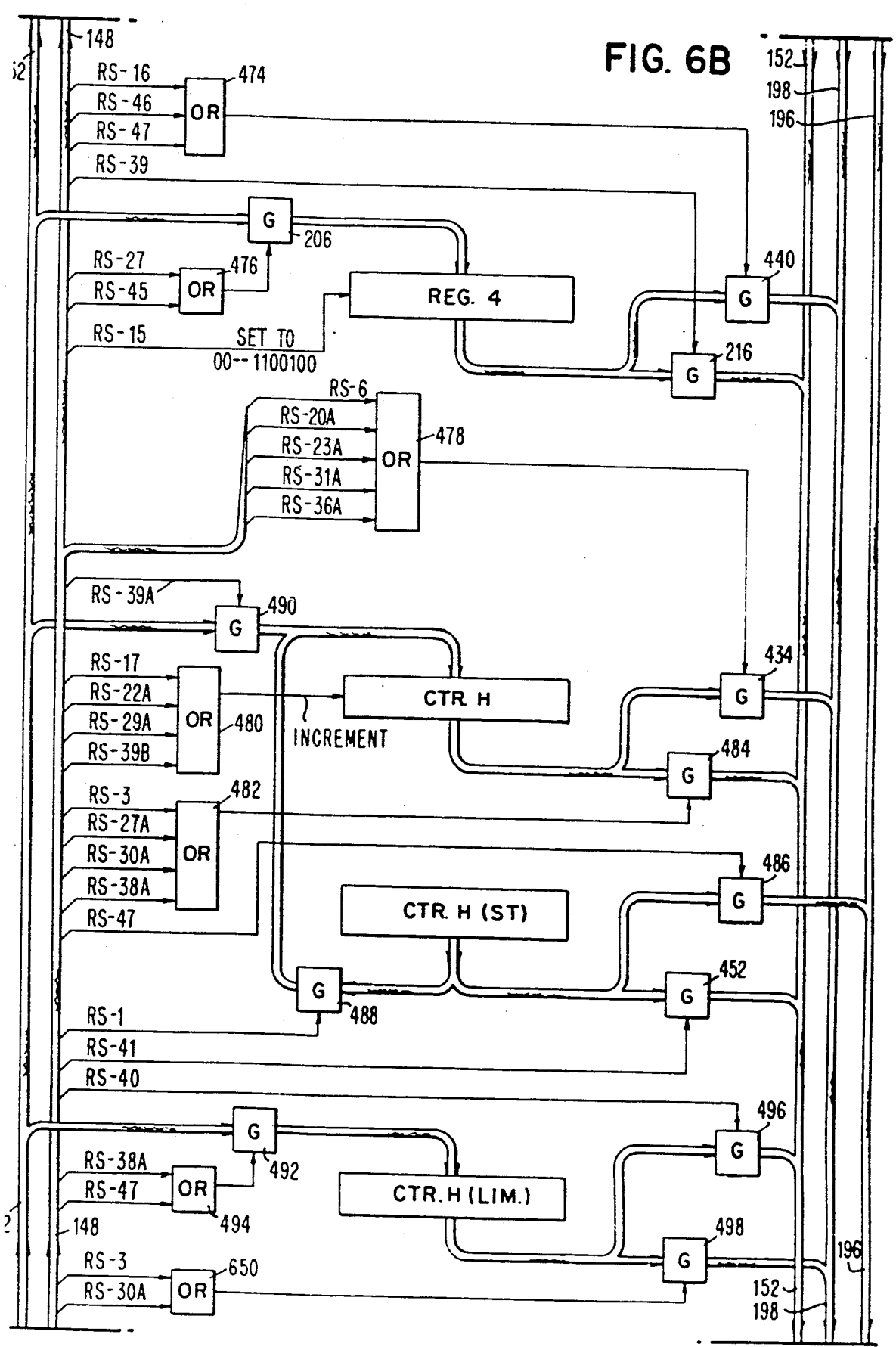
Figure 6C:
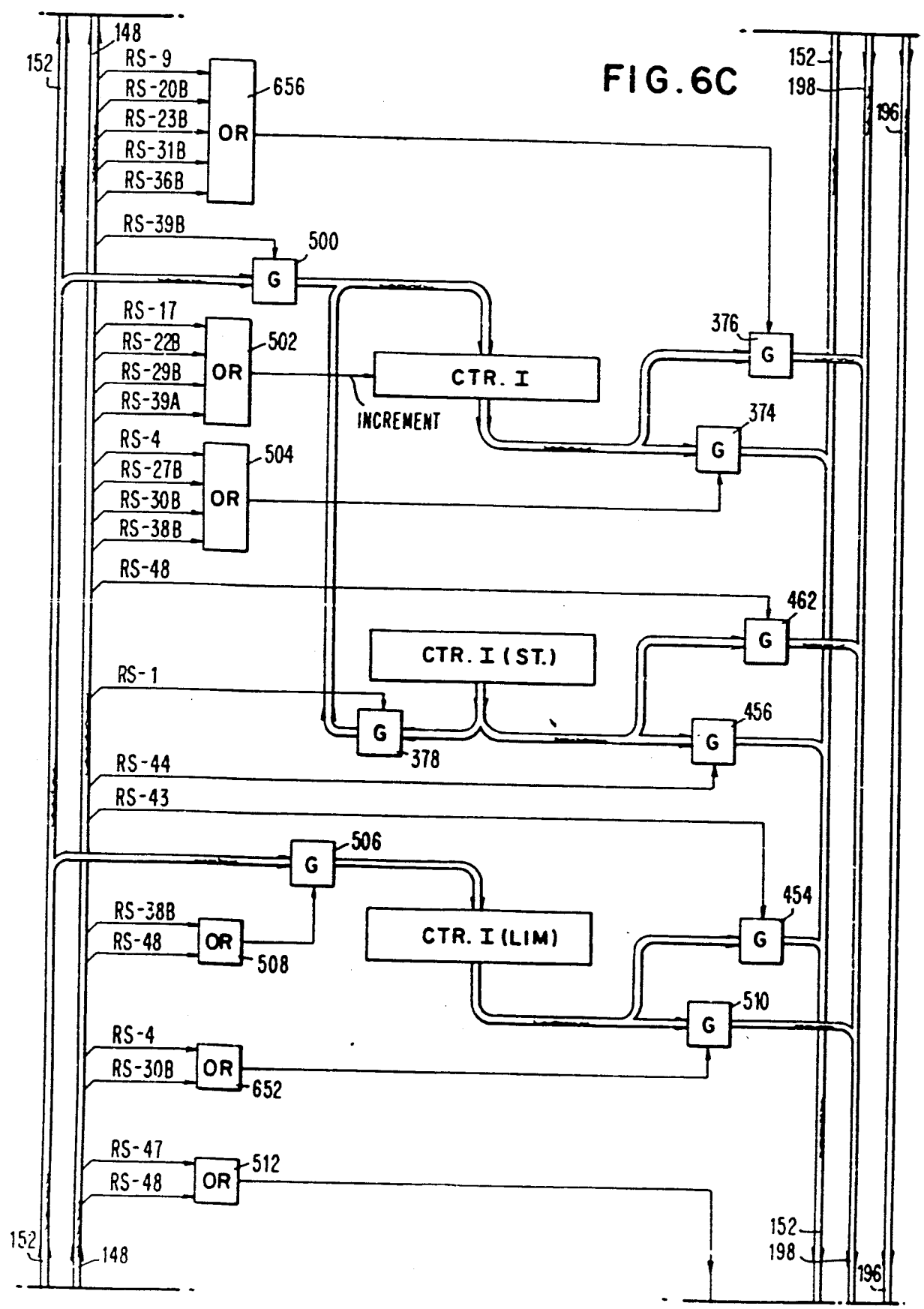
Figure 6F:
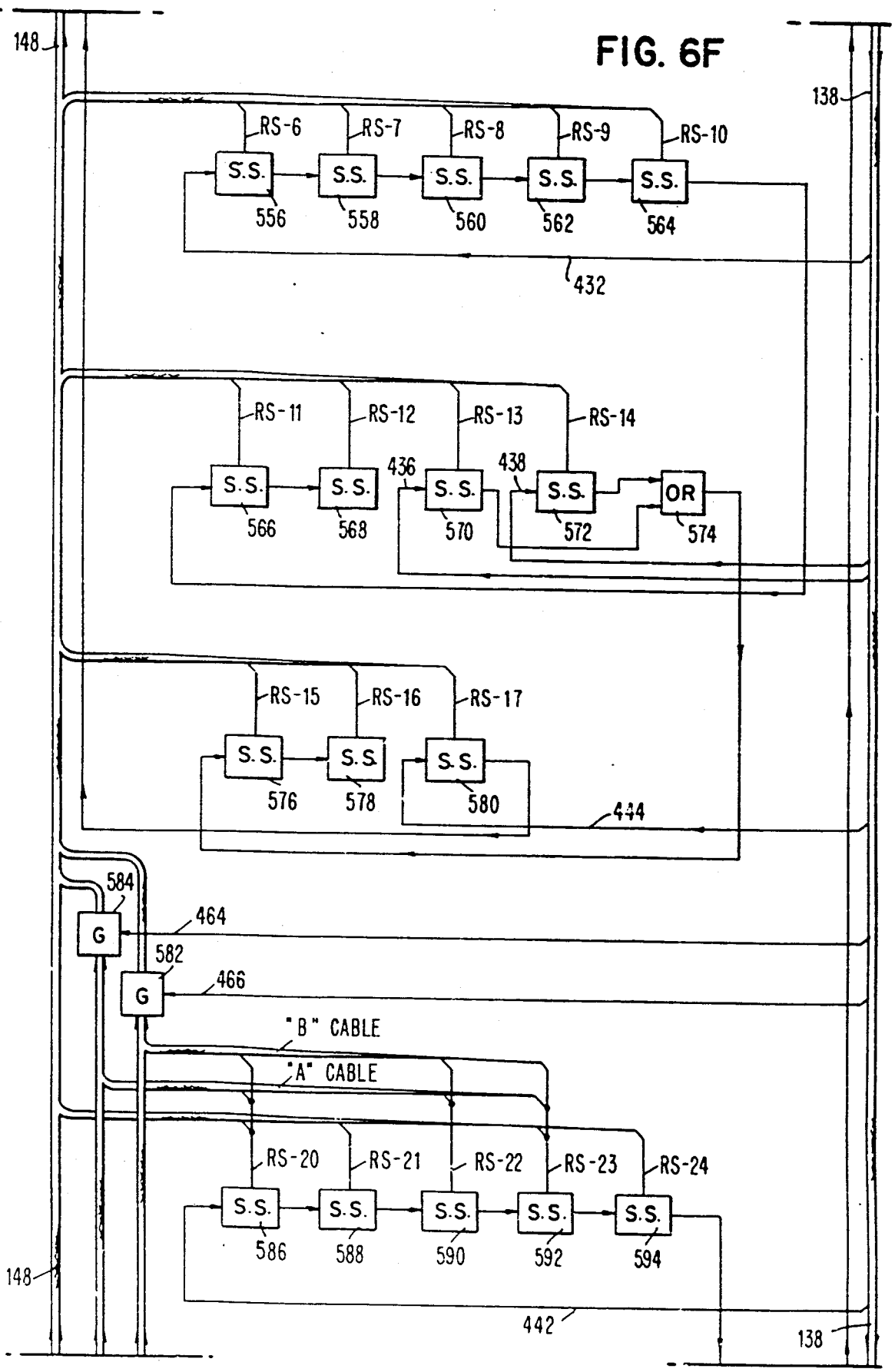
Figure 6G:
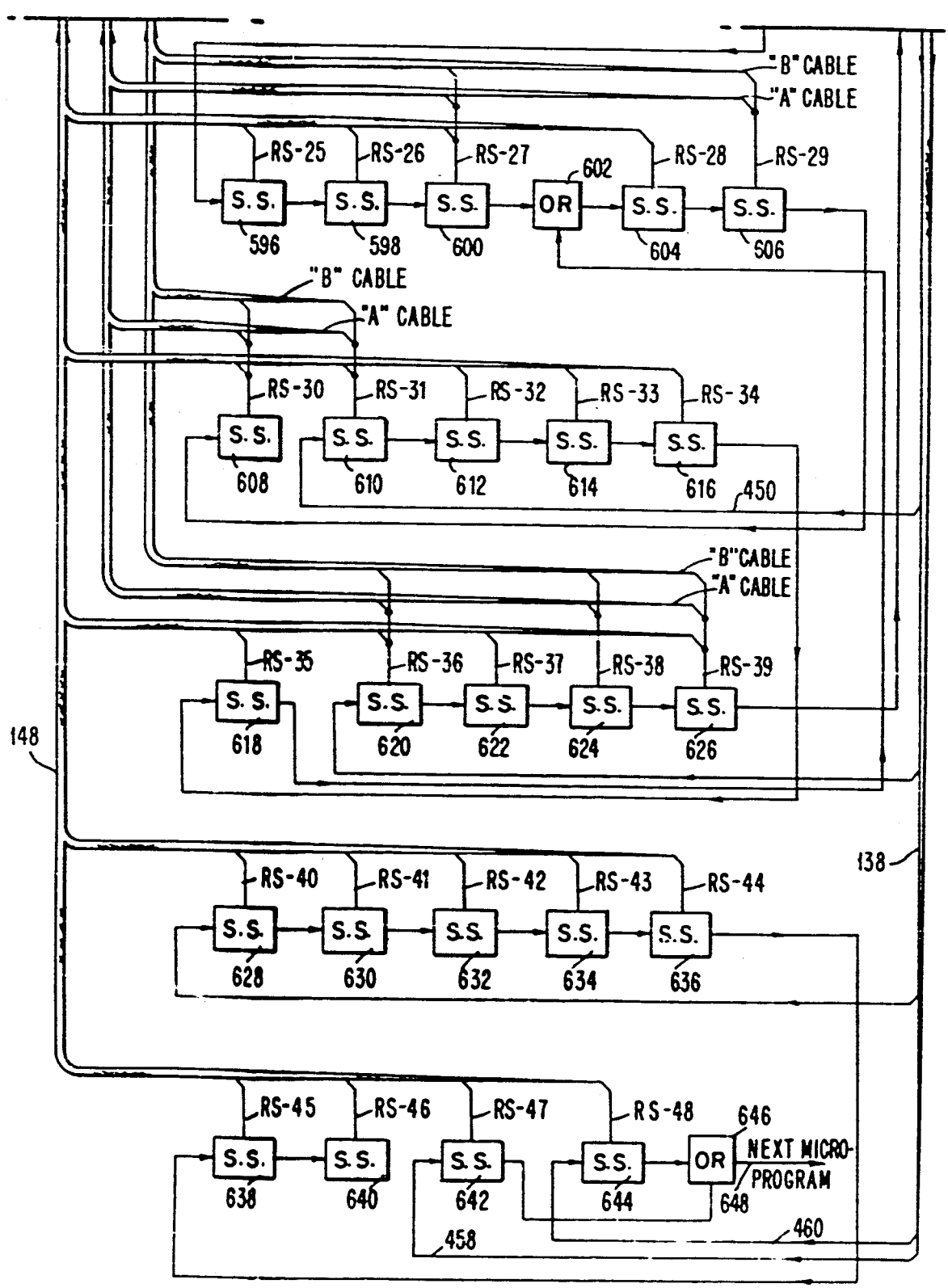
Figure 7A:
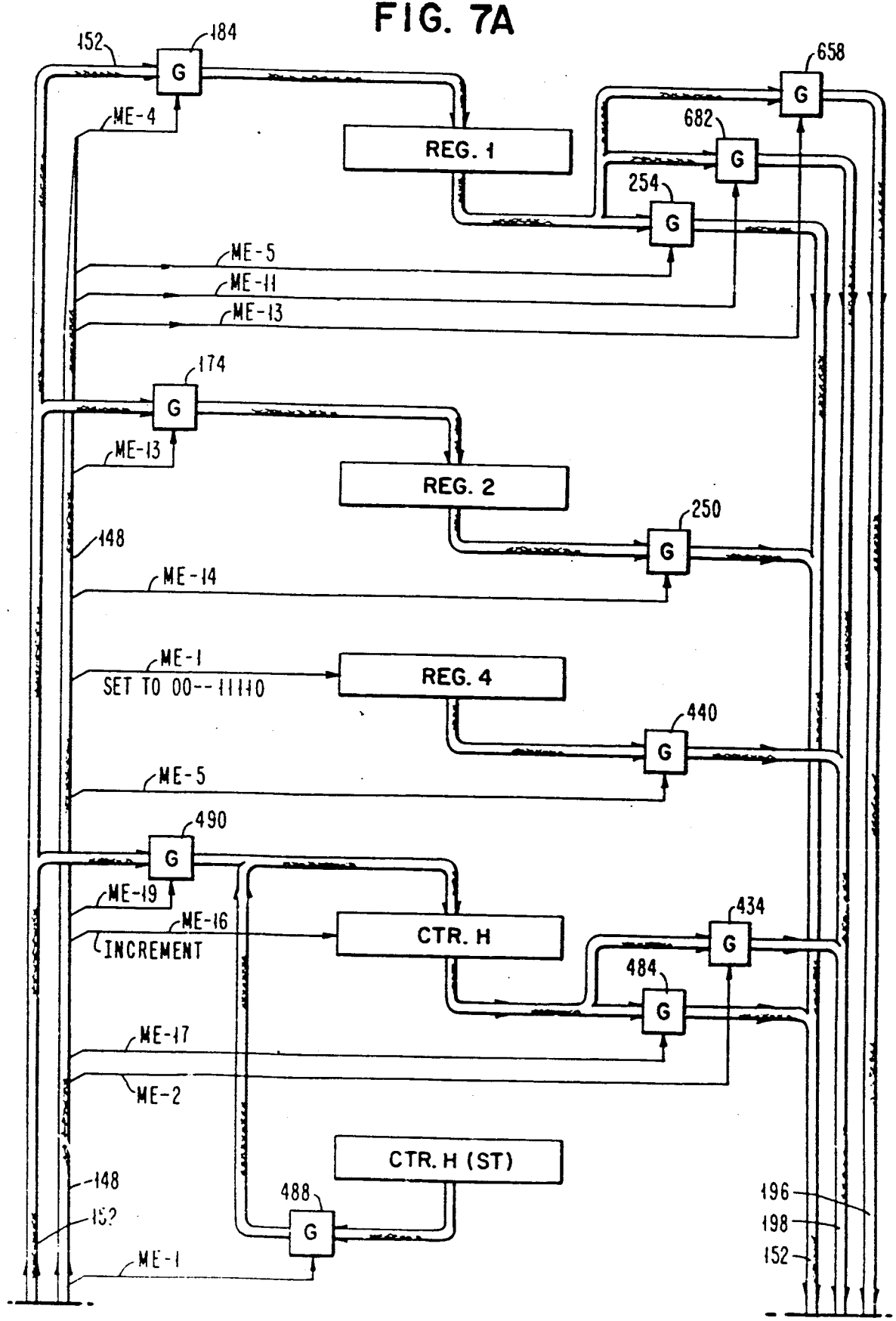
Figure 7C:
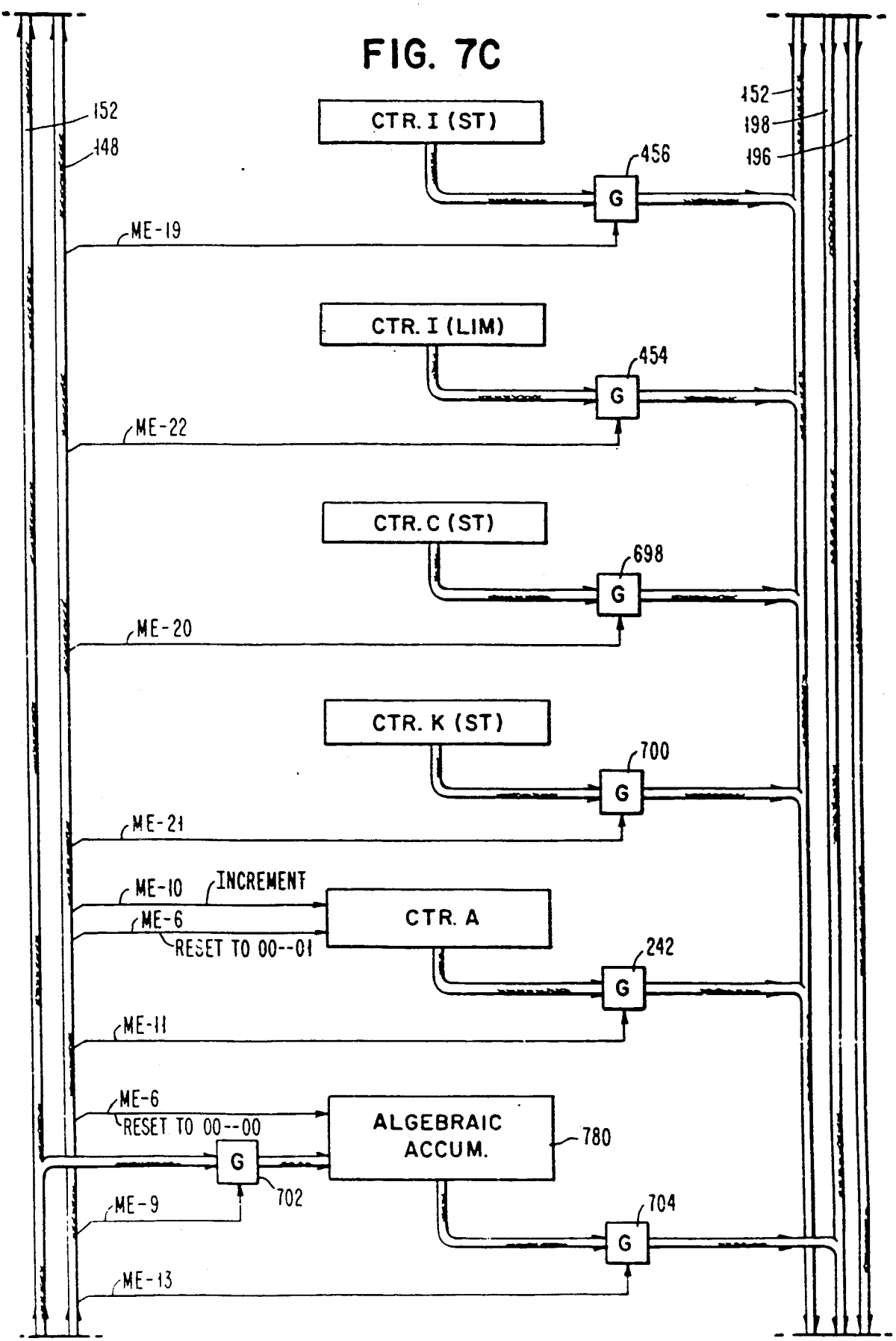
Figure 7D:
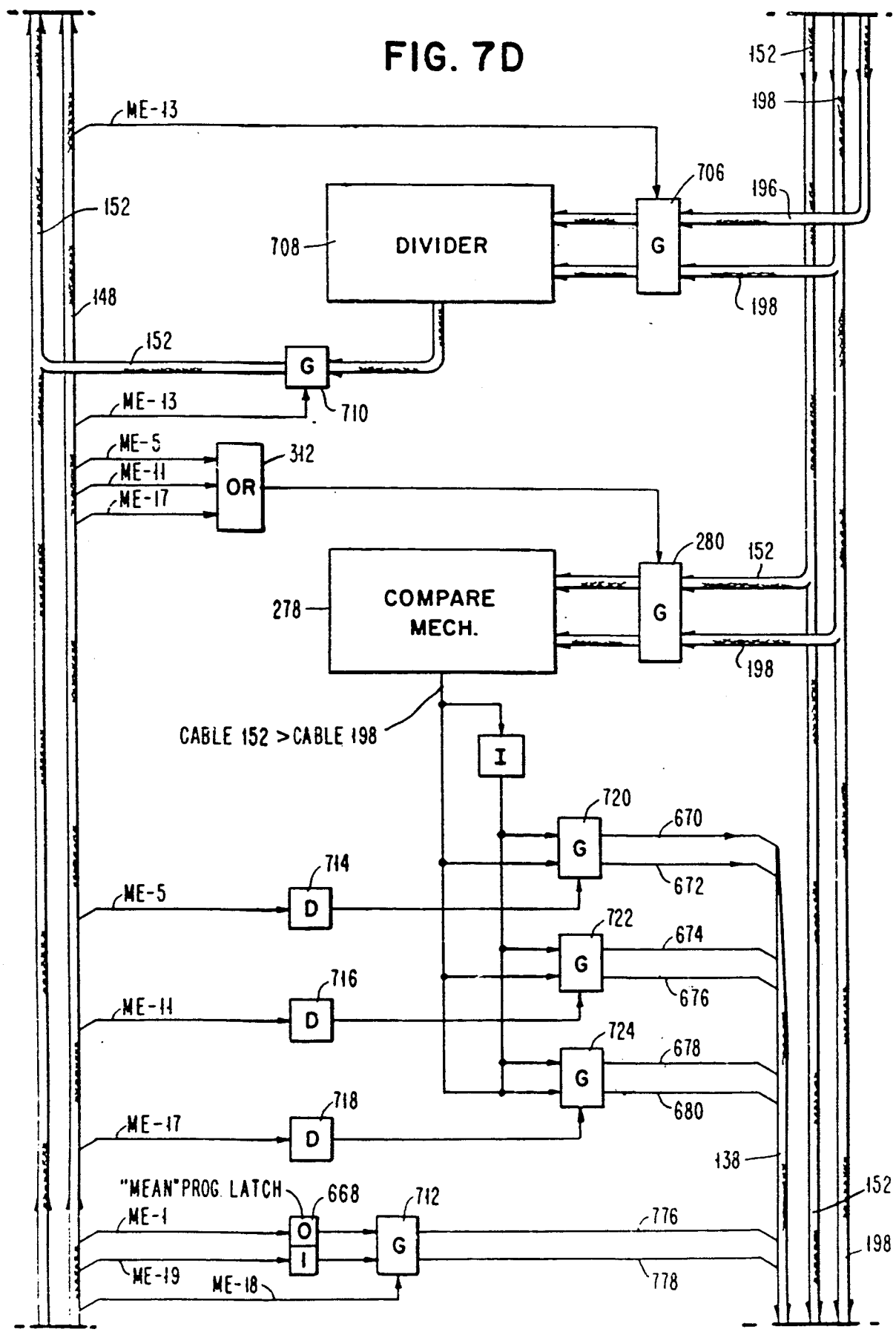
Figure 7E:
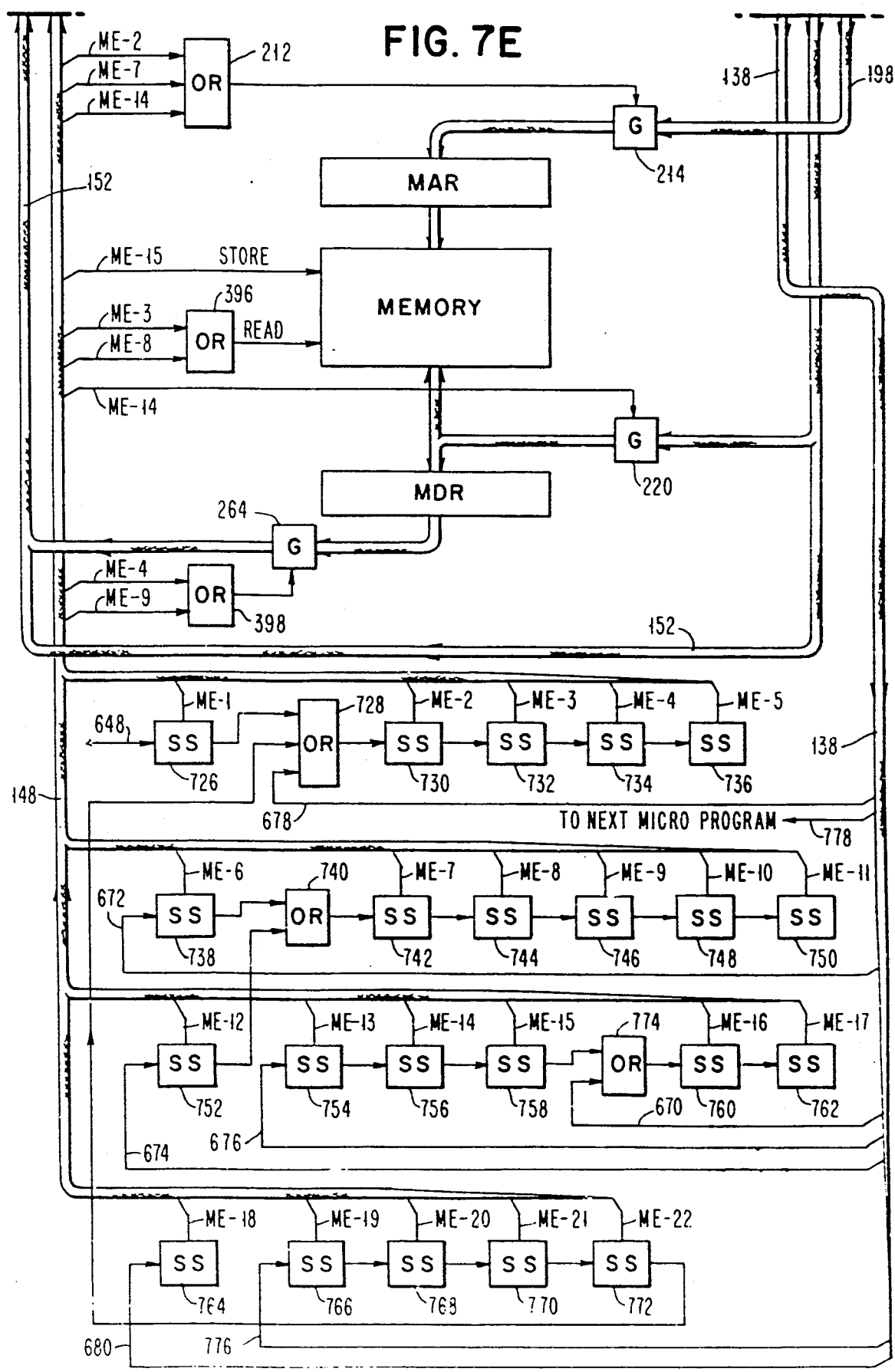

This subsystem is the portion of the presently disclosed handwriting analysis system which compares the sample or putative signature with the reference signature. It will be remembered from the previous description that the data for both the sample and reference signatures is in exactly the same format and is stored in the system memory as a result of the operation of the subsystems of FIGS. 2 through 7. The specific list utilized in the 'compare sample to reference' subsystem are the two clipped lists shown diagrammatically in FIG. 10C, the two revised segment lists shown diagrammatically in FIG. 10E and the two mean segment lists shown diagrammatically in FIG. 10F. It will be remembered that the clipped lists comprise the actual sampled second derivative values for both the sample and reference signatures which have passed through the quantization step or subsystem shown in FIGS. 4A through 4C. The revised segment lists are lists of segment pointers which actually point to addresses in the memory for the clipped list indicating where given segments start in both the sample and reference. As will be remembered these revised segment lists are the same length for the sample and the reference and are accessed in pairs for the sample and reference during the operation of this subsystem. In order to obtain the quantity $L_a$ or $L_b$ (length of segment), two consecutive members of the revised segment list are extracted and a subtraction is performed to give the length or number of sample points in a particular segment. Finally, the mean segment list, as will be remembered from the description of the subsystem shown in FIGS. 7A through 7E, is a list of computed mean values $M_a$ and $M_b$ which may vary from segment to segment. All other values and quantities utilized in the operation of the 'compare sample to reference' subsystem of FIG. 8 are computed by the arithmetic and logic circuitry of this subsystem together with the above referenced three pairs of lists.

As stated in the previous general description of the operation of the system, the actual comparison operation involves comparing the sample and reference signatures on a segment by segment basis wherein the best correlation value obtained for each segment comparison is the one retained and finally totalized by the system to obtain the final correlation value for the overall multisegmented signature. Basically, the only storage of data necessary between subsequent analysis steps for each segment pair is an accumulation or totalization of the maximum computed correlation value for said segment pair. This is done automatically by the system as will be apparent from the following general description and also the detailed description of the embodiment set forth for the subsystem in FIGS. 8A through 8O. The remainder of this description will concern itself with the multifaceted operations performed by this subsystem on each segment-compare operation.

The first step to be performed is the loading of the appropriate registers of the subsystem with segment pointers obtained from memory which are stored in the revised segment lists. The first or starting pointer for the reference segment is stored in the counter D(ST). And the starting pointer for the sample is stored in the counter E(ST). The subsystem clock causes the end pointer for both the reference and sample segments to be automatically gated as one input to a subtraction circuit, the other input to which is the beginning pointer which was stored in the Counters D(ST) and E(ST) respectively. This subtraction operation provides the segment length ($L_a$ and $L_b$) which are stored in Registers 1 and 2 for the reference and sample respectively. This initial segment information provides the basis for the subsequent test determinations and calculation performed by the subsystem.

Having performed the initial loading and calculation operations just described the system must then proceed to determine the total amount of shifting over which to calculate the cross correlation between the two segments which, as described previously, is one of the principal features of the present invention. Further detail relating to the way this is done will be set forth subsequently in this section. Then for each displacement case the system makes the necessary tests to determine which of eight possible boundary conditions exist for a given segment correlation routine. Depending upon the conclusions of this test one of six different hardware configurations of the subsystem is activated and for each displacement case the overlap between the reference and sample segment is determined as well as the adjusted mean values ($M^*_a$ and $M^*_b$).

Having computed these values the system then proceeds with the summation and correlation operations which comprise doing a complete cross correlation operation between the reference and sample segments with the stated condition of displacement and overlap. What this means is that the cross correlation is only done in the overlapped portion since, as is apparent, there is no cross correlation (i.e., correlation equals zero) for those portions of the two segments where there is no overlap. The system computes and totalizes a total correlation value for the segment with a given displacement and selects the maximum correlation value for that segment for all shifts and holds this value as a maximum segment correlation value which is subsequently totalized for all segments.

Having completed the analysis of one segment pair, (i.e., all displacement conditions for the sample and reference) the system then automatically proceeds to perform exactly the same operation on the next segment pair from the reference and sample list. This procedure continues until all segments pairs have been analyzed and the maximum correlation value accumulated whereupon the system causes the total accumulated correlation value to be produced and it is this total figure which represents the basic correlation output of the present system.

This figure may be utilized directly and compared against some statistically determined minimum value to render a final decision as to whether the putative signature is or is not valid. Since a correlation value of 1.0 is an exact match, an acceptance level of, say, 0.7 might be established as a rejection point for putative signatures. Then any compared correlation greater than 0.7 would result in the system approving the sample signature is valid and any correlation value below this level would be rejected as invalid. In the later case it is of course possible that a legitimate person has written the signature but wherein for some external reason the signatures do not correlate sufficiently to provide an acceptance. This is, of course, a problem with any signature verification system, it being noted with emphasis that it is believed that the present signature analysis and verification method is far superior to and much more reliable than any verification system heretofore existing in the art.

Having generally described the operations of the subsystem of FIG. 8 there will now follow a detailed functional description of the operation of the various portions of the subsystem with particular attention being given to the mathematical operations carried out and tests made which determine the routing of data and activation of subsequent portions of the subsystem.

As set forth above the first calculation which must be made is the total displacement of the segments with respect to each other for which the correlation is to be computed. This operation is performed in the illustrated embodiment in the following manner. The amount of the displacement is always determined as a fuction of the longer member of the segment pair and the shorter of the two segments is always shifted (in the positive direction initially) with respect to the longer member. The actual cross correlation is only done on the overlapped portions of the two segments in the given condition if displacement. That is, the accelerations are assumed to be zero outside of the segment interval.

In the present embodiment the magnitude of the reference segment is placed in register 1 and the magnitude of the sample segment is placed in register 2. A test is then made to see which segment is longer. Subsequently a test is made to see if the longer segment is greater than 30 time units (150 mscc.). If it is not, a zero will be automatically placed in the correlation accumulator as any segment this short is not considered to be statistically worth measuring.

If the longer segment pair member is greater than 30 units it is placed in a shift register and shifted two places to the right, zeros being placed in the vacated bit positions of the register as a result of the shift. What this in effect does is divide the magnitude of the longer member by four as will be understood by those skilled in the art. The number currently in the shift register represents the maximum shift or displacement which will occur during the subsequent cross correlation operations. Since it is convenient to shift by a uniform number of places (eight in the present embodiment) the three low order bits are set to zero which in effect causes the remaining displacement number to be an even multiple of eight. Thus, for example, if the number remaining in the shift register (in binary) after the above truncation is 0011000, it is evident that there will be three positive displacements and three negative displacements. These displacements will have the values of +24, +16, +8, 0, -8, -16 and -24. It should of course be understood that this is merely an example and that there may well be more displacements or fewer displacements depending on the particular size of the segment pair being considered at any given time and the size of the shift interval. However, regardless of the magnitude of the initial shift, the operation is always carried out exactly as described above in the present embodiment.

Having determined which segment is the longer, the amount of maximum displacement, and implicitly the number of shifts necessary to accomplish the desired number of correlation steps, the system must now determine the configuration of the segments to develop the necessary addresses in memory whereby only the necessary portions of the two segments are accessed and cross correlation operations performed thereon. Stated differently it must be determined at which point the accessing of the sample values in the clipped list begin and end and the point in memory where the values for the reference segment begin and end. Also the magnitude of the overlap i.e. the number of sampling points or values which are actually extracted and correlated must be determined in order to compute the values $M^*_a$ and $M^*_b$. The mathematical formulas for determining these values will be set forth subsequently.

As stated previously there are six subsystems within the subsystem of FIG. 8 which are identified by the operational sequences, CC, CB, CE, CF, CG, and CH. As will be apparent from the subsequent description these six subsystems are able to handle the eight possible boundary conditions which can occur with the three possible displacement conditions. These displacement conditions are a positive, a zero or a negative displacement. It may be seen from the following eight tables that with the positive displacement there are four possible boundary conditions, with the zero displacement there are two possibilities, and with the negative displacement there are also two possibilities, depending on the relative sizes of the segments.

The system determines by a set of tests which of the eight conditions apply, and automatically sets up data transfer paths which load the proper addresses in certain registers for control purposes as well as for accessing sample and reference segment data from memory and for determining how many of said accesses there will be. This latter determination is the above mentioned overlap figure.

Reference should now be made to the eight tables which follow. Each of these tables refers to a particular segment pair overlap condition. Each table has two linear vectors at the top thereof whose length indicates the number of sampling points or magnitude of a segment. The respective locations of the ends of each vector define the particular overlap condition being considered. Adjacent the end of each vector there is a counter designation which refers to a particular counter in the diagram of FIG. 8 where the address information relating to that particular point in the particular vector is ultimately stored. As will be apparent from the subsequent description some of this data is directly available from memory from the revised segment list and some must be generated utilizing the known displacement and/or the previously generated lengths of the segments as stored in registers 1 or 2.

Appearing below the two vectors is a segment of the table designated as A and the material immediately following this comprises a mathematical or logical explanation of the way that the contents of the counter G, the counter G(LIM), the counter F, and the counter F(LIM), are determined. An illustrative example of the meaning of these formulas immediately follows the tables.

Part B of each table includes a second set of formulas whereby it is specifically shown how the values L, OV, $M_a^*$ and $M_b^*$ are computed for each of the cases. Experience has shown that if this calculation is not made extremely erroneous results are possible in certain instances.

TABLE 1

CTR.G  | Sample (Reg. No. 2) / $L_a$ |

CTR.F  | Reference (Reg. No. 1) / $L_b$ | CTR.F(LIM)

A

Disp. zero; Register No. 2 > Register No. 1
(Use CTR.F for Control)

CTR.G = CTR.E(ST)

CTR.F = CTR.D(ST)

CTR.F(LIM) = CTR.D(ST) + Register No. 1

B

$L = L_a$ $OV = L_b$ $M_a^* = \frac{L_a}{L_a} M_a = M_a$ $M_b^* = \frac{L_a}{L_b} M_b$

TABLE 2

CTR.F  | Reference (Reg. No. 1) / $L_a$ |

CTR.G  | Sample (Reg. No. 2) / $L_b$ | CTR.G(LIM)

A

Disp. zero; Register No. 2 < Register No. 1
(Use CTR.G for Control)

CTR.F = CTR.D(ST)

CTR.G = CTR.E(ST)

CTR.G(LIM) = CTR.E(ST) + Register No. 2

B

$L = L_a$ $OV = L_b$ $M_a^* = \frac{L_a}{L_a} M_a = M_a$ $M_b^* = \frac{L_a}{L_b} M_b$ Same as Case 1

TABLE 3

CTR.E(ST)  | ↓CTR.G Sample (Reg. No. 2) / $L_a$ |

DISP. →| pos. |←

CTR.F  | Reference (Reg. No. 1) / $L_b$ | CTR.F(LIM)

A

DISP. positive; (Register No. 2 − DISP.) > Register No. 1

CTR.F = CTR.D(ST) (Use CTR.F for Control)

CTR.G = CTR.E(ST) + DISP.

CTR.F(LIM) = CTR.F + Register No. 1)

B

$L = L_a$ $OV = L_b$

TABLE 3-continued $M_a^* = \frac{L_a}{L_a} M_a = M_a$ $M_b^* = \frac{L_a}{L_b} M_b$ Same as Case 1 and 2

TABLE 4

CTR.D(ST) | ↓CTR.F Reference (Reg. No. 1) / $L_a$ |

DISP. →| pos. |←

CTR.G | Sample (Reg. No. 2) / $L_b$ | CTR.G(LIM)

A

DISP. positive; (Register No. 1 − DISP.) > Register No. 2

CTR.G = CTR.E(ST) (Use CTR.G for Control)

CTR.F = CTR.D(ST) + DISP.

CTR.G(LIM) = (CTR.G + Register No. 2

B

$L = L_a$ $OV = L_b$ $M_a^* = \frac{L_a}{L_a} M_a = M_a$ $M_b^* = \frac{L_a}{L_b} M_b$ Same as Case 1, 2 and 3

TABLE 5

CTR.E(ST) | ↓CTR.G Sample (Reg. No. 2) / $L_a$ | CTR.G(LIM)

DISP. →| pos. |←

CTR.F | Reference (Reg. No. 1) / $L_b$ |

A

DISP. positive; (Register No. 1 + DISP.) > Register No. 2

CTR.F = CTR.D(ST) (Use CTR.G for Control)

CTR.G = CTR.E(ST) + DISP.

CTR.G(LIM) = CTR.E(ST) + Register No. 2

B

$OV = L_b - DISP.$ $L = L_b + DISP.$ $M_a^* = \frac{L_a}{L_b + DISP.} M_a$ $M_b^* = \frac{L_a}{L_b + DISP.} M_b$

TABLE 6

CTR.D(ST) | ↓CTR.F Reference (Reg. No. 1) / $L_a$ | CTR.F(LIM)

→| pos. |←

TABLE 6-continued

DISP.

CTR.G | Sample (Reg. No. 2) / $L_a$ |

A

DISP. positive; (Register No. 2 + DISP.) > Register No. 1

CTR.G = CTR.E(ST) (Use CTR.F for Control)

CTR.F = CTR.D(ST) + DISP.

CTR.F(LIM) = CTR.D(ST) + Register No. 1

B $OV = L_a - DISP.$ $L = L_b + DISP.$ $M_a^* = \frac{L_a}{L_b + DISP.} M_a$ $M_b^* = \frac{L_b}{L_b + DISP.} M_b$

TABLE 7

CTR. G | Sample (Reg. No. 2) / $L_a$ |

DISP. →| neg |←

CTR.D(ST) | ↓ Reference (Reg. No. 1) / $L_b$ | CTR.F(LIM)
         CTR.F

A

DISP. negative; Register No. 2 > Register No. 1

CTR.G = CTR.E(ST) (Use CTR.F for Control)

CTR.F = CTR.D(ST) + DISP.

CTR.F(LIM) = CTR.D(ST) + Register No. 1

B $OV = L_b - DISP.$ $L = L_a + DISP.$ $M_a^* = \frac{L_a}{L_a + DISP.} M_a$ $M_b^* = \frac{L_b}{L_a + DISP.} M_b$

TABLE 8

CTR.F | Reference (Reg. No. 1) / $L_a$ |

DISP. →| neg |←

CTR.E(ST) | ↓ Sample (Reg. No. 2) / $L_b$ | CTR.G(LIM)
          CTR.G

A

DISP. negative; Register No. 1 > Register No. 2

CTR.F = CTR.D(ST) (Use CTR.G for Control)

CTR.G = CTR.E(ST) + DISP.

CTR.G(LIM) = CTR.E(ST) + Register No. 2

B $OV = L_b - DISP.$ $L = L_a + DISP$

TABLE 8-continued $M_a^* = \frac{L_a}{L_a + DISP.} M_a$ $M_b^* = \frac{L_b}{DISP.} M_b$ Same as Case 7

To explain the meaning of the above eight tables which describe graphically the eight possible segment boundary conditions which can occur during shifting, reference will again be made to the portion of the description just preceding the tables wherein it was explained that for an initial shift condition, the maximum positive displacement value is determined. In the above example, it was assumed to be +24. It will be noted that with a positive displacement it is possible that any one of the tables 3, 4, 5, or 6 could apply. It will also be noted that table 3 is like table 4, other than the fact that the reference and sample segments are reversed. However, the shorter of the two segments when displaced ends before the end of the longer of the two segments. Conversely, in tables 5 and 6, the end of the shorter of the two segments occurs after the end of the longer of the two segments. These situations are significant in determining the amount these two segments overlap, (OV), which is to be cross-correlated by the system. What must be done in each instance is to make a test based on the known displacement condition, i.e., positive, zero or negative, and also based on the known segment lengths, to appropriately load the four counters designated as CTR.F, CTR.F(LIM), CTR.G, and CTR.G(LIM). As was stated previously, the two counters designated as CTR.E(ST) and CTR.D(ST) are loaded from the revised segment list in memory and the displacement which was just computed is known and stored in an appropriate register. Similarly, registers 1 and 2 have been appropriately computed and loaded as described previously with the vector magnitude values $L_a$ and $L_b$.

The first line in each portion of table 3A states the logic conditions or tests which the system makes to determine which of the cases apply. Thus, on the first line of table 3A it is stated that the displacement is positive and that the logical expression (register No. 2 - disp.) ≥ register No. 1 holds. If this test is made affirmatively, the condition existing for table 3 (case 3) is present. The system registers are then loaded as specified in the remainder of table 3A. Thus, CTR.F is loaded with the contents of CTR.E(ST). Similarly, CTR.G is loaded with the result of the arithmetical addition of the CTR.E(ST) + disp. Finally, counter CTR.F(LIM) is loaded with the arithmetical addition of CTR.F + the contents of register No. 1. The parenthetical expression in table 3A (use CTR.F for control) means that during the actual correlation operation the sample is accessed from memory beginning at the address stored in counter G, the reference is accessed beginning at the address stored in counter F and these two counters are incremented after each access from the clipped list stored in memory until the number in CTR.F equals the number in CTR.F(LIM). Thus, only the desired portions of the two segments are accessed and correlated.

Exactly the same process occurs for any of the other eight cases. It is noted in passing that tables 1 and 2 which relate to case 1 and 2 are for the condition of zero displacement wherein the segment $L_b$ is known to be the shortest and is always on the bottom. Therefore, it must always end before the longer segment $L_a$. The same is true for cases 7 and 8 (tables 7 and 8) wherein for a condition of negative displacement the bottom segment will always end before the longer segment since by definition it is starting at an earlier reference point and is itself shorter than $L_a$.

A diagrammatic representation of these logical tests which may be very conveniently and straightforwardly made by the logic disclosed in the subsystem is shown in Table 9.

TABLE 9

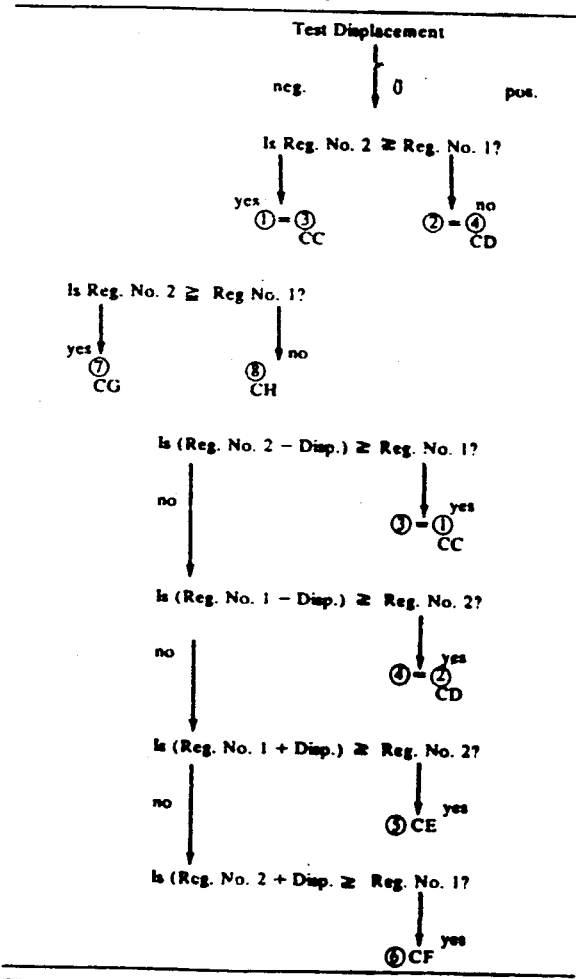

Thus, it may be seen that for the condition of negative displacement there are two possible cases, ⑦ and ⑧, and similarly for a displacement of zero, there are the two possible cases ① and ②. For the condition of positive displacement, there are four conditions designated by ③, ④, ⑤ and ⑥. It will be noted that the test made to determine ⑥ does not actually have to be made but may be logically taken from the "no" decision for the immediately preceding test since the logical condition leading to ⑥ is the only other possibility which exists. It will also be noted that adjacent each of the case 8 designations in table 9, there are the designations CC, CD, CE, CF, CG and CH. These refer to the six subsystems which are actuated in response to the tests designated by table 9. As will be clearly understood, they set up the logical sequences which result in the proper loading of the registers CTR.F, CTR.G, CTR.F(LIM), and CTR.G(LIM). These subsystems also compute the quantities L, OV, $M_a$ * and $M_b$ * which will vary, depending upon the particular case involved. It should be noted at this time that case ① and case ② are identical in practical effect to case ③ and case ④ respectively. This is because the displacement is zero, therefore the logical equations for case ① and case ② are the same as for case ③ and case ④ when a zero is substituted for disp. in the equations. For this reason, the same subsystem, i.e., CC and CD may be utilized for these two situations.

Referring now to the B portion of each of the Tables 1 through 8, it will be noted that in each case the quantities L, OV, $M_a$*, and $M_b$ * are logically derived. The quantity L denotes the magnitude of the combined vectors $L_a$ and $L_b$ minus the overlap (OV). Stated differently, it is a measure of the distance between the left-most vector starting address and the right-most vector vending address with the two vectors shifted relaive to each other. Looking at the vector diagram on Table 1 where the displacement equals zero, it may be seen by inspection that L equals the quantity $L_a$. Using the general formula $L = L_a + L_b - OV$, this becomes $L = L_a + L_b - L_b = L_a$ because the overlap in this case equals $L_b$.

In the example of Table 7, $L = L_a + disp$. It will be seen that this magnitude is equal to the left-most vector point which in this case is the quantity stored in CTR.D(ST) and the right-most point which is the end of the upper vector $L_a$. In this case, since the displacement is known and the magnitude of the upper vector $L_a$ has been previously determined and stored in register 2, the subsystem computes the value L by adding $L_a$ and the displacement value.

The overlap quantity OV is similarly obtained in this case by subtracting the displacement from $L_b$. The quantities OV and L are computed in each case in the present subsystem in accordance with the mathematical relationships set forth in Tables 1 through 8. It will, of course, be understood that they could readily be computed utilizing other features such as end addresses for both the reference and sample, assuming of course suitable registers were provided therefor.

The two other quantities that must be specifically computed by the subsystems CC through CH are the quantities $M_a$ * and $M_b$*. Although the mathematical basis for the computation is identical in all cases, the specific quantities which must be utilized in the subsystem to allow a proper determination of these quantities varies considerably depending on which of the cases of Tables 1 through 7 apply. It will be noted in a number of these tables that it is specifically stated that the computations in Part B are identical. Thus, it will be noted that all of the quantities L, OV, $M_a$*, and $M_b$ * are all computed using exactly the same known values. The individual subsystems which take care of the particular cases automatically compute these four quantities in the same way for these four cases.

The reason that the two quantities $M_a$ * and $M_b$ * must be computed is to adjust the "mean" function $M_a$ and $M_b$ for that portion of a given segment where it is not desirable to cross-correlate due to the fact that there is no overlap of the vectors and the additional terms would be zero. This in effect alters the dc level of the mean for in effect the quantized second derivative values are forced to be zero throughout the unoverlapped portion with an attendant shift in the dc level M.

GENERAL DESCRIPTION OF THE SUBSYSTEM OF FIG. 9

Figure 8A:
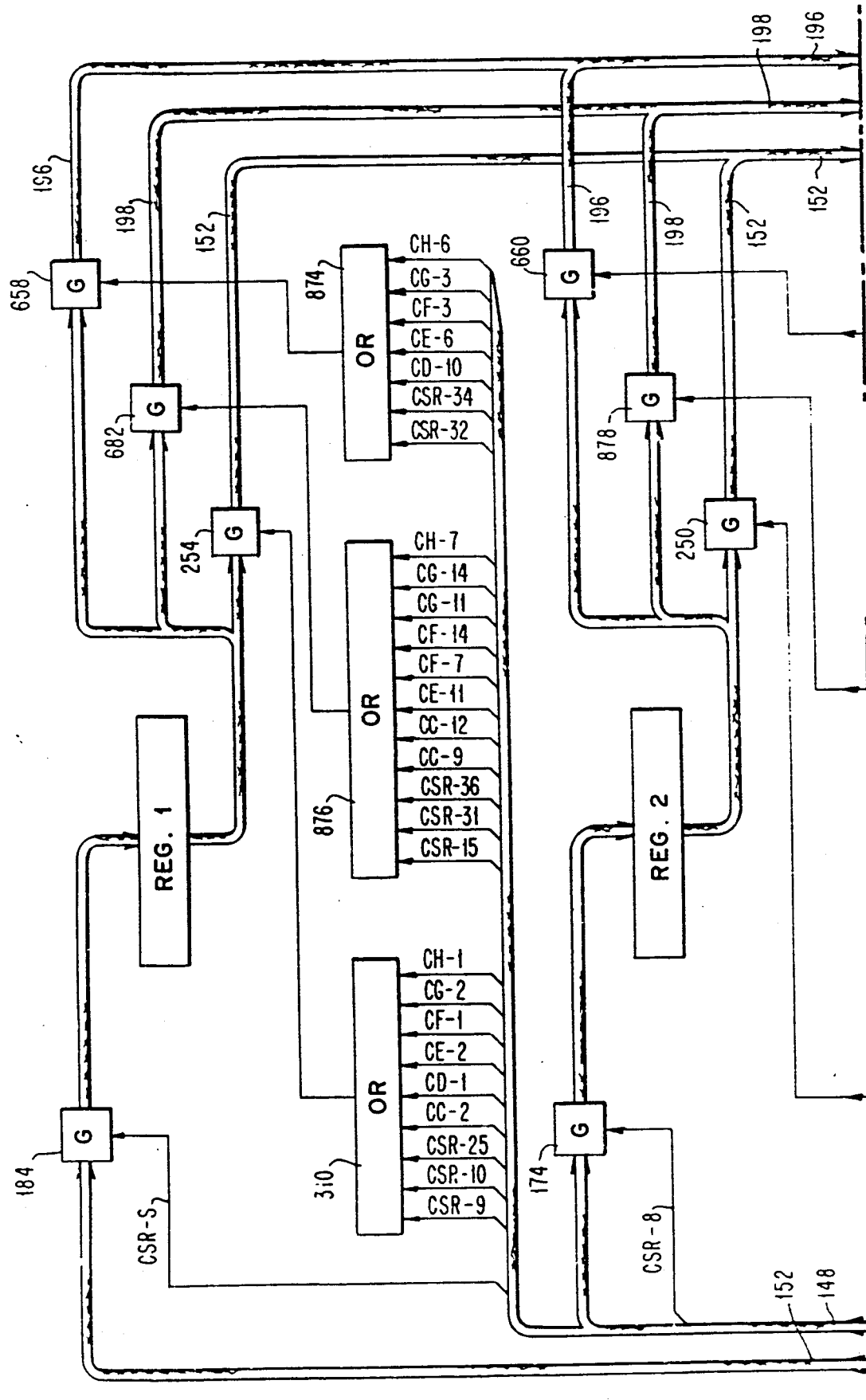
FIGS. 8A through 8O comprise a combination logical and functional diagram of the subsystem of the present invention which performs the actual comparison between the sample and reference signatures utilizing a number of the tables previously prepared by the subsystems set forth in FIGS. 2 through 7.
Figure 8C:
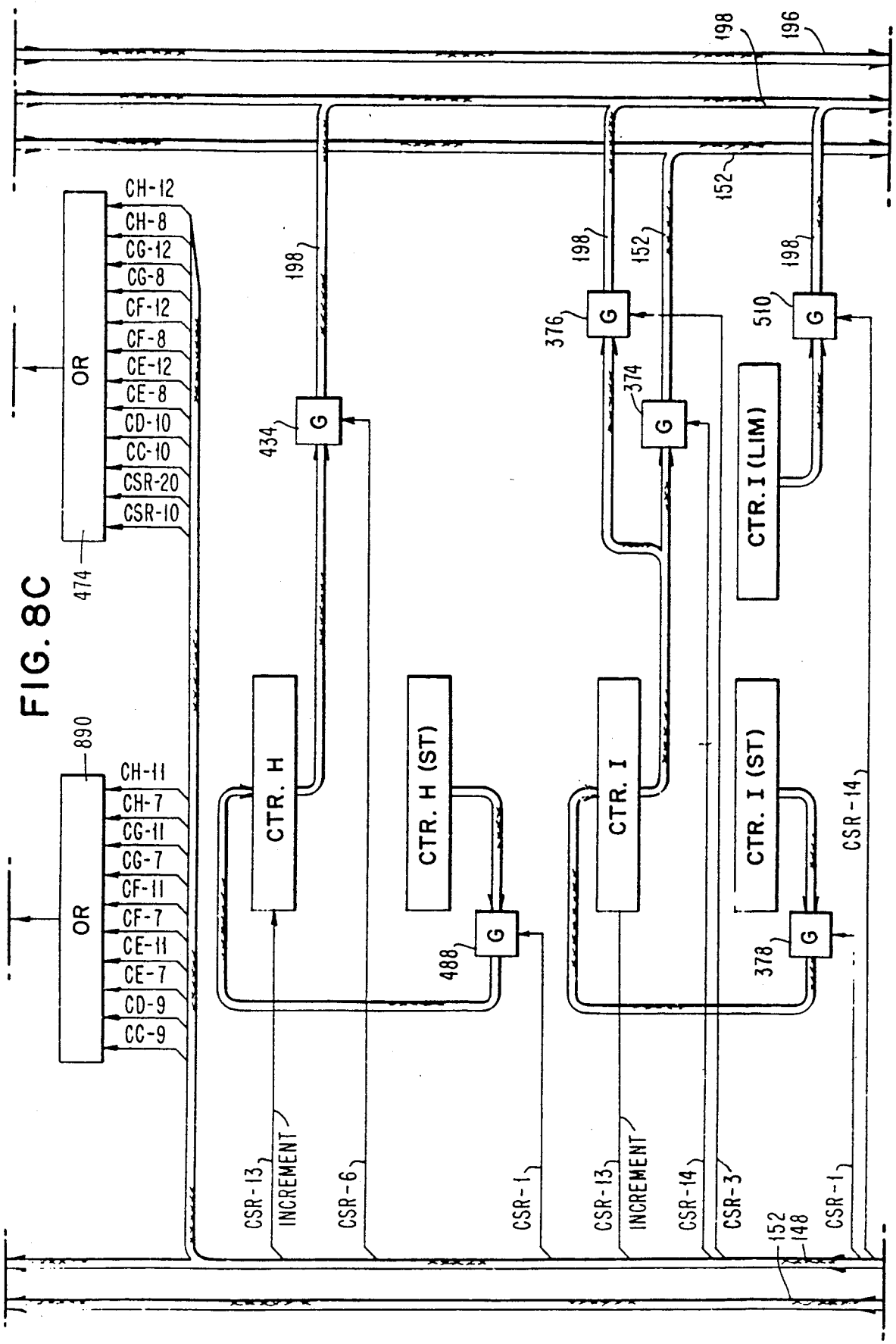
Figure 8D:
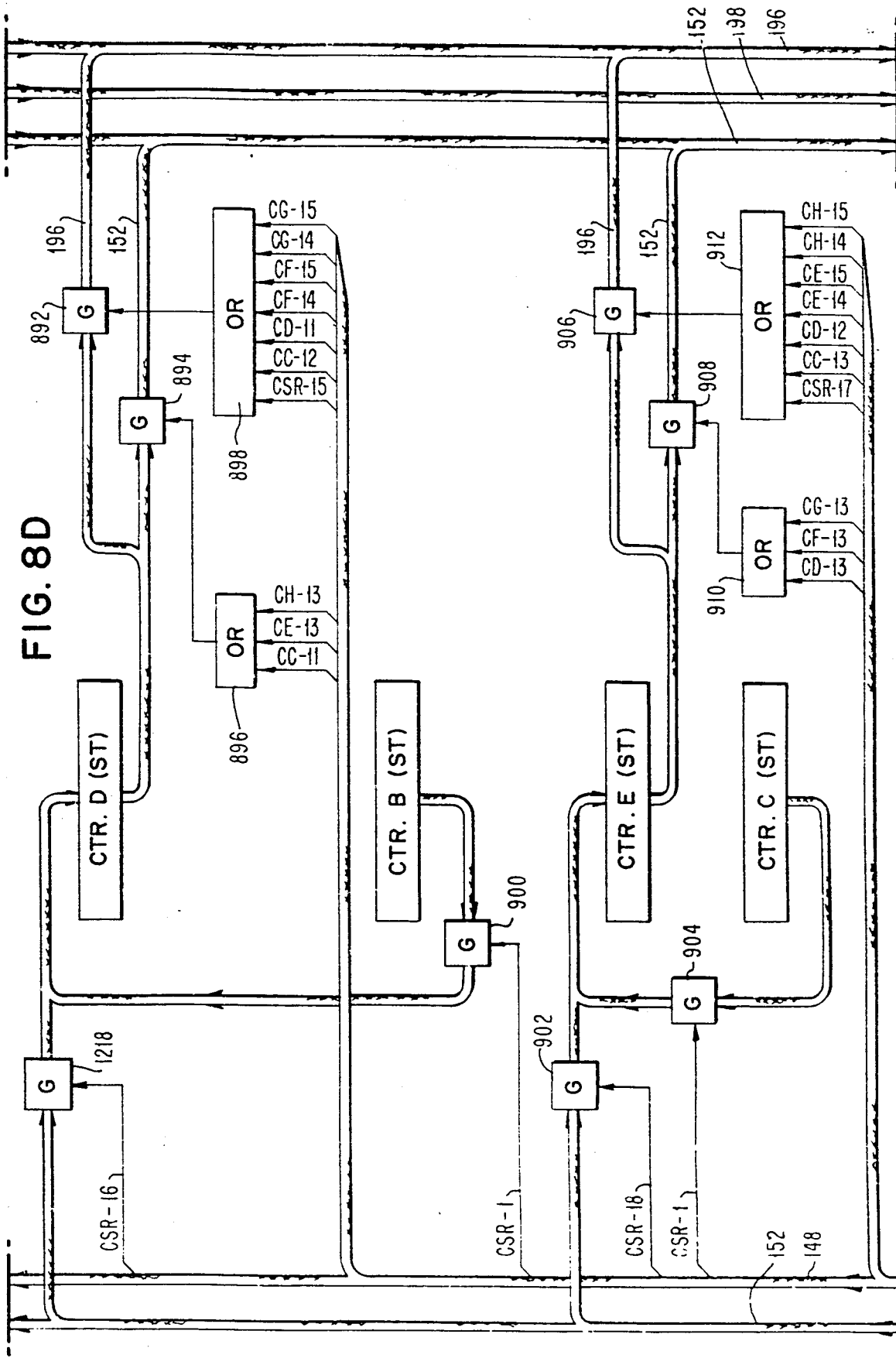
Figure 8E:
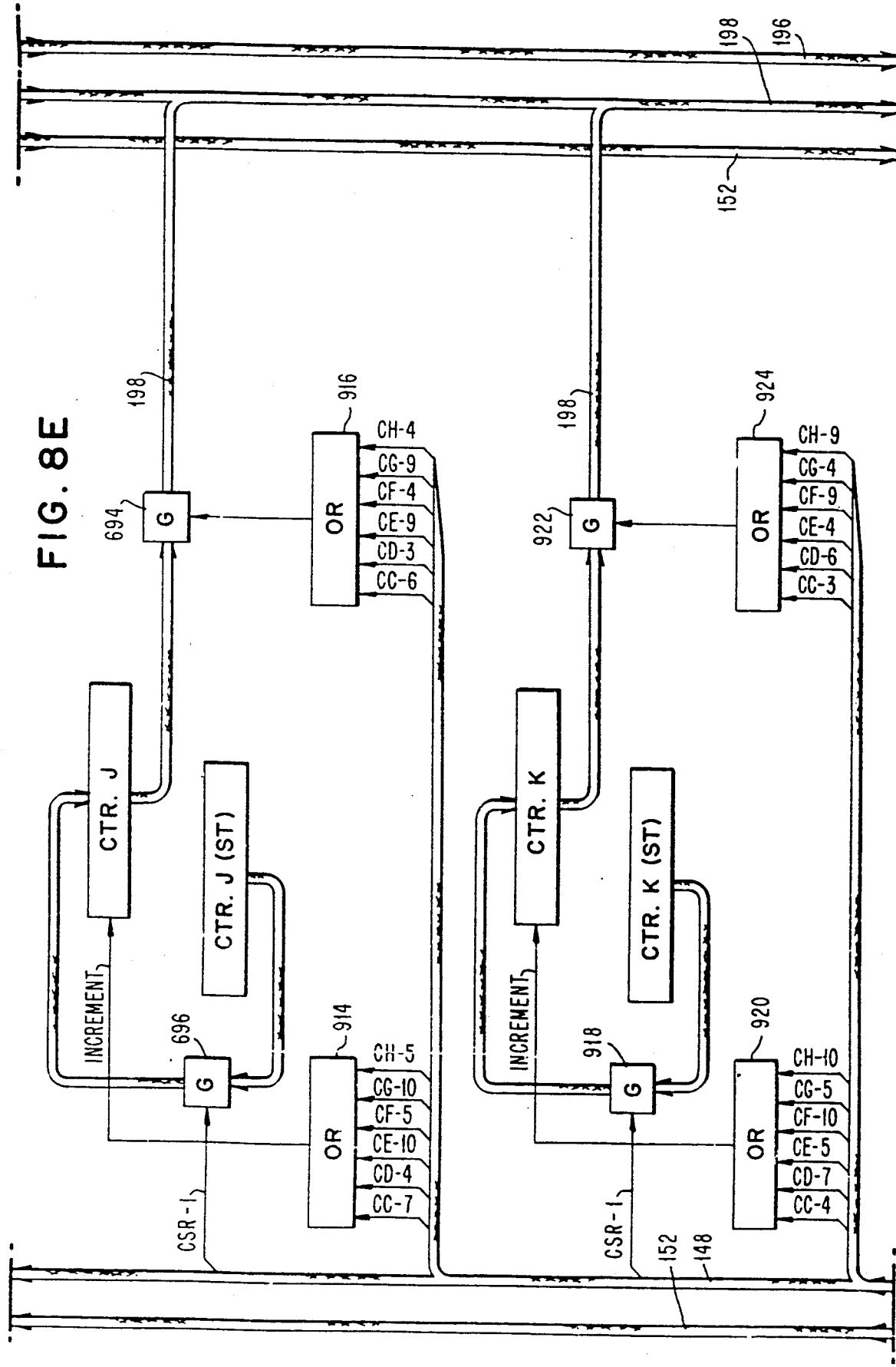
Figure 8F:
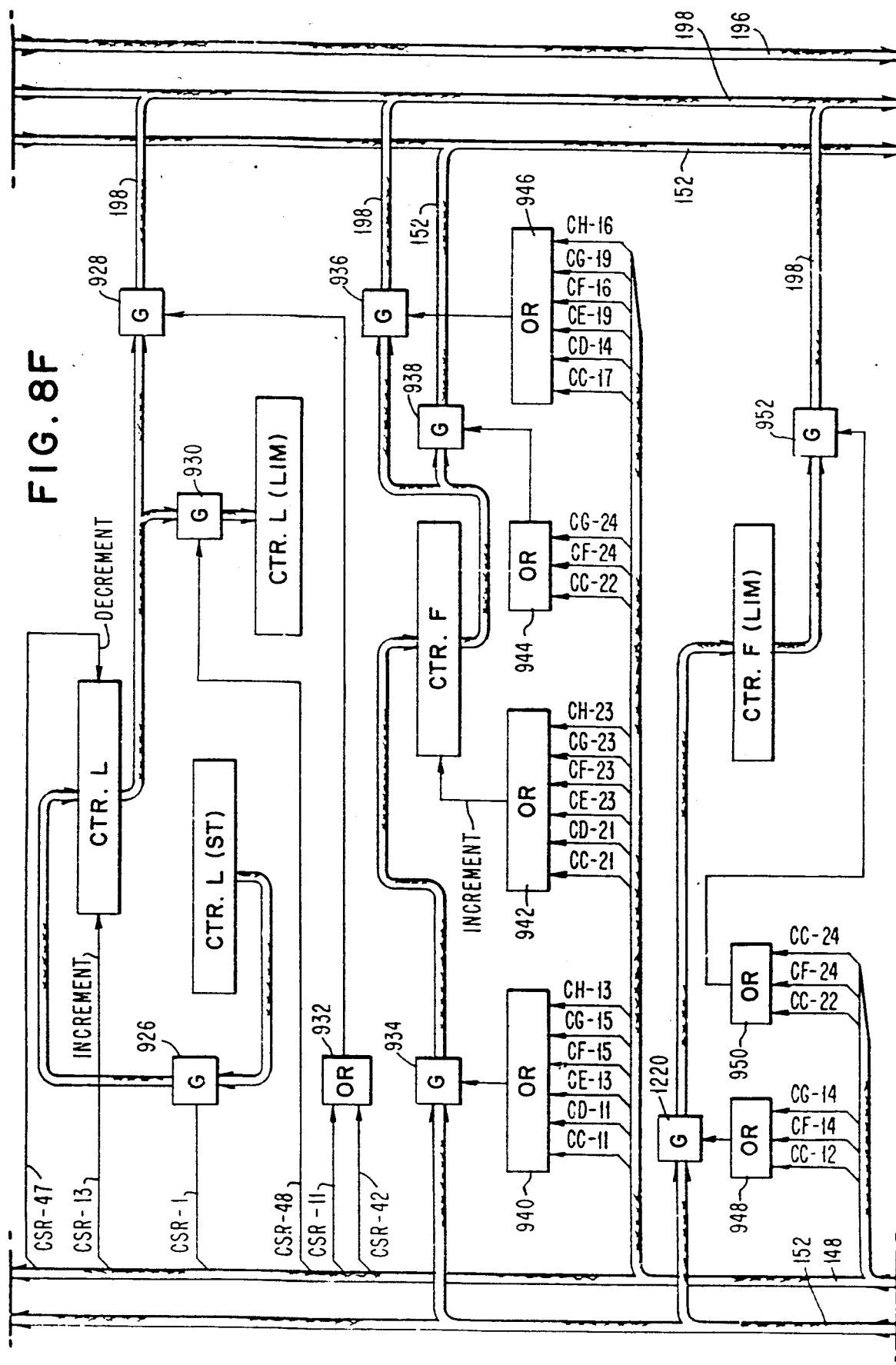
Figure 8G:
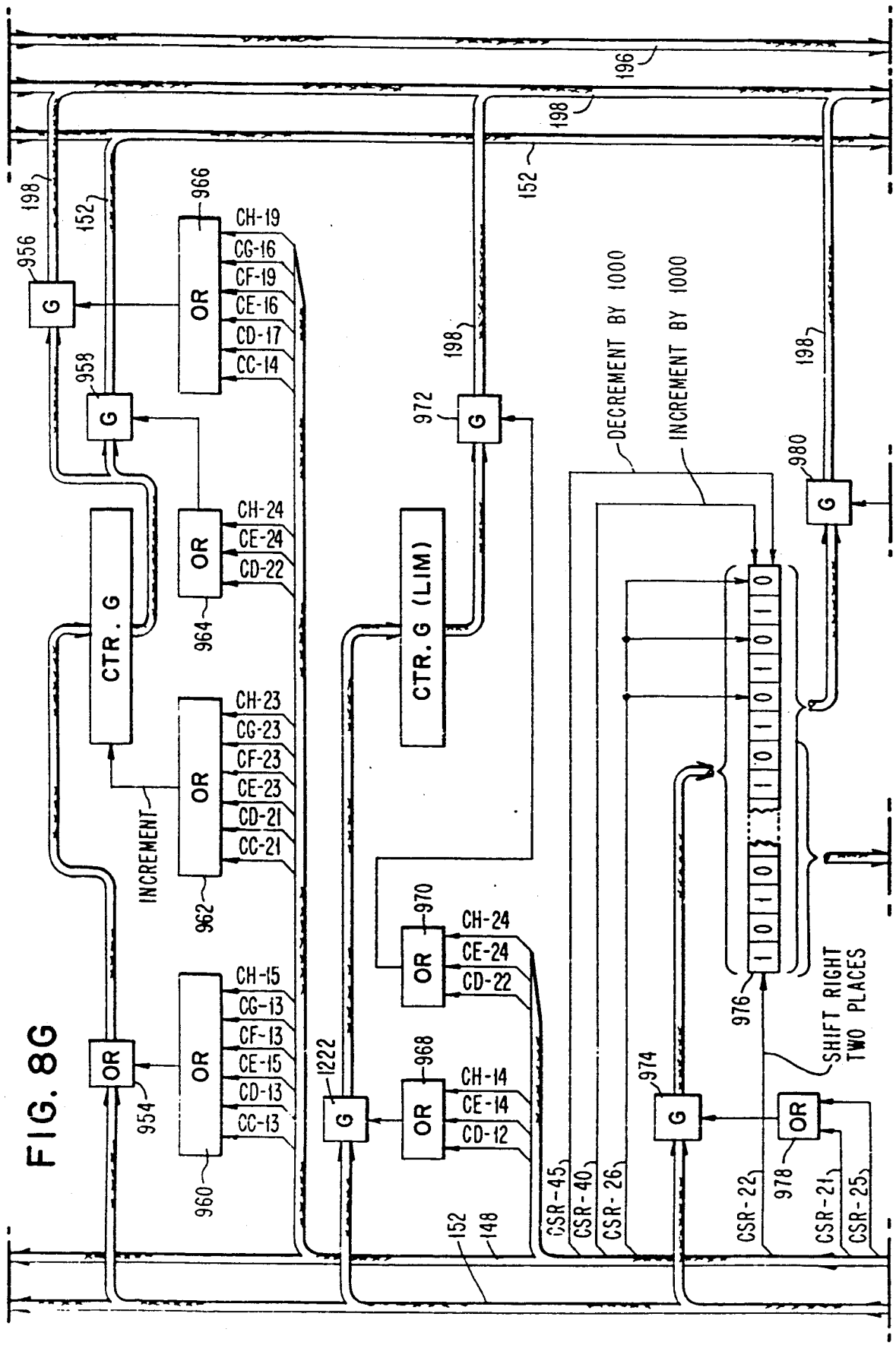
Figure 8H:
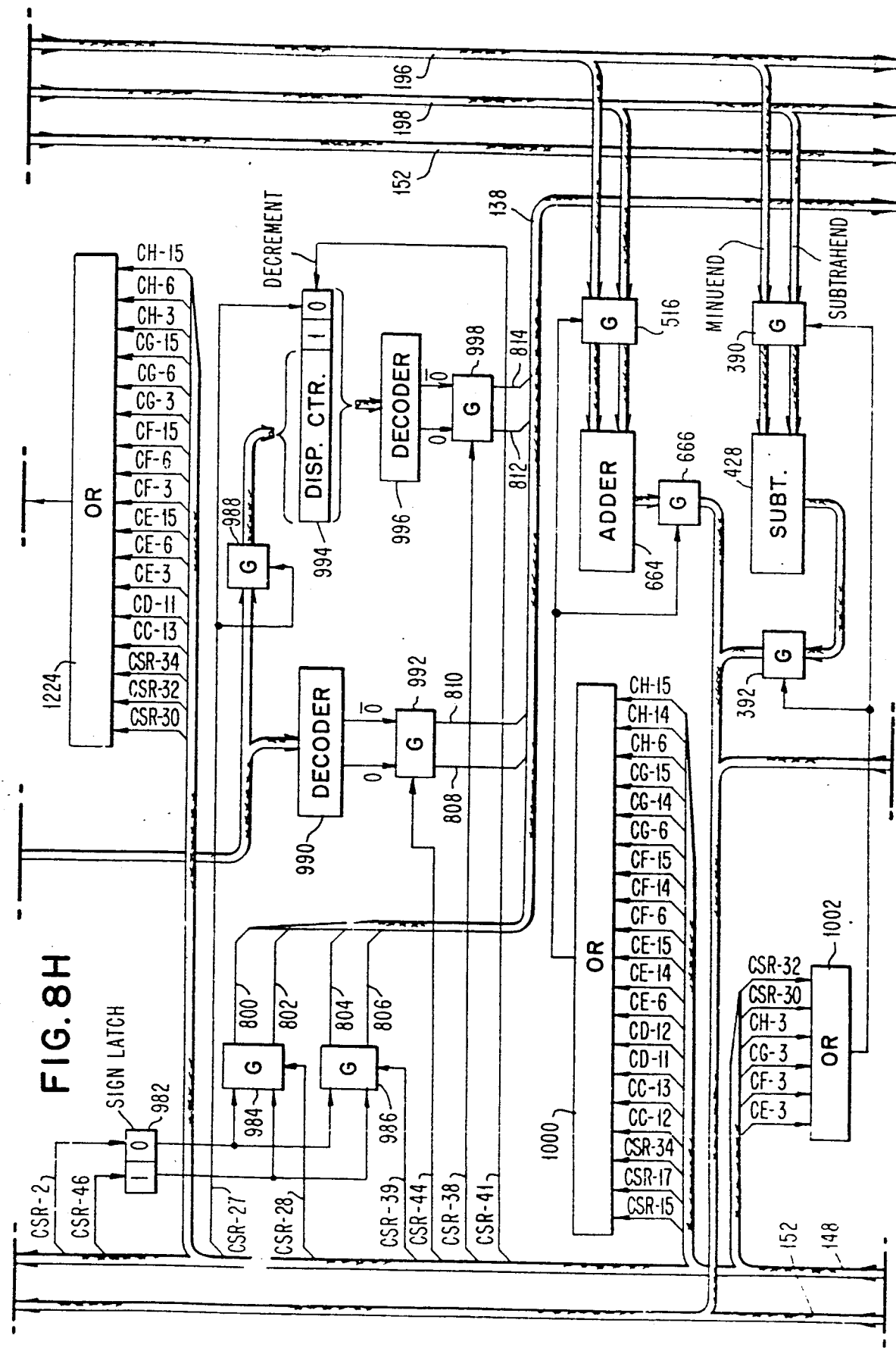
Figure 8J:
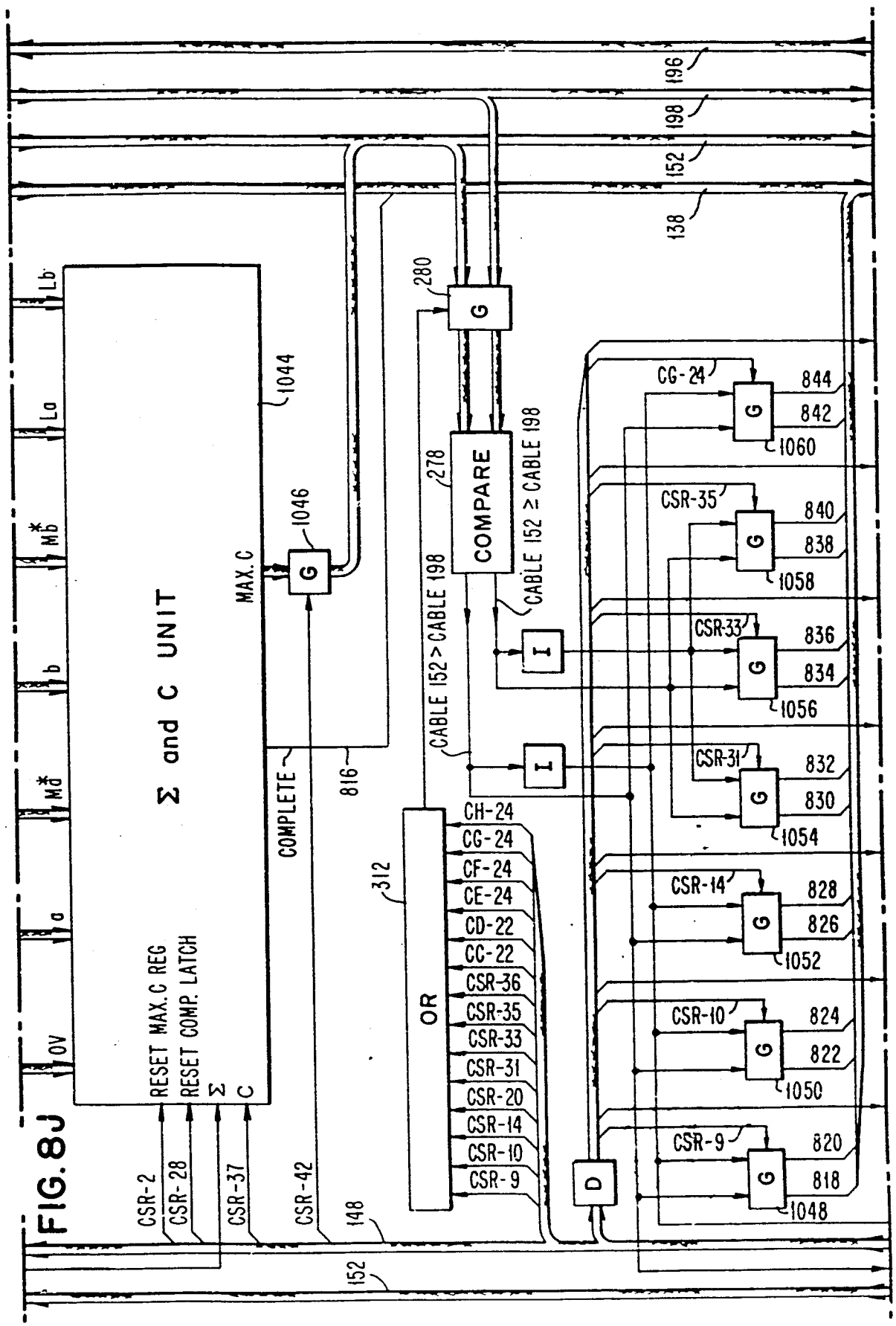
Figure 8K:
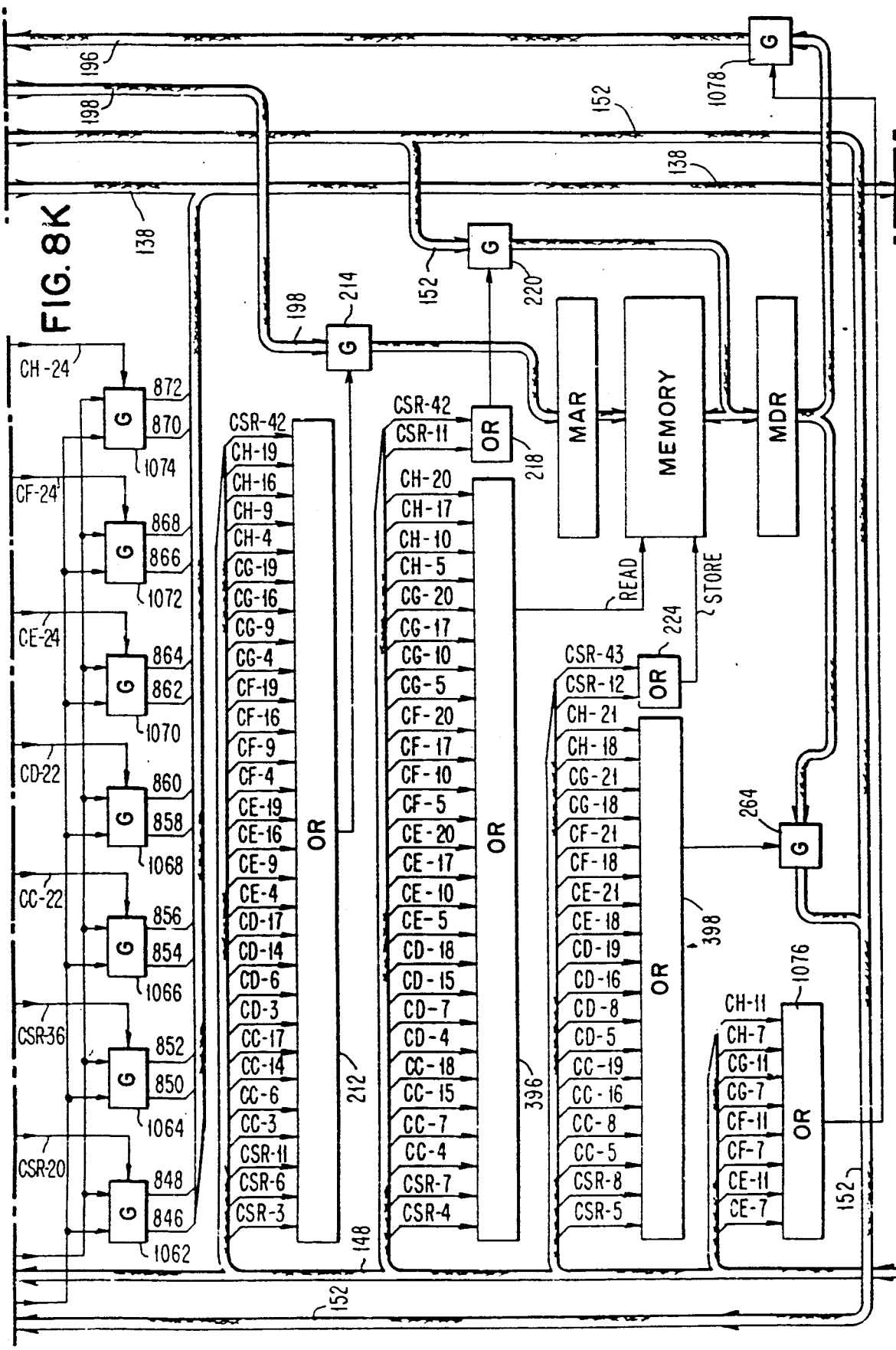
Figure 8M:
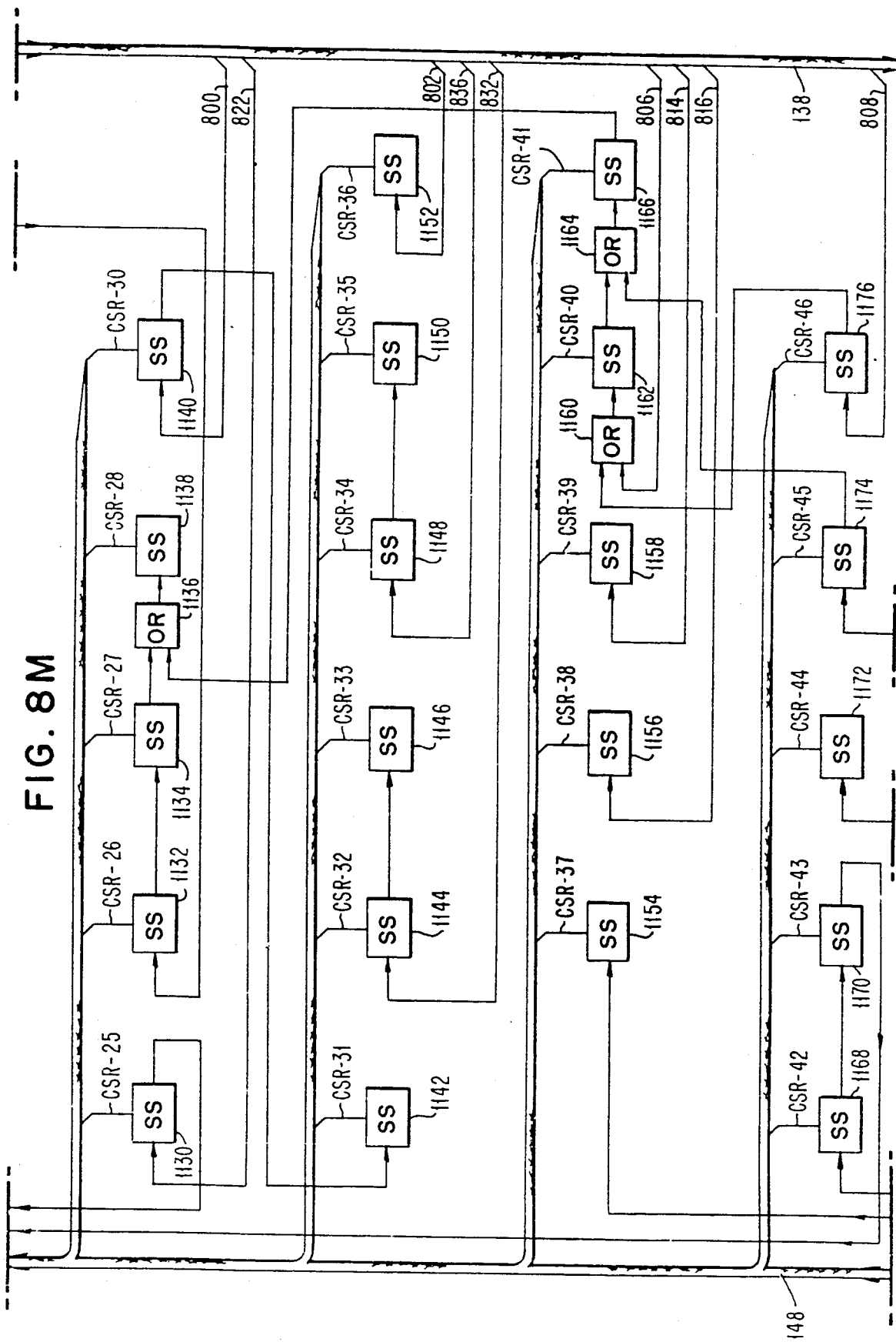
Figure 8N:
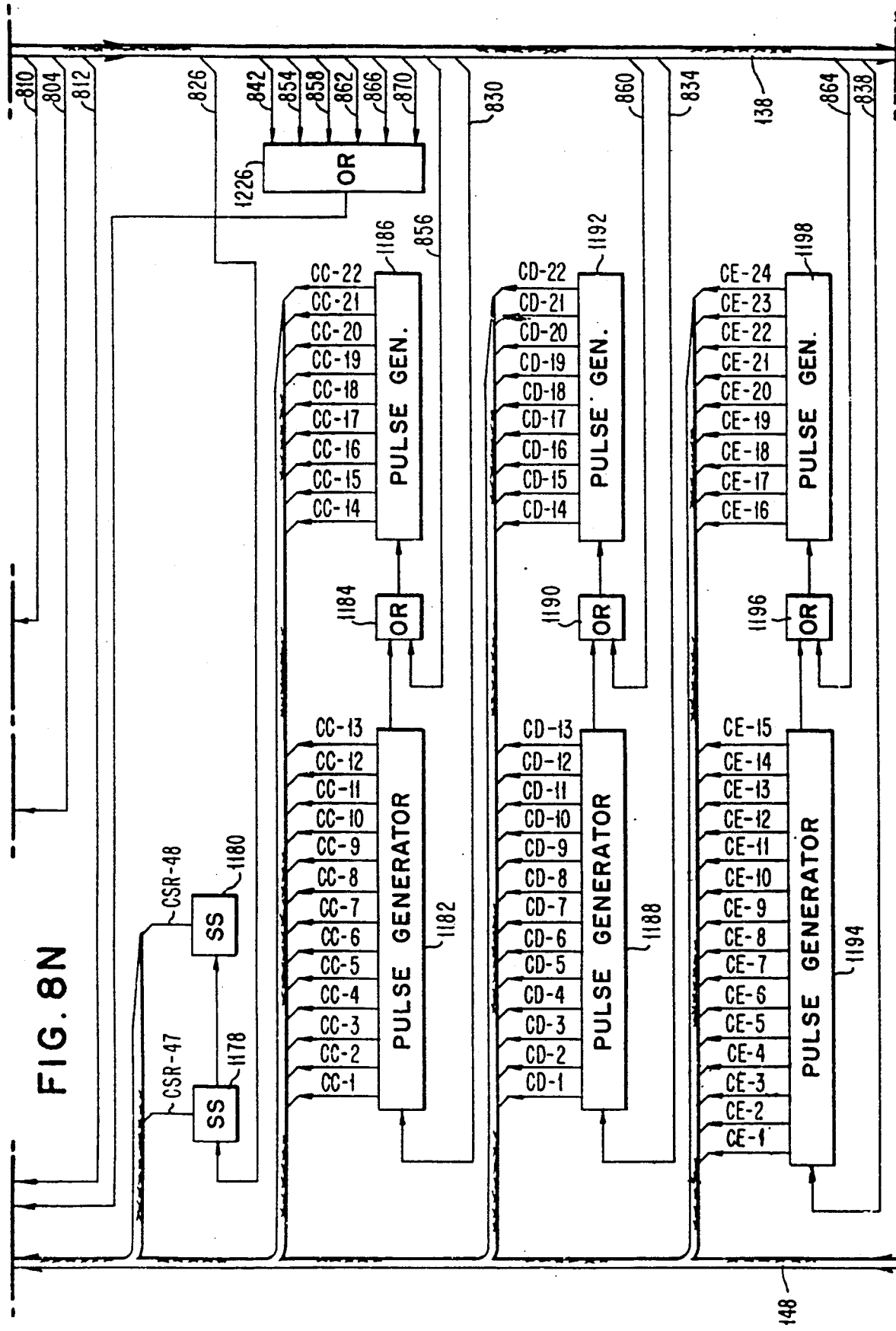

At the end of the operations performed by the subsystems CC through CH, the seven quantities shown entering the top of the summation and correlation unit shown on FIG. 8J and also in detail in FIGS. 9A and 9B have been computed and the basic CSR subsystem clock takes over to perform the summation and correlation for a particular condition of displacement. Thus, the overlap OV has been computed, the quantities a and b are available from the clipped list in memory, the quantities $M_a^*$ and $M_b^*$ have been computed as are the quantities $L_a$ and $L_b$. It will be apparent that the quantities $M_a^*$, $M_b^*$, $L_a$, $L_b$ and OV are utilized recurrently during a given summation and correlation operation. However, a new a and b value must be accessed from memory for each computation. These are accessed as pairs beginning at the pointer address of the overlapped portion of the segment and proceeding to the end address of the overlapped portion of the segment being correlated. Said end address are stored in either the counter F(LIM) or the counter G(LIM), depending upon which counter is being utilized for control of a given displacement condition.

The actual mathematics of the correlation operation are well known and straightforward; however, this particular form of correlation is specially weighted to penalize shifting, as shown in the following formulas.

$$C_{ab}(k) = \frac{1}{L} \sum_i (a_i - M_a^*)(b_{i+k} - M_b^*) \quad (1)$$

where
$$L = L_a + L_b - OV \quad (2)$$

and $$C_{ab} = \frac{\max_k C_{ab}(k)}{\sqrt{C_{aa}(0)C_{bb}(0)}} \quad (3)$$

and where $k$ is the shift variable (displacement).

As is customary, lower case c denotes the raw value of the correlation function, while upper case C denotes the normalized value. The conventional form of correlation would use L = OV. The above function penalizes shifting by effectively shifting zeros in behind the signal, and correlating over a large range. This step is quite important in improving the system's discrimination of forgeries.

In the above formulas, it will be seen that $c_{ab}$, $c_{aa}(0)$ and $c_{bb}(0)$ must first be computed as indicated, utilizing data currently available until all of the correlation points for a given displacement condition are obtained whereupon the final correlation for the particular displacement condition as shown in formula (3) is computed.

In the embodiment of the summation and correlation unit shown on FIGS. 9A and 9B, the three accumulators shown at the bottom lefthand portion of FIG. 9A performs the summation and subtraction operations indicated in equation (1), for $c_{ab}, c_{aa}$ and $c_{bb}$ by passing the quantities a, b, $M_a^*$ and $M_b^*$, through the subtractor box (SUBT) and the multiplier box (MULT) on FIG. 9A where they are accumulated in the aforementiond three accumulation registers. Finally, the quantities shown in the denominators together with the output of the accumulators are passed through the divider block (DIVIDER) and are finally placed in the three correlation registers (CORR) shown in the left-hand middle position of FIG. 9B. The contents of these registers are utilized as is shown in the formula (3) to produce the final cross correlation figure for each displacement condition. Thus, the quantities $c_{aa}$ and $c_{bb}$ first pass back through the multiplication block and finally into the square root block (SQ.RT.) after which the result is stored in the Register A.

The quantity currently stored in Register A is compared with a previously generated correlation value stored in Register B whereupon a determination of which value is larger is made and the larger one will be automaticaly placed in Register B. In this way, the largest correlation value obtained for any given segment is automatically available at the end of the correlation computations for a given segment.

The above description of the general operation of the subsystem or subunit of the subsystem of FIG. 8 set forth in FIGS. 9A and 9B together with the three equations (1) through (3) completes the overall description of the philosophy of operation of the presently disclosed embodiment. The suosequent description of the operation of each of the subsystems of FIGS. 2 through 8 will specifically set forth the data flow paths in the disclosed hardware. The specific description of the embodiment taken together with the clock sequence charts, one of which is included for each subsystem clearly describes the operation of the disclosed embodiments.

GENERATE SECOND DERIVATIVE SUBSYSTEM (SD) (FIGS. 2A–2D)

The first subsystem which will be described is the subsystem which generates the list of second derivatives and also the list of pen lift pointers. The clock which operates the subsystem is identified by the letters SD. It is again reiterated that in the description of this and the other subsystems, the word subsystem and microprogram are used interchangeably but that the subsystems are pure hardware implementations.

Referring to the wiring diagram of FIGS. 2A–2D the tablet 124 has an analog output which is applied to the analog-to-digital converter 126. The output of the converter 126 is on the cable 128 which is applied to the GATE 130.

A pulse generator 100 delivers 5 millisecond pulses to wire 102. These pulses are delayed by the delay unit 104 and applied to single shot 106 which produces pulses on wire 108 roughly inbetween each 5 millisecond pulse on wire 102. The pen contact designated by the reference character 132 is some kind of a switch or mechanism that causes wire 134 to become active when the pen makes contact with the tablet. When wire 134 is active, the AND circuit 110 will allow pulses on wire 108 to extend through and turn "on" "single shot" 112. Single shot 112 has a period of 100 milliseconds. When single shot 112 is in its "on" condition wire 136 will be active, thus permitting 5 millisecond pulses to pass through AND circuit 114 to wire 116. Wire 116 extends via cable 138 to the bottom of the wiring diagram. Prior to the time that the pen is touched to the tablet, shift register 140, near the bottom of the diagram, is reset to the binary number 100. This means that, when the pen is initially touched to the tablet, wire 142 will be active. This allows the first 5 millisecond pulse on wire 116 to pass through the AND circuit 144 and turn on "single shot" 146. This produces the SD-1 pulse on the wire labeled SD-1. The SD-1 pulse travels via cable 148 to the top of the wiring diagram where it passes through the OR circuit 150 and is applied to GATE 130. This applies the value on cable 128 to cable 152. The SD-1 pulse is also applied to OR circuit 154 which causes the value on cable 152 to be gated to register No. 3. The SD-1 pulse is also applied to GATE 158 in order to gate the value in the register labeled CTR.A(ST.) to the counter labeled CTR.A. The SD-1 pulse is also applied to GATE 160 in order to gate the value in the register labeled CTR.E(ST.), to the counter labeled CTR.E. At the bottom of the wiring diagram the SD-1 pulse is applied to wire 162 and passes through OR circuit 164 in order to shift the register 140. The number now in register 140 will be 010 which results in wire 166 becoming active. The SD-1 pulse is applied to GATE 1228 in order to gate CTR.A(ST) to cable 196. The SD-1 pulse is applied to GATE 1232 in order to gate cable 196 to the MDR. The SD-1 pulse is applied to GATE 1230 in order to gate CTR.E(ST) to cable 198. The SD-1 pulse is applied to GATE 214 through OR circuit 212 in order to gate cable 198 to the MAR.

The next 5 millisecond pulse that appears on wire 116 will pass through AND circuit 168 and turn "on" single shot 170. This produces the SD-2 pulse which extends via cable 148 through OR circuit 150 and gates the output of the converter 126 to cable 152. The SD-2 pulse also extends through Or circuit 172 to GATE 174 in order to gate the value on cable 152 to register No. 2. At the bottom of the diagram the SD-2 pulse also appears on wire 176 and is used to again shift the shift register 140. The number now in this shift register will be 001 which means that wire 178 will be active. This means that all of the following 5 millisecond pulses which appear on wire 116 will now pass through AND circuit 180 and turn "on" single shot 182. The SD-2 pulse extends through OR circuit 224 in order to give a store command to the memory. The SD-2 pulse extends through OR circuit 370 to increment CTR.E.

This produces the SD-3 pulse which extends via cable 148 to the top of the diagram where it passes through the OR circuit 150 and gates the value on cable 128 to cable 152. The SD-3 pulse also extends to GATE 184 in order to gate the value on cable 152 to register No. 1.

When single shot 182 goes "off" a pulse is produced which turns "on" single shot 186 in order to produce the SD-4 pulse. The SD-4 pulse is applied to GATE 188 in order to gate register No. 1 to cable 194. The SD-4 pulse is applied to GATE 190 in order to gate register No. 2 to cable 196. The SD-4 pulse is applied to GATE 192 in order to gate register No. 3 to cable 198. The SD-4 pulse is applied to GATE 200 which gates the three just mentioned cables to the arithmetic unit 202. The SD-4 pulse is applied to gATE 204 in order to gate the output of the arithmetic unit to cable 152. The SD-4 pulse is applied to GATE 206 in order to gate cable 152 to register No. 4. In this manner, the values in register No. 1 through No. 3 are combined in the arithmetic unit 202 and the output of the arithmetic unit is applied to register No. 4.

When single shot 186 goes "off" a pulse is produced to turn "on" single shot 208 in order to produce the SD-5 pulse. The SD-5 pulse is applied to GATE 210 in order to gate counter A to cable 198. The SD-5 pulse extends through OR circuit 212 to GATE 214 in order to gate cable 198 to the memory address register. The SD-5 pulse is applied to GATE 216 in order to gate register No. 4 to cable 152. The SD-5 pulse also extends through OR circuit 218 to GATE 220 in order to gate cable 152 to the memory data register.

When single shot 208 turns "off", a pulse is produced which turns "on" single shot 222 in order to produce th SD-6 pulse. The SD-6 pulse passes through OR circuit 224 in order to give a "store" command to the memory. The SD-6 pulse also increments counter A. When the pen makes contact with the tablet, wire 134 is active. The active state of wire 134 sets flip-flop 228 to its 0 state. As long as the pen is in contact with the tablet the active state of wire 134 extends through OR circuit 230 to cause wire 232 to be active and wire 234 to be inactive. If the pen is lifted from the tablet, wire 134 will become inactive which causes wire 232 to become inactive and wire 234 to become active. The SD-6 pulse is applied to GATE 226 in order to test the state of wire 232 and the state of wire 234. If wire 232 is inactive it is necessary to make an entry in the pen lift pointer list. If wire 232 is active it is not necessary to make this entry. If it be assumed that wire 232 is inactive and wire 234 is active, the result of the test by the SD-6 pulse will result in wire 122 becoming active and the active of wire 122 will turn "on" single shot 236. This produces the SD-7 pulse which travels via cable 148 to and through OR circuit 238 to GATE 240. Thus gates the contents of counter E to cable 198. The SD-7 pulse also extends through OR circuit 212 to GATE 214 in order to gate the cable 198 to the memory address register. The SD-7 pulse is also applied to GATE 242 in order to gate the contents of counter A to cable 152. The SD-7 pulse also extends through OR circuit 218 to GATE 220 in order to gate cable 152 to the memory data register. The SD-7 pulse is also used to set flip-flop 228 which is the "pen in air" latch to its 1 state.

When single shot 236 goes "off" a pulse is produced which turns "on" single shot 244. This produces the SD-8 pulse which travels via cable 148 and passes through OR circuit 224 to give a "store" command to the memory. The SD-8 pulse is also used to increment counter E.

When single shot 244 goes "off" a pulse is transmitted through OR circuit 246 to turn "on" single shot 248. It should be noted that, when GATE 226 was tested by the SD-6 pulse, if wire 232 had been active, wire 120 would become active which would result in a pulse being tranmsitted through OR circuit 246 to turn "on" single shot 248. If this had been the case, the two microprogram steps SD-7 and SD-8 would have been omitted. The SD-9 pulse is applied to GATE 250 in order to gate register No. 2 to cable 152. The SD-9 pulse is also applied through OR circuit 154 to GATE 156 in order to gate cable 152 to register No. 3.

When single shot 248 goes "off" a pulse is produced which turns "on" single shot 252. This produces the SD-10 pulse which extends via cable 148 and is applied to GATE 254 in order to gate register No. 1 to cable 152. The SD-10 pulse also extends through OR circuit 172 to GATE 174 in order to gate cable 152 to register No. 2

The microprogram will automatically revert to SD-3 when the next 5 millisecond pulse occurs. The sequence (SD-3 through SD-10) will repeat until single shot 112 falls. When this happens, a slightly delayed pulse will appear on wire 118 which will turn "on" single shot 256 in order to produce the SD-11 pulse. The SD-11 pulse extends through OR circuit 238 to GATE 240 in order to gate counter E to cable 198. The SD-11 pulse also is applied to GATE 258 in order to gate cable 198 to the register labeled CTR.E(LIM.). The SD-11 pulse also extends through OR circuit 212 to GATE 214 in order to gate cable 198 to the memory address register.

When single shot 256 turns "off" a pulse is produced which turns "on" single shot 260. This produces the SD-12 pulse which is used to give a "read" command to the memory.

When single shot 260 goes "off" a pulse is produced which turns "on" single shot 262. This produces the SD-13 pulse which extends to GATE 264 in order to gate the memory data register to cable 152. The SD-13 pulse is also applied to GATE 266 in order to gate cable 152 to the register labeled CTR.A(LIM.). The fall of single shot 262 is used to start the "maximum second derivative" program which is abbreviated MSD.

register labeled CTR.A(ST.) to the counter CTR.A. The MSD-1 pulse is also used to reset register No. 3 to all "0's."

When single shot 286 goes "off," a pulse is transmitted through OR-circuit 296 to turn "on" single shot 288. This produces the MSD-2 pulse. The MSD-2 pulse is applied to GATE 210 in order to gate counter A to cable 198. The MSD-2 pulse is also applied to GATE 214 in order to gate cable 198 to the memory address register. When single shot 288 goes "off," a pulse is produced which turns "on" single shot 290. This produces the MSD-3 pulse. The MSD-3 pulse is used to give a "read" command to the memory.

When single shot 290 turns "off," a pulse is produced which turns "on" single shot 292. This produces th MSD-4 pulse. The MSD-4 pulse is applied to GATE 264 in order to gate the memory data register to cable 152. The MSD-4 pulse is also applied to GATE 184 in order to gate the cable 152 to register No. 1.

When single shot 292 turns "off," a pulse is produced which turns "on" single shot 294. This produces the MSD-5 pulse. The MSD-5 pulse extends through OR-

| SECOND DERIVATIVE SUBSYSTEM CLOCK SEQUENCE (SD) | |
|---|---|
| SD-1 (first 5 milli sec. pulse) | Gate $y_1$ to Reg. No. 3 <br> Gate CTR.A(ST) to CTR.A <br> Gate CTR.A(ST) to MDR <br> Gate CTR.E(ST) to CTR.E <br> Gate CTR.E(ST) to MAR <br> Shift control shift Reg. |
| SD-2 (2nd milli sec. pulse) | Gate $y_2$ to Reg. No. 2 <br> Shift control shift Reg. store <br> Increment CTR.E |
| SD-3 (3rd 5 milli sec. pulse) | Gate $y_3$ to Reg. No. 1 <br> → SD-4 |
| SD-4 | Gate Registers No. 1, No. 2 and No. 3 to arithmetic unit. <br> Gate output of arithmetic unit to Reg. No. 4. <br> → SD-5 |
| SD-5 | Gate CTR.A to MAR <br> Gate Reg. No. 4 to MDR <br> → SD-6 |
| SD-6 | Store <br> Increment CTR.A <br> Is pen contact off? <br> yes → SD-7 <br> no → SD-9 |
| SD-7 | Gate CTR.E to MAR <br> Gate CTR.A to MDR <br> Set "Pen in Air" latch <br> → SD-8 |
| SD-8 | Store <br> Increment CTR.E <br> → SD-9 |
| SD-9 | Gate Reg. 2. to Reg. No. 3 <br> → SD-10 |
| SD-10 | Gate Reg. No. 1 to Reg. No. 2 |
| Note - subsystem will automatically revert to SD-3 when next 5 millisec. pulse occurs. The sequence (SD-3 through D-10) will repeat until single shot 112 (FIG. 2) falls. Fall of single shot 112 (turns on SD-11). | |
| SD-11 | Gate CTR.E to CTR.E (LIM) <br> Gate CTR.E to MAR <br> → SD-12 |
| SD-12 | Read Memory <br> → SD-13 |
| SD-13 | Gate MDR to CTR.A(LIM.) <br> → "Maximum Second Derivative" subsystem (MDS) |

MAXIMUM SECOND DERIVATIVE SUBSYSTEM (MDS) (FIGS. 3A–3C)

Figure 3A:
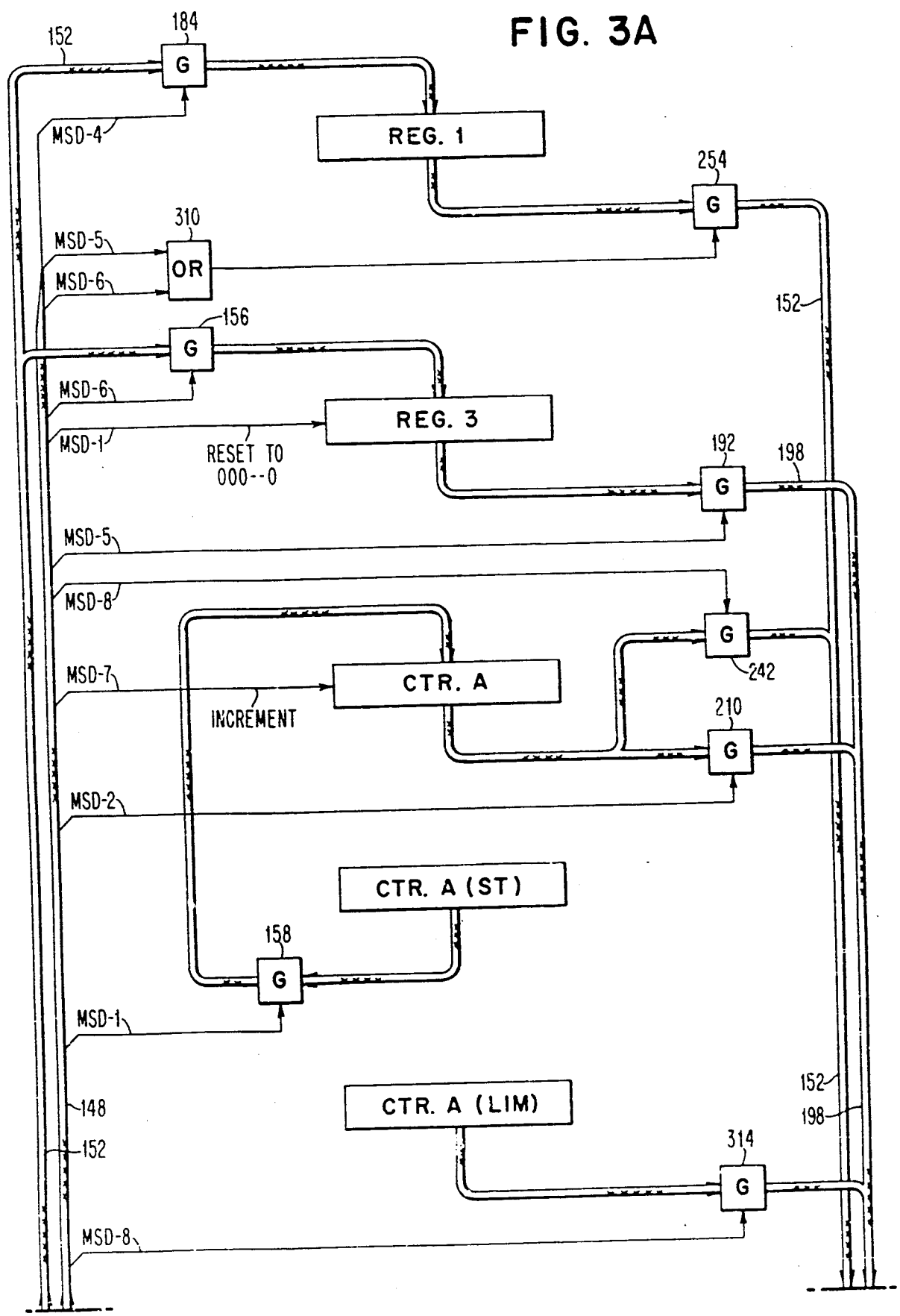
FIGS. 3A and 3B comprise a combination logical and functional diagram of the subsystem of the present invention which determines the single maximum second derivative value for a given list of second derivative values for a given sample.
Figure 3B:
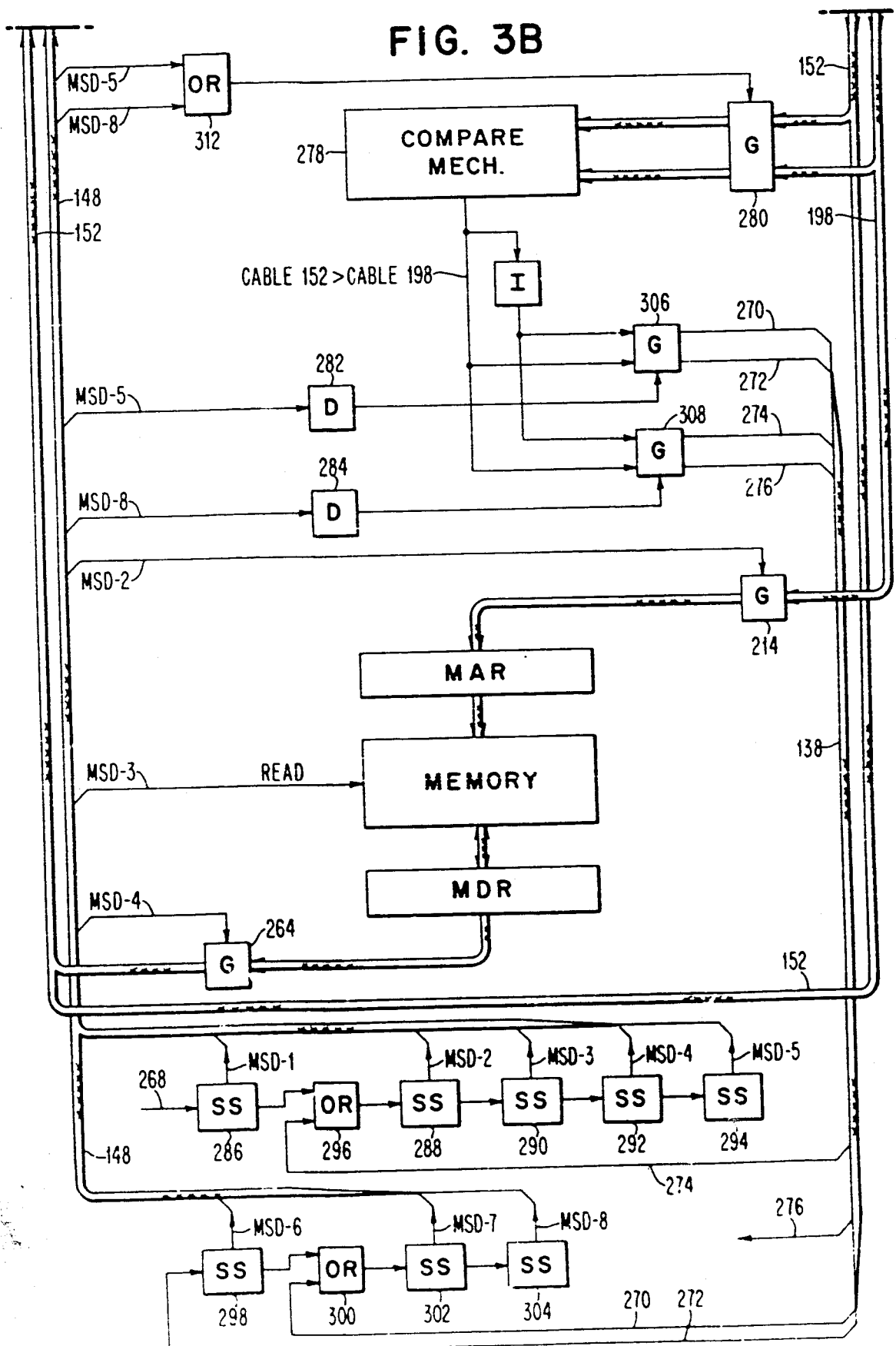

This subsytem is shown in FIGS. 3A–3C. When single shot 262 is turned "off," a pulse is produced on wire 268 which turns "on" single shot 286. This produces the MSD-1 pulse. Th MSD-1 pulse extends via cable 148 to GATE 158 in order to gate the value in the circuit 310 to GATE 254 in order to gate register No. 1 to cable 152. The MSD-5 pulse is also applied to GATE 192 in order to gate register No. 3 to cable 198. The MSD-5 pulse also extends through OR-circuit 312 to GATE 280 in order to gate cables 152 and 198 to the compare unit 278. A slightly delayed MSD-5 pulse extends through the DELAY unit 282 to GATE 306 in order to test the output of the compare unit 278. If register No. 1 is greater than register No. 3, a pulse will appear on wire 272. If this is not true, a pulse will appear on wire 270. A pulse on wire 272 is used to turn "on" single shot 298 and a pulse on wire 270 extends through OR-circuit 300 in order to turn "on" single shot 302. Assuming that single shot 298 was turned "on," the MSD-6 pulse is produced. The MSD-6 pulse extends through OR-circuit 310 to gate 254 in order to gate register No. 1 to cable 152. The MSD-6 pulse is also applied to GATE 156 in order to gate cable 152 to register No. 3.

The MSD-7 pulse is used to increment counter A. When single shot 302 turns "off," a pulse is produced to turn "on" single shot 304. This produces the MSD-8 pulse. The MSD-8 pulse is applied to gate 242 in order to gate counter A to cable 152. The MSD-8 pulse is also applied to GATE 314 in order to gate the register labeled CTR.A.(LIM.) to cable 198. The MSD-8 pulse also extends through OR-circuit 312 to GATE 280 in order to gate the cables 152 and 198 to the compare unit 278. A slightly delayed MSD-8 pulse extends through the delay unit 284 to gate 308 in order to test the compare unit 278. If counter A is greater than counter A(LIM.) a pulse will appear on wire 276. If this is not the case, a pulse will occur on wire 274. Wire 274 is used to return the microprogram to single shot 288 (MSD-2) and this will repeat until counter A is greater than counter A(LIM.), at which time, a signal appears on wire 276 which will extend to the microprogram entitled Clipped List Microprogram (CL).

| MAXIMUM SECOND DERIVATIVE SUBSYSTEM CLOCK SEQUENCE | |
| --- | --- |
| MSD-1 | Gate CTR.A(ST.) to CTR.A<br>Reset Register No. 3 to 00--00<br>→ MSD-2 |
| MSD-2 | Gate CTR.A to MAR<br>→ MSD-3 |
| MSD-3 | Read<br>→ MSD-4 |
| MSD-4 | Gate MDR to Register No. 1<br>→ MSD-5 |
| MSD-5 | Is Register No. 1 > Register No. 3? (neglect sign)<br>yes → MSD-6<br>no → MSD-7 |
| MSD-6 | Shift Register No. 1 to Register No. 3<br>→ MSD-7 |
| MSD-7 | Increment CTR.A<br>→ MSD-8 |
| MSD-8 | Is CTR.A > CTR.A(LIM)?<br>yes → CL-1<br>no → MSD-2 |

CLIPPED LIST SUBSYSTEM (CL) (FIGS. 4A–4C)

The pulse on wire 276 turns "on" single shot 328 to produce the CL-1 pulse. The CL-1 pulse extends to GATE 158 to gate the contents of the register labeled CTR.A.(ST) to the counter labeled CTR.A. The CL-1 pulse also extends to GATE 356 to gate the register labeled CTR.C.(ST.) to the counter labeled CTR.C. The CL-1 pulse is also used to shift register No. 3 two places to the right.

When single shot 328 goes "off," a pulse is transmitted through the OR-circuit 330 to turn "on" single shot 332. This produces th CL-2 pulse which extends to GATE 210 in order to gate the contents of the counter labeled CTR.A to cable 198. The CL-2 pulse also extends to GATE 214 to gate cable 198 to the memory address register. When single shot 332 goes "off," a pulse is produced to turn "on" single shot 334. This produces the CL-3 pulse which is used to give a "read" command to the memory.

When single shot 334 goes "off," a pulse is produced to turn "on" single shot 336. This produces the CL-4 pulse which is applied to GATE 264 in order to gate the memory data register to cable 152. The CL-4 pulse is also applied to GATE 184 in order to gate cable 152 to register No. 1.

When single shot 336 goes "off," a pulse is produced to turn "on" single shot 338. This produces the CL-5 pulse which is applied to GATE 254 in order to gate register No. 1 to cable 152. The CL-5 pulse is also applied to GATE 192 to gate register No. 3 to cable 198. The CL-5 pulse also extends through OR-circuit 312 to GATE 280 in order to gate cables 152 and 198 to the compare mechanism 278. A slightly delayed CL-5 pulse extends through the DELAY UNIT 358 to GATE 316 in order to test the compare unit 278. If register No. 1 is greater than register No. 3, a pulse will appear on wire 320. If this is not the case, a pulse will appear on wire 318. The pulse on wire 320 is used to turn "on" single shot 340 and the pulse on wire 318 is used to turn "on" single shot 342. Assuming that single shot 340 is turned "on," the CL-6 pulse will be produced. The CL-6 pulse extends to the memory data register and sets the right-hand bit to a 1 and all other bits except the sign bit to "0's." The CL-6 pulse also extends to GATE 360 in order to gate the counter labeled CTR.C to cable 198. The CL-6 pulse also extends to GATE 214 in order to gate cable 198 to the memory address register.

If single shot 342 is turned "on" by the pulse on wire 318, the CL-7 pulse is produced. The CL-7 pulse extends to the memory data register and resets all bits except the sign bit to 0. The CL-7 pulse also extends to GATE 360 in order to gate the counter CTR.C to cable 198. The CL-7 pulse also extends to GATE 214 in order to gate cable 198 to the memory address register.

When either single shots 340 or 342 turn "off," a pulse is produced which extends through OR-circuit 344 to turn "on" single shot 346. This produces the CL-8 pulse which gives a "store" command to the memory.

When single shot 346 turns "off," a pulse is produced to turn "on" single shot 348. This produces the CL-9 pulse which is used to increment the counter, labeled CTR.A and also the counter labeled CTR.C.

When single shot 348 turns "off," a pulse is produced to turn "on" single shot 350. This produces the CL-10 pulse. The CL-10 pulse is applied to GATE 242 in order to gate the counter labeled CTR.A to cable 152. The CL-10 pulse is also applied to GATE 314 in order to gate the register labeled CTR.A(LIM.) to cable 198. The CL-10 pulse also extends through OR-circuit 312 to GATE 280 in order to gate cables 152 and 198 to the compare unit 278.

A slightly delayed CL-10 pulse extends through the DELAY UNIT 362 to GATE 322 in order to test the two inputs to the compare unit 278. If the counter labeled CTR.A is greater than the register labeled CTR.A.(LIM.), a pulse will appear on wire 326. If this is not the case, a pulse will appear on wire 324. The pulse on wire 326 is used to turn "on" single shot 352 and the pulse on wire 324 extends through OR-circuit 330 to turn "on" single shot 332. Assuming that the pulse occurred on wire 326 and that single shot 352 is turned "on," the CL-11 pulse is produced. The CL-11 pulse is used to decrement the counter labeled CTR.C.

When single shot 352 turns "off," a pulse is produced to turn "on" single shot 354. This produces the CL-12 pulse which is applied to GATE 360 in order to gate the counter labeled CTR.C to cable 198. The CL-12 pulse is also applied to GATE 364 in order to gate cable 198 to the register labeled CTR.C(LIM.).

When single shot 354 turns "off", a pulse is produced on wire 356 which is used to start the next microprogram.

| MAKE CLIPPED LIST SUBSYSTEM CLOCK SEQUENCE (CL) | |
|---|---|
| CL-1 | Gate CTR A(ST) to CTR.A<br>Gate CTR C(ST) to CTR.C<br>Shift Register No. 3 two places to the right<br>→ CL-2 |
| CL-2 | Gate CTR.A to MAR<br>→ CL-3 |
| CL-3 | Read Memory<br>→ CL-4 |
| CL-4 | Gate MDR to Register No. 1<br>→ CL-5 |
| CL-5 | Is Register No. 1 > Register No. 3 (neglect sign)<br>if yes → CL-6<br>if no → CL-7 |
| CL-6 | Gate sign bit of Register No. 1 to MDR<br>Gate the number 00--01 to MDR<br>(Do not change the sign bit)<br>Gate CTR.C to MAR<br>→ CL-8 |
| CL-7 | Gate sign bit of Register No. 1 to MDR<br>Gate the number 00--00 to MDR<br>(Do not change sign bit)<br>Gate CTR.C to MAR<br>→ CL-8 |
| CL-8 | Store Memory<br>→ CL-9 |
| CL-9 | Increment CTR.A<br>Increment CTR.C<br>→ CL-10 |
| CL-10 | Is CTR.A > CTR.A(LIM.)?<br>if yes → CL-11<br>if no → CL-2 |
| CL-11 | Decrement CTR.C<br>→ CL-12 |
| CL-12 | Gate CTR.C to CTR.C(LIM.) |

MAKE SEGMENT LIST SUBSYSTEM (SL) (FIGS. 5A-5C)

At this point, it should be understood that the A list referred to herein is a list of addresses and each address in this list is the address of a second derivative value.

The E list is a list of pen lift pointers. These pointers are addresses in the A list at which a pen lift occurred. The first entry in the E list is the address of the start of the A list. Therefore, if the value contained at the first address in the E list is subtracted from the value stored at the address which is the second address in the E list, a value will be obtained which is known as a "segment." In other words, a "segment" is the number of second derivative values which are stored between successive pen lifts. The subsystem to be described herein creates a list of these segments which is referred to as the I list. The first entry in this I list is the value at the start of the E list subtracted from the value in the E + 1 address. The next value would be the value stored at the E + 1 address subtracted from the value stored at the E + 2 address and so on until the end of the E list.

The SL subsystem clock sequence is started by a pulse on wire 366 which comes from the preceding subsystem. This turns "on" single shot 400 to produce the SL-1 pulse. The SL-1 pulse is applied to GATE 160 to gate the value in the register labeled CTR.E(ST) to counter E. The SL-1 pulse is also applied to GATE 378 to gate the value in the register labeled CTR.I(ST) to the counter I.

When single shot 400 goes "off," a pulse is produced which turns "on" single shot 402 to produce the SL-2 pulse. The SL-2 pulse extends through OR-circuit 238 to GATE 240 in order to gate counter E to cable 198. The SL-2 pulse also extends through OR-circuit 212 to GATE 214 in order to gate cable 198 to the memory address register.

When single shot 402 turns "off," a pulse is produced which turns "on" single shot 404 in order to produce the SL-3 pulse. The SL-3 pulse extends through OR-circuit 396 to give a "read" command to the memory.

When single shot 404 turns "off," a pulse is produced to turn "on" single shot 406. This produces the SL-4 pulse which extends through OR-circuit 398 to GATE 264 in order to gate the memory data register to cable 152. The SL-4 pulse also extends through OR-circuit 154 to GATE 156 in order to gate cable 152 to register No. 3. The SL-4 circuit also extends through OR-circuit 370 to increment counter E.

When single shot 406 turns "off," a pulse is produced which extends through OR-circuit 408 to turn "on" single shot 410. This produces the SL-5 pulse which extends through OR-circuit 238 to GATE 240 in order to gate counter E to cable 198. The SL-5 pulse also extends through OR-circuit 212 to GATE 214 in order to gate cable 198 to the memory address register.

When single shot 410 turns "off" a pulse is produced which turns "on" single shot 412. This produces the SL-6 pulse which extends through OR-circuit 396 to give a "read" command to the memory.

When single shot 412 goes "off," a pulse is produced which turns "on" single shot 414. This produces the SL-7 pulse which extends through OR-circuit 398 to GATE 264 in order to gate the memory data register to cable 152. The SL-7 pulse is also applied to GATE 184 in order to gate cable 152 to register 1.

When single shot 414 turns "off," a pulse is produced to turn "on" single shot 416. This produces the SL-8 pulse which is applied to GATE 658 in order to gate register No. 1 to cable 196. The SL-8 pulse is also applied to GATE 192 in order to gate register No. 3 to cable 198. The SL-8 pulse is also applied to GATE 390 in order to gate cables 196 and 198 to the subtractor 428. The SL-8 pulse is also applied to GATE 392 in order to gate the output of the subtractor 428 to cable 152. The SL-8 pulse is also applied to GATE 174 in order to gate cable 152 to register No. 2.

When single shot 416 turns "off," a pulse is produced to turn "on" single shot 418. This produces the SL-9 pulse which is applied to GATE 376 in order to gate counter I to cable 198. The SL-9 pulse also extends through OR-circuit 212 to GATE 214 in order to gate cable 198 to the memory address register. The SL-9 pulse is also applied to GATE 250 in order to gate register 2 to cable 152. The SL-9 pulse is also applied to GATE 220 in order to gate cable 152 to the memory data register.

When single shot 418 turns "off," a pulse is produced to turn "on" single shot 420. This produces the SL-10 pulse which is used to give a "store" command to the memory. The SL-10 pulse also extends through OR-circuit 370 to increment counter E.

When single shot 420 goes "off," a pulse is produced to turn "on" single shot 422. This produces the SL-11 pulse which is applied to GATE 368 in order to gate counter E to cable 152. The SL-11 pulse is also applied to GATE 372 in order to gate the value in the register labeled CTR.E(LIM) to cable 198. The SL-11 pulse is also applied to GATE 280 in order to gate cables 152 and 198 to the compare mechanism 278. A slightly delayed SL-11 pulse extends through the DELAY UNIT 382 to GATE 384. If the value on cable 152 is greater than the value on cable 198 a pulse will appear on wire 388. If this is not the case, a pulse will appear on wire 386. The pulse on wire 388 is used to turn "on" single shot 424 and the pulse on wire 386 is used to turn "on" single shot 426. Assuming that single shot 424 is turned "on," the SL-12 pulse is applied to GATE 374 in order to gate counter I to cable 152. The SL-12 pulse is also applied to GATE 380 in order to gate cable 152 to the register labeled CTR.I(LIM). If single shot 426 is turned "on," the SL-13 pulse is produced which extends through OR-circuit 310 to GATE 254 in order to gate register 1 to cable 152. The SL-13 pulse also extends through OR-circuit 154 to GATE 156 in order to gate cable 152 to register No. 3. The SL-13 pulse also increments counter I. When single shot 426 turns "off," a pulse is produced which extends through OR-circuit to again turn "on" single shot 410. In this manner, the program reverts to SL-5.

When single shot 424 turns "off," a pulse is produced on wire 394 which is used to start the next microprogram.

| MAKE SEGMENT LIST SUBSYSTEM CLOCK SEQUENCE (SL) | |
|---|---|
| SL-1 | Gate CTR.E(ST.) to CTR.E<br>Gate CTR.I(ST) to CTR.I<br>→ SL-2 |
| SL-2 | Gate CTR.E to MAR<br>→ SL-3 |
| SL-3 | Read<br>→ SL-4 |
| SL-4 | Gate MDR to Reg. No. 3<br>Increment CTR.E<br>→ SL-5 |
| SL-5 | Gate CTR.E to MAR<br>→ SL-6 |
| SL-6 | Read<br>→ SL-7 |
| SL-7 | Gate MDR to Reg. No. 1<br>→ SL-8 |
| SL-8 | Subtract Reg. No. 3 from Reg. No. 1<br>and place result in Reg. No. 2<br>→ SL-9 |
| SL-9 | Gate CTR.I to MAR<br>Gate Reg. No. 2 to MDR<br>→ SL-10 |
| SL-10 | Store<br>Increment CTR.E<br>→ SL-11 |
| SL-11 | Is CTR.E > CTR.E(LIM)?<br>yes → SL-12<br>no → SL-13 |
| SL-12 | Gate CTR.I to CTR.I(LIM)<br>→ next microprogram |
| SL-13 | Gate Reg. No. 1 to Reg. No. 3<br>Increment CTR.I<br>→ SL-5 |

REVISED SEGMENT LIST SUBSYSTEM (RS)
(FIGS. 6A–6G)

The purpose of this subsystem is to revise the segment list for the reference and the segment list for the sample according to the following rules. The first segment in the reference list is compared with the first segment in the sample list and if one segment exceeds the other by more than 100, the following is done. The shorter of the two segments is inserted into the list which contains the longer segment ahead of this longer segment. A new segment is created which is the difference between the shorter segment and the longer segment and this segment is placed in the list directly below the just mentioned segment. All other segments in the affected list are moved down one and the value of the limit register is increased by 1. At the end of this subsystem, the two lists, the reference and the sample, are made equal to each other. Specifically, the shorter list is made equal to the longer list.

The subsystem will first be generally described. The RS-1 pulse is used to initialize the counter H and the counter I. The steps RS-2 through and including RS-5 are used to determine if the operations are completed. If the operations are not completed, the system continues with the sequence RS-6 through RS-12. If operations are completed, the system branches to RS-40 which is the start of the END routine. The steps RS-6 through RS-12 are used to determine if the reference segment is larger than the sample segment. If this is true, a compare latch is set to 1 and if it is not true, the compare latch is set to 0. The steps RS-13 through RS-17 are used to determine if one segment exceeds the other by more than 100. If the segments do not differ by more than 100, the program reverts back to RS-2. If they do differ by more than 100, the program advances to RS-20. It will be noted that the steps RS-18 and RS-19 are not used and hence are not included in the listing.

The steps RS-20 through RS-39 are used to update one of the two lists. The list to be updated is determined by the setting of the compare latch which was done by RS-12. If this latch is set to 1, the reference list which involves counter H is updated and if this latch is set to 0, the sample list which involves counter I is updated. It will be noted that in this sequence (RS-20 through RS-39) there are pulses labeled A and B. The A pulses are needed when the reference list is updated and the B pulses are needed when the sample list is updated. The pulse that has neither an A or B following it, means that this pulse is used for either updating the reference list or the sample list. As an example, reference can be made to the RS-20 pulse which is produced by single shot 586. It will be noted that the RS-20 pulse goes directly into cable 148. The RS-28 pulse passes through GATE 584 before it enters cable 148. The RS-20B pulse extends through GATE 582 before it enters cable 148. These two GATES 582 and 584 are controlled by the compare latch 528. If it is in its 1 state, wire 464 will be active and will enable GATE 584. If it is in its 0 state, wire 466 will be active to enable GATE 582. The RS-20 pulse can be considered as the OR function of the pulses RS-20A and RS-20B. It will be noted that the RS-20A pulse gates counter H to the memory address register. This involves first gating counter H to a cable which has to be done by the RS-20A pulse and then gating the cable to the memory address register. This gating of the cable to the memory address register can be accomplished by the RS-20 pulse. The RS-20B pulse gates counter I to the memory address register. It should be pointed out that it is necessary to select the proper counter to gate to the cable but the cable in both cases is gated to the memory address register. There are many cases where it is not necessary to distinguish between the two lists because the pulse does exactly the same thing for both lists. An example of this is the RS-21 pulse which is a "store" command to the memory. Steps similar to this are needed for updating either of the two lists From the step RS-39, the program reverts back to RS-2.

As mentioned before, the END routine consists of steps RS-40 through RS-48. The purpose of these steps is to determine which list is longer, and make the longest list equal to the shorter list.

The following will be a detailed description of each step in the microprogram.

The program is started by a pulse on wire 394 which turns "on" single shot 546. This produces the RS-1 pulse which extends to GATE 488 to gate the register labeled CTR.H(ST) to counter H. The RS-1 pulse is also applied to GATE 378 in order to gate the register labeled CTR.I(ST) to counter I.

When single shot 546 goes "off," a pulse is transmitted through OR-circuit 548 to turn "on" single shot 550. This produces the RS-2 pulse which extends through OR-circuit 526 to reset the compare latch 528 to its 0 state. When single shot 550 goes "off," a pulse is produced to turn "on" single shot 552. This produces the RS-3 pulse which is applied to GATE 484 in order to gate counter H to cable 152. The RS-3 pulse also extends through OR-circuit 650 to GATE 498 in order to gate the register labeled CTR.H(LIM) to cable 198. The RS-3 pulse is also applied to GATE 280 in order to gate cables 152 and 198 to the compare unit 278. The pulses which test the output of the compare unit 278 are delayed slightly by the DELAY unit 518 in order to allow the compare mechanism to settle down. The RS-3 pulse is also applied to AND circuit 520. If cable 152 is greater than cable 198, AND circuit 520 will have an output which extends through OR circuit 524 to set the compare latch 528 to is 1 state.

When single shot 552 goes "off," a pulse is produced which turns "on" single shot 554. This produces the RS-4 pulse which extends through the OR-circuit 504 to gate 374 in order to gate counter I to cable 152. The RS-4 pulse also extends through OR-circuit 652 to GATE 510 in order to gate the register labeled CTR.I(LIM) to cable 198. The RS-4 pulse also extends through OR circuit 312 to GATE 280 in order to gate cables 152 and 198 to the compare unit 278. The RS-4 pulse is also applied to AND circuit 522. If cable 152 is greater than cable 198, AND circuit 522 will have an output which extends through OR-circuit 524 to set the compare latch 528 to its 1 state.

When single shot 554 turns "off," a pulse is produced which turns "on" single shot 654. This produces the RS-5 pulse which is applied to gate 530 in order to test the state of the compare latch 528. If this latch is in its 1 state, a pulse will appear on wire 430. If the latch is in its 0 state, a pulse will appear on wire 432. The pulse on wire 430 will turn "on" single shot 628 in order to produce the RS-40 pulse. The pulse on wire 432 will turn "on" single shot 556. This produces the RS-6 pulse which extends through OR-circuit 478 to GATE 434 in order to gate counter H to cable 198. The RS-6 pulse also extends through OR-circuit 212 to GATE circuit 214 in order to gate cable 198 to the memory address register.

When single shot 556 goes "off", single shot 558 is turned "on." This produces the RS-7 pulse which extends through OR-circuit 396 to give a "read" command to the memory.

When single shot 558 turns "off," a pulse is produced to turn "on" single shot 560. This produces the RS-8 pulse which extends through OR-circuit 398 to GATE 264 in order to GATE the memory data register to cable 152. The RS-8 pulse also extends through OR-circuit 468 to gate 184 in order to gate cable 152 to register 1.

When single shot 560 turns "off," a pulse is produced to turn "on" single shot 562. This produces the RS-9 pulse which extends through OR-circuit 656 to gate 376 in order to gate counter I to cable 198. The RS-9 pulse also extends through OR-circuit 212 to GATE 214 in order to gate cable 198 to the memory address register.

When single shot 562 turns "off," a pulse is produced to turn "on" single shot 564. This produces the RS-10 pulse which extends through OR-circuit 396 in order to give a "read" command to the memory.

When single shot 564 turns "off," a pulse is produced to turn "on" single shot 566. This produces the RS-11 pulse which extends through OR-circuit 398 to GATE 364 in order to gate the memory data register to cable 152. The RS-11 pulse also extends through OR-circuit 154 to GATE 156 in order to gate cable 152 to register 3.

When single shot 556 turns "off," a pulse is produced to turn "on" single shot 568. This produces the RS-12 pulse which extends to GATE 254 in order to gate register 1 to cable 152. The RS-12 pulse also extends through OR-circuit 472 to gate 192 in order to gate register 3 to cable 198. The RS-12 pulse also extends through OR-circuit 312 to GATE 280 in order to gate cables 152 and 198 to the compare unit 278. A slightly delayed RS-12 pulse is applied to GATE 532 in order to test the output of the compare unit 278. If cable 152 is greater than cable 198, the pulse will appear on wire 536. If this is not the case, a pulse will occur on wire 438. A pulse on wire 436 will turn "on" single shot 570 and a pulse on wire 438 will turn "on" single shot 572. Assuming that single shot 570 is turned "on," the RS-13 pulse is produced. This pulse extends through OR-circuit 524 to set the compare latch to its 1 state. The RS-13 pulse also extends through OR-circuit 874 to GATE 658 in order to gate register 1 to cable 196. The RS-13 pulse also extends through OR-circuit 472 to gate 192 in order to gate register 3 to cable 198. The RS-13 pulse also extends through OR-circuit 540 to GATE 390 in order to GATE cables 196 and 198 to the subtractor 428. It will be noted that GATE 390 is enabled in this case because the value on cable 196 is greater than the value on cable 198. The RS-13 pulse is also applied to OR-circuit 542, the output of which extends to GATE 392 in order to gate the output of the subtractor to cable 152. The RS-13 pulse also extends through OR-circuit 172 to GATE 174 in order to gate cable 152 to register 2.

When single shot 572 goes "off," a pulse extends through OR-circuit 574 to turn "on" single shot 576. This produces the RS-15 pulse which is used to set register 4 to 00–1100100.

When single shot 576 turns "off," a pulse is produced to turn "on" single shot 578. This produces the RS-16 pulse which extends through OR-circuit 662 to GATE 250 in order to gate register 2 to cable 152. The RS-16 pulse also extends through OR-circuit 474 to GATE 440 in order to gate register 4 to cable 198. The RS-16 pulse also extends through OR-circuit 312 to GATE 280 in order to gate cables 152 and 198 to the compare unit 278. A slightly delayed RS-16 pulse is applied to gate 534 in order to test the outputs of the compare unit 278. If cable 152 is greater than cable 198, a pulse will appear on wire 442. If this is not the case, a pulse will appear on wire 444. A pulse on wire 442 will turn "on" single shot 586. A pulse on wire 444 will turn "on" single shot 580. This produces the RS-17 pulse which extends to OR-circuit 480 to increment counter H. The RS-17 pulse also extends through OR-circuit 502 to increment counter I. It will be noted that when single shot 580 goes "off", a pulse is produced which extends through OR-circuit 548 to again turn "on" single shot 550.

When single shot 586 is turned "on," the RS-20 pulse is produced. The RS-20A pulse extends through OR-circuit 478 to GATE 434 in order to gate counter H to cable 198. The RS-20B pulse extends through OR-circuit 656 to GATE 376 in order to gate counter I to cable 198. The RS-20 pulse extends through OR-circuit 212 to GATE 214 in order to gate cable 198 to the memory address register. The RS-20 pulse extends through OR-circuit 470 to GATE 446 in order to gate register 3 to cable 152. The RS-20 pulse also extends through OR-circuit 218 to GATE 220 in order to gate cable 152 to the memory data register.

When single shot 586 turns "off," a pulse is produced to turn "on" single shot 588. This produces the RS-21 pulse which extends through OR-circuit 224 in order to give a "store" command to the memory.

When single shot 588 turns "off," a pulse is produced to turn "on" single shot 590. This produces the RS-22 pulse. The RS-22A pulse extends through OR-circuit 480 to increment counter H. The RS-22B pulse extends through OR-circuit 502 to increment counter I.

When single shot 590 turns "off," a pulse is produced to turn "on" single shot 592. This produces the RS-23 pulse. The RS-23A pulse extends through OR-circuit 478 to gate 434 in order to gate counter H to cable 198. The RS-23B pulse extends through OR-circuit 656 to GATE 376 in order to gate counter I to cable 198. The RS-23 pulse extends through OR-circuit 212 to GATE 214 in order to gate cable 198 to the memory address register.

When single shot 592 turns "off," a pulse is produced to turn "on" single shot 594. This produces the RS-24 pulse which extends through OR-circuit 396 to give a "read" command to the memory.

When single shot 594 turns "off," a pulse is produced to turn "on" single shot 596. This produces the RS-25 pulse which extends through OR-circuit 398 to GATE 264 in order to gate the memory data register to cable 152. The RS-25 pulse also extends through OR-circuit 154 to GATE 156 in order to gate cable 152 to register 3.

When single shot 596 turns "off," a pulse is produced to turn "on" single shot 598. This produces the RS-26 pulse which extends through OR-circuit 662 to GATE 250 in order to gate register 2 to cable 152. The RS-26 pulse also extends through OR-circuit 218 to GATE 220 in order to gate cable 152 to the memory data register.

When single shot 598 turns "off," a pulse is produced which turns "on" single shot 600. This produces the RS-27 pulse which extends through OR-circuit 224 to give a "store" command to the memory. The RS-27A pulse extends through OR-circuit 482 to GATE 484 in order to GATE counter H to cable 152. The RS-27B pulse extends through OR-circuit 504 to gate 374 in order to gate counter I to cable 152. The RS-27 pulse extends through OR-circuit 476 to GATE 206 in order to gate cable 152 to register 4.

When single shot 600 turns "off," a pulse is produced which extends through OR-circuit 602 to turn "on" single shot 604. This produces the RS-28 pulse which extends through OR-circuit 470 to GATE 446 in order to GATE register 3 to cable 152. The RS-28 pulse also extends through OR-circuit 172 to GATE 174 in order to gate cable 152 to register 2.

When single shot 604 turns "off," a pulse is produced which turns "on" 606. This produces the RS-29 pulse. The RS-29A pulse extends through OR-circuit 480 to increment counter H. The RS-29B pulse extends through OR-circuit 502 to increment counter I.

When single shot 606 turns "off," a pulse is produced to turn "on" single shot 608. This produces the RS-30 pulse. The RS-30A pulse extends through OR-circuit 482 to GATE 484 in order to gate counter H to cable 152. The RS-30A pulse also extends through OR-circuit 650 to gate 498 in order to gate the register labeled CTR.H(LIM) to cable 198. The RS-30B pulse extends through OR-circuit 504 to GATE 374 in order to gate CTR.I to cable 152. The RS-30B pulse also extends through OR-circuit 652 to GATE 510 in order to gate CTR.I(LIM) to cable 198. The RS-30 pulse extends through OR-circuit 312 to GATE 280 in order to gate cables 152 and 198 to the compare unit 278. A slightly delayed RS-30 pulse is applied to GATE 536 in order to test the output of the compare unit 278. If cable 152 is greater than cable 198, a pulse will appear on wire 448. If this is not the case, a pulse will appear on wire 450. A pulse on wire 448 will turn "on" single shot 620. A pulse on wire 450 will turn "on" single shot 610. This will produce the RS-31 pulse.

The RS-31A pulse extends through OR-circuit 478 to GATE 434 in order to gate counter H to cable 198. The RS-31B pulse extends through OR-circuit 656 to GATE 376 in order to gate counter I to cable 198. The RS-31 pulse extends through OR-circuit 212 to gate 214 in order to gate cable 198 to the memory address register.

When single shot 610 turns "off," a pulse is produced to turn "on" single shot 612. This produces the RS-32 pulse which extends through OR-circuit 396 in order to give a "read" command to the memory.

When single shot 612 turns "off," a pulse is produced to turn "on" single shot 614. This produces the RS-33 pulse which extends through OR-circuit 398 to GATE 264 in order to gate the memory data register to cable 152. The RS-33 pulse also extends through OR-circuit 154 to GATE 156 in order to gate cable 152 to register 3.

When single shot 614 turns "off," a pulse is produced to turn "on" single shot 616. This produces the RS-34 pulse which extends through OR-circuit 662 to GATE 250 in order to gate register 2 to cable 152. The RS-34 pulse also extends through OR-circuit 218 to GATE 220 in order to gate cable 152 to the memory data register.

When single shot 616 turns "off," a pulse is produced to turn "on" single shot 618. This produces the RS-35 pulse which extends through OR-circuit 224 in order to give a "store" command to the memory.

When single shot 618 goes "off," a pulse is produced which extends through OR-circuit 602 to again turn on single shot 604. In this way, the program reverts back to RS-28 and this loop is repeated until counter H exceeds counter H(LIM) or until counter I exceeds counter I(LIM) as the case may be. This determination is made at the RS-30 step and, if successful, the program will branch to RS-36 which means that single shot 620 must be turned "on." The RS-36A pulse extends through OR-circuit 478 to GATE 434 in order to gate counter H to cable 198. The RS-36B pulse extends through OR-circuit 656 to GATE 376 in order to gate counter I to cable 198. The RS-36 pulse extends through OR-circuit 212 to GATE 214 in order to gate cable 198 to the memory address register. The RS-36 pulse also extends through OR-circuit 662 to GATE 250 in order to gate register 2 to cable 152. The RS-36 pulse also extends through OR-circuit 218 to GATE 220 in order to gate cable 152 to the memory data register.

When single shot 620 turns "off," a pulse is produced to turn "on" single shot 622. This produces the RS-37 pulse which extends through OR-circuit 224 in order to give a "store" command to the memory.

When single shot 622 turns "off", a pulse is produced to turn "on" single shot 624. This produces the RS-38 pulse. The RS-38A pulse extends through OR-circuit 482 to GATE 484 in order to gate counter H to cable 152. The RS-38A pulse also extends through OR-circuit 494 to GATE 492 in order to gate cable 152 to the register labeled CTR.H(LIM). The RS-38B pulse extends through OR-circuit 504 to GATE 374 in order to gate counter I to cable 152. The RS-38B pulse also extends through OR-circuit 508 to GATE 506, in order to gate cable 152 to the register labeled CTR.I(LIM).

When single shot 624 turns "off," a pulse is produced to turn "on" single shot 626. This produces the RS-39 pulse. The RS-39 pulse is applied to GATE 216 in order to gate register 4 to cable 152. The RS-39A pulse is also applied to GATE 490 in order to gate cable 152 to counter H. The RS-39A pulse also extends through OR-circuit 502 to increment counter I. The RS-39B pulse extends through GATE 500 where it allows cable 152 to be gated to counter I. The RS-39B pulse also extends through OR-circuit 480 to increment counter H.

When single shot 626 turns "off," a pulse is produced which extends through OR-circuit 548 to again turn "on" single shot 550. In this manner, the program reverts back to RS-2.

When the program branches to RS-40 (End Routine) as it eventually will do as a result of a test by RS-5, single shot 628 will be turned "on". The RS-40 pulse is applied to GATE 496 in order to gate the register labeled CTR.H(LIM) to cable 152. The RS-40 pulse also extends through OR-circuit 468 to GATE 184 in order to gate cable 152 to register 1.

When single shot 628 turns "off," a pulse is produced which turns "on" single shot 630. This produces the RS-41 pulse which is applied to gate 452 in order to gate the register labeled CTR.H(ST) to cable 152. The RS-41 pulse also extends through OR-circuit 154 to GATE 156 in order to gate cable 152 to register 3.

When single shot 630 turns "off," a pulse is produced to turn "on" single shot 632. This produces the RS-42 pulse which extends through OR-circuit 874 to GATE 658 in order to gate register 1 to cable 196. The RS-42 pulse also extends through OR-circuit 472 to GATE 192 in order to gate register 3 to cable 198. The RS-42 pulse also extends through OR-circuit 540 to GATE 390 in order to gate cables 196 and 198 to the subtractor 428. The RS-42 pulse also extends through OR-circuit 172 to gate 174 in order to gate cable 152 to register 2.

When single shot 632 turns "off," a pulse is produced to turn "on" single shot 634. This produces the RS-43 pulse. The RS-43 pulse is applied to GATE 454 in order to GATE the register labeled CTR.I(LIM) to cable 152. The RS-43 pulse also extends through OR-circuit 468 to GATE 184 in order to gate cable 152 to register 1.

When single shot 634 goes "off," a pulse is produced to turn "on" single shot 636. This produces the RS-44 pulse which is applied to GATE 456 in order to gate the register labeled CTR.I(ST) to cable 152. The RS-44 pulse also extends through OR-circuit 154 to GATE 156 in order to gate cable 152 to register 3.

When single shot 636 turns "off," a pulse is produced to turn "on" single shot 638. This produces the RS-45 pulse which extends through OR-circuit 874 to GATE 658 in order to gate register 1 to cable 196. The RS-45 pulse also extends through OR-circuit 472 to GATE 192 in order to gate register 3 to cable 198. The RS-45 pulse also extends through OR-circuit 540 to GATE 390 in order to gate cables 196 and 198 to the subtractor 428. The RS-45 pulse also extends through OR-circuit 542 to GATE 392 in order to gate the output of the subtractor to cable 152. The RS-45 pulse also extends through OR-circuit 476 to GATE 206 in order to gate cable 152 to register 4.

When single shot 638 turns "off," a pulse is produced to turn "on" single shot 640. This produces the RS-46 pulse which passes through OR-circuit 662 to GATE 250 in order to gate register 2 to cable 152. The RS-46 pulse also extends through OR-circuit 474 to GATE 440 in order to gate register 4 to cable 198. The RS-46 pulse also extends through OR-circuit 312 to GATE 280 in order to gate cables 152 and 198 to the compare unit 278. The RS-46 pulse also passes through the DELAY UNIT 518 and is applied to GATE 538. If cable 152 is greater than cable 198, a pulse will appear on wire 458. If this is not the case, a pulse will appear on wire 460. A pulse on wire 458 will turn "on" single shot 642 and a pulse on wire 460 will turn "on" single shot 644.

Assuming that single shot 642 is turned "on", the RS-47 pulse is produced. The RS-47 pulse is applied to GATE 486 in order to gate the register CTR.H(ST) to cable 196. The RS-47 pulse also extends through OR-circuit 474 to GATE 440 in order to gate register 4 to cable 198. The RS-47 pulse also extends through OR-circuit 512 to GATE 516 in order to gate cables 196 and 198 to the adder 664. The RS-47 pulse also extends through OR-circuit 514 to GATE 666 in order to gate the output of the adder to cable 152. The RS-47 pulse also extends through OR-circuit 494 to GATE 492 in order to gate cable 152 to the register labeled CTR.H(LIM).

When single shot 642 turns "off," a pulse is produced is transmitted via OR-circuit 646 to wire 648 which starts the next microprogram.

When single shot 644 is turned "on," the RS-48 pulse is produced. The RS-48 pulse is applied to GATE 462 in order to gate the register labeled CTR.I(ST) to cable 198. The RS-48 pulse is also applied to gate 660 in order to gate register 2 to cable 196. The RS-48 pulse also extends through OR-circuit 512 to GATE 516 in order to gate cables 196 and 198 to the adder 664. The RS-47 pulse also extends through OR-circuit 514 to GATE 666 in order to gate the output of the adder to cable 152. The RS-48 pulse also extends through OR-circuit 508 to GATE 506 in order to gate cable 152 to the register labeled CTR.I(LIM). When single shot 644 turns "off," a pulse is produced which extends through OR-circuit 646 to wire 648 in order to start the next microprogram.

| REVISED SEGMENT LIST SUBSYSTEM CLOCK SEQUENCE (RS) | |
|---|---|
| RS-1 | Gate CTR.H(ST) to CTR.H<br>Gate CTR.I(ST) TO CTR.I<br>→ RS-2 |
| RS-2 | Reset Compare Latch to "0"<br>→ RS-3 |
| RS-3 | Is CTR.H > CTR.H(LIM)?<br>yes → set Compare Latch to "1"<br>no → do nothing<br>→ RS-4 |
| RS-4 | Is CTR.I > CTR.I(LIM)?<br>yes → set Compare Latch to "1"<br>no → do nothing<br>→ RS-5 |
| RS-5 | Test Compare Latch<br>if =0 → RS-6<br>if =1 → RS-40 |
| RS-6 | Gate CTR.H to MAR<br>→ RS-7 |
| RS-7 | Read<br>→ RS-8 |
| RS-8 | Gate MDR to Register No. 1<br>→ RS-9 |
| RS-9 | Gate CTR.I to MAR<br>→ RS-10 |
| RS-10 | Read<br>→ RS-11 |
| RS-11 | Gate MDR to Register No. 3<br>→ RS-12 |
| RS-12 | Is Register No. 1 > Register No. 3?<br>yes → RS-13 (set Compare Latch to "1")<br>no → RS-14 (set Compare Latch to "0") |
| RS-13 | Gate Register No. 1 and Register No. 3 to subtractor (normal)<br>Gate output of subtractor to Register No. 2<br>→ RS-15 |
| RS-14 | Gate Register No. 1 and Register No. 3 to subtractor (reverse)<br>Gate output of subtractor to Register No. 2<br>→ RS-15 |
| RS-15 | Set Register No. 4 to 00-1100100<br>→ RS-16 |
| RS-16 | Is Register No. 2 > Register No. 4?<br>no → RS-17<br>yes → RS-20 |
| RS-17 | Increment CTR.H<br>Increment CTR.I<br>→ RS-2 |
| RS-20B | Gate CTR.I to MAR |
| RS-20A | Gate CTR.H to MAR |
| RS-20 | Gate Register No. 3 to MDR<br>→ RS-21 |
| RS-21 | Store MDR<br>→ RS-22 |
| RS-22A | Increment CTR.H |
| RS-22B | Increment CTR.I<br>→ RS-23 |
| RS-23A | Gate CTR.H to MAR |
| RS-23B | Gate CTR.I to MAR<br>→ RS-24 |
| RS-24 | Read<br>→ RS-25 |
| RS-25 | Gate MDR to Register No. 3<br>→ RS-26 |
| RS-26 | Gate Register No. 2 to MDR<br>→ RS-27 |
| RS-27 | Store MDR |
| RS-27A | Gate CTR.H to Register No. 4 |
| RS-27B | Gate CTR.I to Register No. 4<br>→ RS-28 |
| RS-28 | Gate Register No. 3 to Register No. 2<br>→ RS-29 |
| RS-29A | Increment CTR.H |
| RS-29B | Increment CTR.I<br>→ RS-30 |
| RS-30A | Is CTR.H > CTR.H(LIM)? |
| RS-30B | Is CTR.I > CTR.I(LIM)?<br>no → RS-31<br>yes → RS-36 |
| RS-31A | Gate CTR.H to MAR |
| RS-31B | Gate CTR.I to MAR<br>→ RS-32 |
| RS-32 | Read<br>→ RS-33 |
| RS-33 | Gate MDR to Register No. 3<br>→ RS-34 |

-continued

| REVISED SEGMENT LIST SUBSYSTEM CLOCK SEQUENCE (RS) | |
|---|---|
| RS-34 | Gate Register No. 2 to MDR<br>→ RS-35 |
| RS-35 | Store<br>→ RS-28 |
| RS-36B | Gate CTR.I to MAR |
| RS-36A | Gate CTR.H to MAR |
| RS-36 | Gate Register No. 2 to MDR<br>→ RS-37 |
| RS-37 | Store<br>→ RS-38 |
| RS-38A | Gate CTR.H to CTR.H(LIM) |
| RS-38B | Gate CTR.I to CTR.I(LIM)<br>→ RS-39 |
| RS-39B | Gate Register No. 4 to CTR.I |
| RS-39A | Gate Register No. 4 to CTR.H |
| RS-39A | Increment CTR.I |
| RS-39B | Increment CTR.H<br>→ RS-2 |
| End Routine | |
| RS-40 | Gate CTR.H(LIM) to Register No. 1<br>→ RS-41 |
| RS-41 | Gate CTR.H(ST) to Register No. 3<br>→ RS-42 |
| RS-42 | Gate Register No. 1 and Register No. 3 to subtractor and place result in Register No. 2<br>→ RS-43 |
| RS-43 | Gate CTR.I(LIM) to Register No. 1<br>→ RS-44 |
| RS-44 | Gate CTR.I(ST) to Register No. 3<br>→ RS-45 |
| RS-45 | Gate Register No. 1 and Register No. 3 to subtractor and place result in Register No. 4<br>→ RS-46 |
| RS-46 | Compare Register No. 2 and Register No. 4<br>Is Register No. 2 > Register No. 4?<br>If so → RS-47<br>If not, → RS-48 |
| RS-47 | Gate CTR.H(ST) and Register No. 4 to adder<br>Gate result to CTR.H(LIM)<br>→ next microprogram |
| RS-48 | Gate CTR.I(ST) and Register No. 2 to adder<br>Gate result to CTR.I(LIM)<br>→ next microprogram |

MEAN SEGMENT LISTS SUBSYSTEM (ME) (FIGS. 7A–7E)

This subsystem is used to compute the "mean" value of each segment in both the reference segment list and in the sample segment list. Two new lists will be generated. There will be a "mean" segment list for the reference and a "mean" segment list for the sample. The starting address for the reference "mean" segment list is held in the register labeled CTR.J(ST). The starting address for the sample "mean" segment list is held in the register labeled CTR.K(ST). Because these MEAN segment lists are the same length as both the reference segment list and the sample segment list, it is not believed necessary in the following description to specify the limit address for either of the MEAN segment lists.

Figure 7:
FIG. 7 comprises an organizational drawing for FIGS. 7A through 7E.

The subsystem to be described is shown in the composite drawing of FIG. 7 and is generally under the control of counter H which normally relates to the reference segment list and counter B which relates to the reference clipped list. A "MEAN" program latch is used which is first set to 0. This permits the microprogram to first generate the MEAN segment list for the reference. When this list is completed, the "MEAN" program latch is set to 1. The value in the register labeled CTR.I(ST) is gated to counter H, the value in the register labeled CTR.C(ST) is gated to counter B and the value in the register labeled CTR.K(ST) is gated to counter J. The value in the register labeled CTR.I(LIM) is gated to the register labeled CTR.H(LIM). The sequence then repeats but this time it generates the MEAN segment list for the sample.

The microprogram is started by the pulse on wire 648 which turns "on" single shot 726. This produces the ME-1 pulse which is used to reset the "MEAN" program latch 668 to its 0 state. The ME-1 pulse is also applied to GATE 488 in order to gate the register labeled CTR.H(ST), to counter H. The ME-1 pulse is also applied to GATE 690 in order to gate the register labeled CTR.B(ST), to counter B. The ME-1 pulse is also applied to GATE 696 in order to gate the register labeled CTR.J(ST) to counter J. The ME-1 pulse is also applied to register No. 4 in order to set it to the binary equivalent of the decimal number 30.

When single shot 726 turns "off," a pulse is transmitted through OR-circuit 728 to turn "on" single shot 730. This produces the ME-2 pulse which is applied to GATE 434 in order to gate counter H to cable 198. The ME-2 pulse also extends through OR-circuit 212 to GATE 214 in order to gate cable 198 to the memory address register. When single shot 730 turns "off," a pulse is produced which turns "on" single shot 732. This produces the ME-3 pulse which extends through OR-circuit 396 to give a "read" command to the memory.

When single shot 732 turns "off", a pulse is produced which turns "on" single shot 734. This produces the ME-4 pulse which extends through OR-circuit 398 to GATE 264 in order to gate the memory data register to cable 152. The ME-4 pulse is also applied to GATE 184 in order to gate cable 152 to register 1.

When single shot 734 turns "off," a pulse is produced which turns "on" single shot 736. This produces the ME-5 pulse which is applied to GATE 254 in order to gate register 1 to cable 152. The ME-5 pulse is also applied to GATE 440 in order to gate register 4 to cable 198. The ME-5 pulse is also applied to GATE 280 in order to gate cables 152 and 198 to the compare unit 278. A slightly delayed ME-5 pulse appears at the output of DELAY unit 714 and is applied to GATE 720 in order to test the compare unit 278. If cable 152 is greater than cable 198, a pulse will appear on wire 672. If this is not the case, a pulse will appear on wire 670. The pulse on wire 670 passes through OR-circuit 774 and turns "on" single shot 760. A pulse on wire 672 will turn "on" single shot 738. This produces the ME-6 pulse which is used to set counter A to 1. The ME-6 pulse is also used to reset the algebraic accumulator 780 to all "0's."

When single shot 738 turns "off," a pulse extends through OR-circuit 740 to turn "on" single shot 742. This produces the ME-7 pulse which is applied to GATE 688 in order to gate counter B to cable 198. The ME-7 pulse also extends through OR-circuit 212 to GATE 214 in order to gate cable 198 to the memory address register.

When single shot 742 turns "off," a pulse is produced which turns "on" single shot 744. This produces the ME-8 pulse which extends through OR-circuit 396 to give a "read" command to the memory.

When single shot 744 turns "off," a pulse is produced to turn "on" single shot 746. This produces the ME-9 pulse which extends through OR-circuit 398 to GATE 264 in order to gate the memory data register to cable 152. The ME-9 pulse is also applied to GATE 702 in order to gate cable 152 to the algebraic accumulator 780.

When single shot 746 turns "off", a pulse is produced to turn "on" single shot 748. This produces the ME-10 pulse which is used to increment counter A.

When single shot 748 turns "off," a pulse is produced to turn "on" single shot 750. This produces the ME-11 pulse which is applied to GATE 242 in order to gate counter A to cable 152. The ME-11 pulse is also applied to GATE 682 in order to gate register 1 to cable 198. The ME-11 pulse also extends through OR-circuit 312 to GATE 280 in order to gate cables 152 and 198 to the compare mechanism 278. The ME-11 pulse also extends through the DELAY unit 716 to GATE 722 in order to test the output of the compare unit 278. If cable 152 is greater than cable 198, a pulse will appear on wire 676. If this is not the case, the pulse will appear on wire 674. A pulse on wire 676 will turn "on" single shot 754. A pulse on wire 674 will turn "on" single shot 752. This produces the ME-12 pulse which extends through OR-circuit 686 to increment counter B. The ME-13 pulse is applied to GATE 704 in order to gate the output of the algebraic accumulator 780 to cable 198. The ME-13 pulse is also applied to gate 658 in order to gate register 1 to cable 196. The ME-13 pulse is also applied to GATE 706 in order to gate cables 196 and 198 to the divider 708. The ME-13 pulse is also applied to GATE 710 in order to gate the quotient to cable 152. The ME-13 pulse is also applied to GATE 174 in order to gate cable 152 to register 2. When single shot 754 turns "off," a pulse is produced which turns "on" single shot 756. This produces the ME-14 pulse which is applied to GATE 694 in order to gate counter J to cable 152. The ME-14 pulse also extends through OR-circuit 212 to GATE 214 in order to gate cable 198 to the memory address register. The ME-14 pulse is also applied to GATE 250 in order to gate register 2 to cable 152. The ME-14 pulse is also applied to GATE 220 in order to gate cable 152 to the memory data register.

When single shot 756 turns "off," a pulse is produced to turn "on" single shot 758. This produces the ME-15 pulse which is used to give a "store" command to the memory.

When single shot 758 turns "off," a pulse is transmitted through OR-circuit 774 to turn "on" single shot 760. This produces the ME-16 pulse which is used to increment counters J, H and B.

When single shot 760 turns "off," a pulse is produced to turn "on" single shot 762. This produces the ME-17 pulse which is applied to GATE 484 in order to gate counter H to cable 152. The ME-17 pulse is also applied to GATE 498 in order to gate the register labeled CTR.H(LIM) to cable 198. The ME-17 pulse also extends through OR-circuit 312 to GATE 280 in order to gate cables 152 and 198 to the compare mechanism 278. The ME-17 pulse also extends through the DELAY unit 718 to GATE 724 in order to test the compare unit 278. If cable 152 s greater than cable 198, a pulse will appear on wire 680. If this is not the case, a pulse will appear on wire 678. A pulse on wire 678 extends through OR-circuit 728 to turn "on" single shot 730. In this way, the microprogram reverts back to ME-2. A pulse on wire 680 will turn "on" single shot 764. This produces the ME-18 pulse which is applied to GATE 712 in order to test the "mean" program latch 668. If this latch is on 1, it means the end of the microprogram and a pulse will appear on wire 778 which will turn "on" the next microprogram. If this latch is in its 0 state, a pulse will appear on wire 776 which turns "on" single shot 766. This produces the ME-19 pulse which sets the "mean" program latch 668 to its 1 state. The ME-19 pulse is also applied to GATE 456 in order to gate the register labeled CTR.I(ST) to cable 152. The ME-19 pulse is also applied to GATE 490 in order to gate cable 152 to counter H.

When single shot 766 turns "off," a pulse is produced which turns "on" single shot 768. This produces the ME-20 pulse which is applied to GATE 698 in order to gate the register labeled CTR.C(ST) to cable 152. The ME-20 pulse is also applied to GATE 684 in order to gate cable 152 to counter B.

When single shot 768 turns "off," a pulse is produced which turns "on" single shot 770. This produces the ME-21 pulse which is applied to GATE 700 in order to gate the register labeled CTR.K(ST) to cable 152. The ME-21 pulse is also applied to GATE 692 in order to gate cable 152 to counter J.

When single shot 770 turns "off," a pulse is produced to turn "on" single shot 772. This produces the ME-22 pulse which extends to GATE 454 in order to gate the register labeled CTR.I(LIM) to cable 152. The ME-22 pulse is also applied to GATE 492 in order to gate cable 152 to the register labeled CTR.H(LIM). When single shot 772 turns "off" a pulse is produced which passes through OR-circuit 728 to again turn "on" single shot 732 which produces the ME-2 pulse.

| MAKE LISTS OF SEGMENT MEANS SUBSYSTEM CLOCK SEQUENCE (ME) | |
|---|---|
| ME-1 | Reset "mean" Program Latch to "0" <br> Gate CTR.H(ST) to CTR.H <br> Gate CTR.B(ST) to CTR.B <br> Gate CTR.J(ST) to CTR.J <br> Gate "30" to Register No. 4 <br> → ME-2 |
| ME-2 | Gate CTR.H to MAR <br> → ME-3 |
| ME-3 | Read Memory <br> → ME-4 |
| ME-4 | Gate MDR to Register No. 1 <br> → ME-5 |
| ME-5 | Is Register No. 1 > Register No. 4? <br> if yes → ME-6 <br> if no → ME-16 <br> (note that segment value is in register No. 1) |
| ME-6 | Set CTR.A to 00-01 <br> Reset ACCUM. to 00-00 <br> → ME-7 |
| ME-7 | Gate CTR.B to MAR <br> → ME-8 |
| ME-8 | Read Memory <br> → ME-9 |
| ME-9 | Gate MDR to ACCUM. <br> → ME-10 |
| ME-10 | Increment CTR.A <br> → ME-11 |
| ME-11 | Is CTR.A > Register No. 1? <br> if yes → ME-13 <br> if no → ME-12 |
| ME-12 | Increment CTR.B <br> → ME-7 |
| ME-13 | Gate ACCUM. to Divider as dividend <br> Gate Register No. 1 to Divider as divisor <br> Gate Divider to Register No. 2 <br> → ME-14 |
| ME-14 | Gate CTR.J to MAR <br> Gate Register No. 2 to MDR <br> → ME-15 |
| ME-15 | Store <br> → ME-16 |
| ME-16 | Increment CTR.J <br> Increment CTR.H <br> Increment CTR.B <br> → ME-17 |
| ME-17 | Is CTR.H > CTR.H(LIM)? <br> if no → ME-2 <br> if yes → ME-18 |
| ME-18 | Is "MEAN" Program Latch = 1? <br> if no → ME-19 <br> if yes → END |
| ME-19 | Set "MEAN" Program Latch = "1" |

| MAKE LISTS OF SEGMENT MEANS SUBSYSTEM CLOCK SEQUENCE (ME) continued | |
|---|---|
| | Gate CTR.I(ST) to CTR.H <br> → ME-20 |
| ME-20 | Gate CTR.C(ST) to CTR.B <br> → ME-21 |
| ME-21 | Gate CTR.K(ST) to CTR.J <br> → ME-22 |
| ME-22 | Gate CTR.I(LIM) to CTR.H(LIM) <br> → ME-2 |

COMPARE SAMPLE TO REFERENCE SUBSYSTEM (CSR) (FIGS. 8A-8O)

The logical schematic diagram for this portion of the disclosed system comprises FIGS. 8A thru FIGS. 8O and comprises the actual comparison and decision-making steps in the overall system operation.

The operations are started by a pulse on wire 778 which turns "on" single shot 1080. This produces the CSR-1 pulse which is used to initialize certain registers. The CSR-1 pulse is applied to GATE 488 in order to gate the register labeled CTR.H(ST) to counter H. The CSR-1 pulse is applied to GATE 378 in order to gate the register labeled CTR.I(ST) to counter I. The CSR-1 pulse is applied to GATE 900 in order to gate the register labeled CTR.B(ST) to the register labeled CTR.D(ST). The CSR-1 pulse is applied to GATE 904 in order to gate the register labeled CTR.C(ST) to the register labeled CTR.E(ST). The CSR-1 pulse is applied to GATE 696 in order to gate the register labeled CTR.J(ST) to counter J. The CSR-1 pulse is applied to GATE 918 in order to gate the counter labeled CTR.K(ST) to counter K. The CSR-1 pulse is applied to GATE 926 in order to gate the register labeled CTR.L(ST) to counter L.

When single shot 1080 turns "off," a pulse will be transmitted through OR-circuit 1082 to turn "on" single shot 1084. This produces the CSR-2 pulse which is used to reset register No. 3 to all zeros. The CSR-2 pulse is used to set register No. 4 to the binary equivalent of the decimal number 30 (which corresponds to a time of 150 milliseconds. The CSR-2 pulse is used to reset the sign latch 982 to its 0 state. The CSR-2 pulse is used to reset the "MAX.C" register to its all zero state. This register is in the correlate unit 1044 which unit will be described in detail later.

When single shot 1084 turns "off," single shot 1086 will be turned "on" to produce the CSR-3 pulse. The CSR-3 pulse is applied to GATE 376 in order to gate counter I to cable 198. The CSR-3 pulse is applied to OR-circuit 212, the output of which extends to GATE 214 in order to gate cable 198 to the memory address register.

When single shot 1086 turns "off," a pulse will be produced to turn "on" single shot 1088. This produces the CSR-4 pulse which is used to give a read command to the memory.

When single shot 1088 turns "off," a pulse is produced to turn "on" single shot 1090. This produces the CSR-5 pulse which is applied through OR-circuit 398 to GATE 264 in order to gate the memory data register to cable 152. The CSR-5 pulse is applied to GATE 184 in order to gate cable 152 to register no. 1.

When single shot 1090 turns "off," a pulse is produced to turn "on" single shot 1092. This produces the CSR-6 pulse which, is applied to GATE 434 in order to gate counter H to cable 198. The CSR-6 pulse is applied through OR-circuit 212 to GATE 214 in order to gate cable 198 to the memory address register.

When single shot 1092 turns "off," a pulse is produced to turn "on" single shot 1094. This produces the CSR-7 pulse which is applied through OR-circuit 396 to give a read command to the memory.

When single shot 1094 turns "off", a pulse is produced to turn "on" single shot 1096. This produces the CSR-8 pulse which is applied through OR-circuit 398 to GATE 264 in order to gate the memory data register to cable 152. The CSR-8 pulse is applied to GATE 174 in order to gate cable 152 to register No. 2.

When single shot 1096 turns "off", a pulse is produced to turn "on" single shot 1098. This produces the CSR-9 pulse which is applied through OR-circuit 310 to GATE 254 in order to gate register No. 1 to cable 152. The CSR-9 pulse is applied through OR-circuit 880 to GATE 878 in order to gate register No. 2 to cable 198. The CSR-9 pulse is applied through OR-circuit 312 to GATE 280 in order to gate cables 152 and 198 to the compare unit 278. Also, a delayed CSR-9 pulse is applied to GATE 1048 in order to test the output of the compare unit 278. If register No. 1 is greater than register No. 2, a pulse will appear on wire 818. If this is not the case, a pulse will appear on wire 820. A pulse on wire 818 will turn "on" single shot 1100. A pulse on wire 820 will turn "on" single shot 1122. Assuming that single shot 1100 is turned "on," the CSR-10 pulse is produced. The CSR-10 pulse is applied to GATE 254 in order to gate register No. 1 to cable 152. The CSR-10 pulse is applied through OR-circuit 474 to GATE 440 in order to gate register No. 4 to cable 198. The CSR-10 pulse is applied through OR-circuit 312 to GATE 280 in order to gate cables 152 and 198 to the compare unit 278. Also, a delayed CSR-10 pulse is applied to GATE 1050 in order to test the output of the compare unit 278. If register No. 1 is greater than register No. 4, a pulse will appear on wire 822. If this is not the case, a pulse will appear on wire 824. A pulse on wire 822 will turn "on" single shot 1130. A pulse on wire 824 passes through OR-circuit 1102 to turn "on" single shot 1104.

Assuming that single shot 1104 is turned "on", the CSR-11 pulse is produced. The CSR-11 pulse extends through OR-circuit 932 to GATE 928 in order to gate counter L to cable 198. The CSR-11 pulse extends through OR-circuit 212 to GATE 214 in order to gate cable 198 to the memory address register. The CSR-11 pulse extends through OR-circuit 470 to GATE 446 in order to gate register No. 3 to cable 152. The CSR-11 pulse extends through OR-circuit 218 to GATE 220 in order to gate cable 152 to the memory data register.

When single shot 1104 turns "off," a pulse is produced to turn "on" single shot 1106. This produces the CSR-12 pulse which, passes through OR-circuit 224 to give a store command to the memory.

When single shot 1106 turns "off," a pulse is produced which extends through OR-circuit 1108 to turn "on" single shot 1110. This produces the CSR-13 pulse which is used to increment counter H. Also, the CSR-13 pulse is used to increment counter I. The CSR-13 pulse is used to increment counter L.

When single shot 1110 turns "off," a pulse is produced to turn "on" single shot 1112. This produces the CSR-14 pulse which extends to GATE 374 in order to gate counter I to cable 152. Also, the CSR-14 pulse is applied to GATE 510 in order to gate the register labeled CTR.I(LIM) to cable 198. The CSR-14 pulse extends through OR-circuit 312 to GATE 280 in order to gate cables 152 and 198 to the compare unit 278. A delayed CSR-14 pulse is applied to GATE 1052 in order to test the output of the compare unit 278. If counter I is greater than the register labeled CTR.I(-LIM), a pulse will appear on wire 826. If this is not the case, a pulse will appear on wire 828. A pulse on wire 826 is effective to turn "on" single shot 1178. A pulse on wire 828 is used to turn "on" single shot 1114.

Assuming that single shot 1114 is turned "on," the CSR-15 pulse is produced. The CSR-15 pulse extends through OR-circuit 876 to GATE 682 in order to gate register No. 1 to cable 198. The CSR-15 pulse extends through OR-circuit 898 to GATE 892 in order to gate the register labeled CTR.D(ST) to cable 196. The CSR-15 pulse extends through OR-circuit 1000 to GATE 516 in order to gate cables 198 and 196 to the adder 664. The same pulse is also applied to GATE 666 in order to gate the output of the adder to cable 152. The CSR-15 pulse extends through OR-circuit 154 to GATE 156 in order to gate cable 152 to register No. 3.

When single shot 1114 turns "off," a pulse is produced to turn "on" single shot 1116. This produces the CSR-16 pulse which extends through OR-circuit 470 to GATE 446 in order to gate register No. 3 to cable 152. The CSR-16 pulse is applied to GATE 1218 in order to gate cable 152 to the register labeled CTR.D(ST).

When single shot 1116 turns "off," a pulse is produced to turn "on" single shot 1118. This produces the CSR-17 pulse which extends through OR-circuit 880 to GATE 878 in order to gate register No. 2 to cable 198. The CSR-17 pulse extends through OR-circuit 912 to GATE 906 in order to gate the register labeled CTR.E(ST) to cable 196. The CSR-17 pulse extends through OR-circuit 1000 to GATE 516 in order to gate cables 196 and 198 to the adder 664. The same pulse is applied to GATE 666 in order to gate the adder to cable 152.

The CSR-17 pulse extends through OR-circuit 154 to GATE 156 in order to gate cable 152 to register No. 3.

When single shot 1118 turns "off", single shot 1120 is turned "on." This produces the CSR-18 pulse which extends through OR-circuit 470 to GATE 446 in order to gate register No. 3 to cable 152. On the CSR-18 pulse is applied to GATE 902 in order to gate cable 152 to the register labeled CTR.E(ST).

Going back to the time when the CSR-9 pulse was applied to GATE 1048 on sheet No. 10, in order to test the output of the compare unit 278, let it be assumed that a pulse appeared on wire 820. Wire 820 has a pulse on it which would turn "on" single shot 1122 in order to produce the CSR-20 pulse. The CSR-20 pulse extends through OR-circuit 662 to GATE 250 in order to gate register No. 2 to cable 152. The CSR-20 pulse extends through OR-circuit 474 to GATE 440 in order to gate register No. 4 to cable 198. The CSR-20 pulse extends through OR-circuit 312 to GATE 280 in order to gate the cables 152 and 198 to the compare unit 278. A delayed CSR-20 pulse is applied to GATE 1062 in order to test the output of the compare unit 278. If register No. 2 is greater than register No. 4, a pulse will appear on wire 846. If this is not the case, a pulse will appear on wire 848. A pulse on wire 848 passes through OR-circuit 1102 to again turn "on" single shot 1104 in order to produce the CSR-11 pulse. This pulse has been previously described. A pulse on wire 846 turns "on" single shot 1124 to produce the CSR-21 pulse.

The CSR-21 pulse extends through OR-circuit 662 to GATE 250 in order to gate register No. 2 to cable 142. The CSR-21 pulse extends through OR-circuit 978 to GATE 974 in order to gate cable 152 to the shift register 976.

When single shot 1124 turns "off," a pulse is produced which extends through OR-circuit 1126 to turn "on" single shot 1128. This produces the CSR-22 pulse which is used to shift the shift register 976 two places to the right. When this is done, zeros are inserted at the left of the shift register.

Going back, to the time when the CSR-10 pulse was applied to GATE 1050, let it be assumed that a pulse appeared on wire 822. A pulse on wire 822 will turn "on" single shot 1130. This produces the CSR-25 pulse. The CSR-25 pulse passes through OR-circuit 310 to GATE 254 in order to gate register no. 1 to cable 152. The CSR-25 pulse extends through OR-circuit 978 to GATE 974 in order to gate cable 152 to the shift register 976. It will be observed that one or the other of registers No. 1 or No. 2 can be gated to the shift register 976 but only one in any sequence. After one of these registers is gated to the shift register 976, the shift register is shifted right two places by the CSR-22 pulse which has just recently been described. When single shot 1128 turns "off", a pulse is produced which turns "on" single shot 1132. This produces the CSR-26 pulse. The CSR-26 pulse is used to reset the right-hand three bits of the shift register 976 to their zero states.

When single shot 1132 turns "off," single shot 1134 will be turned "on." This produces the CSR-77 pulse which is applied to GATE 988 in order to gate the shift register 976 to the displacement counter 994 in the manner indicated by the diagram. It will be noted that the CSR-27 pulse resets the right-hand bit of the displacement counter 994 to its 0 state. It should also be noted that the portion of the shift register 976 to the left of the right-hand three bits contains the number of "8's" that constitute the displacement. In other words, the displacement can be 8, 16, 24, and so forth. When this portion of the shift register 976 is gated to the displacement counter 994 shifted one place to the left, the displacement counter 994 will contain twice the number of "8's" that are in the shift register 976. When the shift register 976 is added or subtracted to some other register, as will be explained later, the right-hand three bits which are set to zero are needed for this arithmetic operation.

When single shot 1134 turns "off," a pulse extends through OR-circuit 1136 to turn "on" single shot 1138. This produces the CSR-28 pulse which is applied to the correlate unit in order to reset the "COMPARE LATCH." The CSR-28 pulse is applied to GATE 984 in order to test the "SIGN LATCH." If this latch is on 0, it means that the number in the shift register 976 is either zero or positive number. If the latch 982 is in its 1 state, it means that the number in the shift register 976 is a negative number. A pulse on wire 802 would turn "on" single shot 1152. A pulse on wire 800 will turn "on" single shot 1140 in order to produce the CSR-30 pulse. The CSR-30 pulse passes through OR-circuit 882 and is applied to GATE 660 in order to gate register No. 2 to cable 196. The CSR-30 pulse extends through OR-circuit 1224 to GATE 980 in order to gate the shift register 976 to cable 198. The CSR-30 pulse extends through OR-circuit 1002 to GATE 390 in order to gate the cables 196 and 198 to the subtractor 428. The same pulse is also applied to GATE 392 in order to gate the output of the subtractor to cable 152. The CSR-30 pulse extends through OR-circuit 155 to GATE 156 in order to gate cable 152 to register No. 3.

When single shot 1140 turns "off," a pulse is produced which turns "on" single shot 1142. This produces the CSR-31 pulse which extends through OR-circuit 470 to GATE 446 in order to gate register No. 3 to cable 152. The CSR-31 pulse extends through OR-circuit 876 to GATE 682 in order to gate register No. 1 to cable 198. The CSR-31 pulse extends through OR-circuit 312 to GATE 280 in order to gate cables 152 and 198 to the compare unit 278. A delayed CSR-31 pulse is applied to GATE 1054 in order to test the output of the compare unit 278. If register No. 3 is greater than or equal to register No. 1, a pulse will appear on wire 830. If this is not the case, a pulse will appear on wire 832. Wire 830 extends to sheet No. 14 where a pulse on it would start the pulse generator 1182. Wire 832 extends to sheet No. 13 where a pulse on it will turn "on" single shot 1144.

The CSR-32 pulse extends through OR-circuit 874 to GATE 658 in order to gate register No. 1 to cable 196. The CSR-32 pulse extends through OR-circuit 1224 to GATE 980 in order to gate the shift register 976 to cable 198. The CSR-32 pulse extends through OR-circuit 1002 to GATE 390 in order to gate cables 196 and 198 to the subtractor 428. This pulse is also applied to GATE 392 in order to gate the output of the subtractor to cable 152. The CSR-32 pulse extends through OR-circuit 154 to GATE 156 in order to gate cable 152 to register No. 3.

When single shot 1144 turns "off," a pulse is produced to turn "on" single shot 1146. This produces the CSR-33 pulse. The CSR-33 pulse extends through OR-circuit 470 to GATE 446 in order to gate register No. 3 to cable 152. The CSR-33 pulse extends through OR-circuit 880 to GATE 878 in order to gate register No. 2 to cable 198. On sheet No. 10, the CSR-33 pulse extends through OR-circuit 312 to GATE 280 in order to gate cables 152 and 198 to the compare unit 278. A delayed CSR-33 pulse is applied to GATE 1056 in order to test the output of the compare unit 278. If register No. 3 is greater than or equal to register No. 2, a pulse will appear on wire 834. If this is not the case, a pulse will appear on wire 836. A pulse on wire 834 will start the pulse generator 1188. A pulse on wire 836 will turn "on" single shot 1148.

This produces the CSR-34 pulse. The CSR-34 pulse is applied to GATE 658 in order to gate register No. 1 to cable 196. The CSR-34 pulse extends through OR-circuit 1224 to GATE 980 in order to gate the shift register 976 to cable 198. The CSR-34 pulse extends through OR-circuit 1000 to GATE 516 in order to gate cables 196 and 198 to the adder 664. The same pulse is applied to GATE 666 in order to gate the output of the adder to cable 152.

The CSR-34 pulse extends through OR-circuit 154 to GATE 156 in order to gate cable 152 to register No. 3.

When single shot 1148 turns "off," single shot 1150 is turned "on." This produces the CSR-35 pulse. The CSR-35 pulse extends through OR-circuit 470 to GATE 446 in order to gate register No. 3 to cable 152. The CSR-35 pulse extends through OR-circuit 880 to GATE 878 in order to gate register No. 2 to cable 198. The CSR-35 pulse extends through OR-circuit 312 to GATE 280 in order to gate cables 152 and 198 to the compare unit 278. A delayed CSR-35 pulse is applied to gate 1058 in order to test the output of the compare unit 278. If register No. 3 is greater than or equal to register No. 2, a pulse will appear on wire 838. If this is not the case, a pulse will appear on wire 840. A pulse on wire 838 is used to start the pulse generator 1194. A pulse on wire 840 it is used to start pulse generator 1200.

Going back to CSR-28 which was applied to GATe 984 in order to test the sign latch, if a pulse had appeared on wire 802, single shot 1152 would be turned "on." This would produce the CSR-36 pulse. The CSR-36 pulse is applied through OR-circuit 662 to GATE 250 in order to gate register No. 2 to cable 152. The CSR-36 pulse extends through OR-circuit 876 to GATE 682 in order to gate register No. 1 to cable 198. The CSR-36 pulse extends through OR-circuit 312 to GATE 280 in order to gate cables 152 and 198 to the compare unit 278. A delayed CSR-36 pulse is applied to GATE 1064 in order to test the output of the compare unit 278. If register No. 2 is greater than register No. 1, a pulse will appear on wire 850. If this is not the case, a pulse will appear on wire 852. A pulse on wire 850 is used to start the pulse generator 1206. A pulse on wire 852 is used to start the pulse generator 1212.

In the manner just described, the program branches to one of six subsystems whose subroutines are labeled "CC," "CD," "CE," "CF," "CG" and "CH." These six subsystems will be described in detail later after all of the CSR pulses are described.

At the present time, it should be mentioned that OR-circuit 1226 on sheet 14 has six inputs. When any of the just mentioned six subroutines are completed, OR-circuit 1226 will have an output which will result in the turning "on" of single shot 1154. This produces the CSR-37 pulse. The CSR-37 pulse provides the "correlate command" to the correlation unit 1044 which, as mentioned before, will be described in detail later. When this correlaton unit 1044 has completed its operation, a pulse will appear on wire 816. A pulse on wire 816 will turn "on" single shot 1156.

This produces the CSR-38 pulse which is applied to GATE 998 in order to test the displacement counter 994. It will be noted that the displacement counter 994 is applied to a decoder 996 which has an output on one wire if the displacement counter is on zero and an output on another wire if the displacement counter is not on zero. If the displacement counter is on zero, a pulse will appear on wire 812 and if it is not on zero, a pulse will appear on wire 814. A pulse on wire 812 will turn "on" single shot 1168. A pulse on wire 814 will turn "on" single shot 1158 in order to produce the CSR-39 pulse. The CSR-39 pulse is applied to GATE 986 in order to test the sign latch 982. If the latch is on zero, a pulse will appear on wire 804 and if the sign latch is on 1, a pulse will appear on wire 806. A pulse on wire 804 will turn "on" single shot 1172. Wire 806 extends to sheet No. 13 where a pulse on it will pass through OR-circuit 1160 to turn "on" single shot 1162.

This produces the CSR-40 pulse which is used to increment the shift register by 8.

When single shot 1162 turns "off," a pulse is produced which extends through OR-circuit 1164 to turn "on" single shot 1166. This produces the CSR-41 pulse which is used to decrement the displacement counter 994.

Going back to the CSR-38 pulse, which tests the displacement counter, if this counter had been on zero, a pulse would have appeared on wire 812 which would turn "on" single shot 1168. This produces the CSR-42 pulse which extends through OR-circuit 932 to GATE 928 in order to gate counter L to cable 198. The CSR-42 pulse extends through OR-circuit 212 to GATe 214 in order to gate cable 198 to the memory address register. The CSR-42 pulse is applied to GATE 1046 in order to gate the "MAX C" register to cable 152. The CSR-42 pulse extends through OR-circuit 218 to gate 220 in order to gate cable 152 to the memory data register.

On sheet No. 13, when single shot 1168 turns "off", a pulse is produced to turn "on" single shot 1170. This produces the CSR-43 pulse which extends through OR-circuit 224 to give a store command to the memory. It will be noted that when single shot 1170 turns "off," the microprogram reverts back to CSR-13.

Going back to the CSR-39 pulse which was applied to GATE 986 in order to test the sign latch 982, assume that a pulse appeared on wire 804. A pulse on wire 804 would turn "on" single shot 1172 in order to produce the CSR-44 pulse. The CSR-44 pulse is applied to GATE 992 in order to test the shift register 976. If the shift register is on zero, a pulse will appear on wire 808. If it is not on zero, a pulse will appear on wire 810. A pulse on wire 810 would turn "on" single shot 1174 in order to produce the CSR-45 pulse. A pulse on wire 808 would turn "on" single shot 1176 in order to produce the CSR-46 pulse.

The CSR-45 pulse is used to decrement the shift register 976 by 8. The CSR-46 pulse sets the sign latch 982 to its 1 state. It will be noted that when single shot 1174 turns "off," the microprogram will branch to CSR-41 as has been described. When single shot 1176 turns "off," the microprogram will branch to CSR-40 which has also been previously described.

Going back to the CSR-14 pulse which tested GATE 1052 if a pulse occurs on wire 826, single shot 1178 will be turned "on" thus producing the CSR-47 pulse. The CSR-47 pulse is used to decrement counter L.

When single shot 1178 turns "off," a pulse is produced to turn "on" single shot 1180. This produces the CSR-48 pulse which is applied to GATE 930 in order to gate counter L to the register labeled CTR.L(LIM).

This completes the description of the CSR sequence. The next sequence to be described is the "CC" sequence.

There are two pulse generators 1182 and 1186. 1182 provides the pulses CC-1 through and including CC-13. These pulses are used only once in the "CC" sequence. The pulse generator 1186 which supplies the pulses CC-14 through and including CC-22 is used as many times as required. In other words, the pulse generator 1186 is used as an interactive "loop." The CC-1 pulse extends through OR-circuit 662 to GATE 250 in order to gate register No. 2 to cable 152. The CC-1 pulse extends through OR-circuit 1018 to GATE 1040 in order to gate cable 152 to the La register in the correlation unit 1044.

The CC-2 pulse extends through OR-circuit 310 to GATE 254 in order to gate register No. 1 to cable 152. The CC-2 pulse extends through OR-circuit 1022 to GATE 1030 in order to gate cable 152 to the OV register in the correlate unit 1044. The CC-2 pulse also extends through OR-circuit 1020 to GATE 1042 in order to gate cable 152 to the Lb register in the correlate unit 1044.

The CC-3 pulse extends through OR-circuit 924 to GATE 922 in order to gate counter K to cable 198. The CC-3 pulse extends through OR-circuit 212 to GATE 214 in order to gate cable 198 to the memory address register.

The CC-4 pulse extends through OR-circuit 396 to give a read command to the memory. The CC-4 pulse extends through OR-circuit 920 in order to increment counter K.

The CC-5 pulse extends through OR-circuit 398 to GATE 264 in order to gate the memory data register to cable 152. The CC-5 pulse extends through OR-circuit 1024 to GATE 1034 in order to gate cable 152 to the Ma register in the correlate unit 1044. The CC-6 pulse extends through OR-circuit 916 to GATE 694 in order to gate counter J to cable 198. The CC-6 pulse extends through OR-circuit 212 to GATE 214 in order to gate cable 198 to the memory address register.

The CC-7 pulse extends through OR-circuit 396 to give a read command to the memory. The CC-7 pulse extends through OR-circuit 914 in order to increment counter J.

The CC-8 pulse extends through Or-circuit 398 to GATE 264 in order to gate the memory data register to cable 152. The CC-8 pulse extends through OR-circuit 154 to GATE 156 in order to gate cable 152 to register No. 3.

The CC-9 pulse extends through OR-circuit 876 to GATe 682 in order to gate register No. 1 to cable 198. The CC-9 pulse extends through OR-circuit 886 to GATE 884 in order to gate register No. 3 to cable 196. The CC-9 pulse extends through OR-circuit 1004 to GATE 1008 in order to gate cables 196 and 198 to the multiplier 1006. The same pulse is applied to GATE 1010 in order to gate the output of the multiplier to cable 152. The CC-9 pulse extends through OR-circuit 890 to GATE 888 in order to gate cable 152 to register No. 4.

The CC-10 pulse extends through OR-circuit 882 to GATE 660 in order to gate register No. 2 to cable 196. The CC-10 pulse extends through OR-circuit 474 to gate 440 in order to gate register No. 4 to cable 198. The CC-10 pulse extends through OR-circuit 1012 to GATE 706 in order to gate cables 196 and 198 to the divider 708. The same pulse also extends to GATE 710 in order to gate the output of the divider to cable 152. The CC-10 pulse extends through OR-circuit 1026 to GATE 1038 in order to gate cable 152 to the Mb register in the correlate unit 1044.

The CC-11 pulse extends through OR-circuit 896 to GATE 894 in order to gate the register labeled CTR.D(ST) to cable 152. The CC-11 pulse extends through OR-circuit 940 to GATE 934 in order to gate cable 152 to counter F.

The CC-12 pulse extends through OR-circuit 898 to GATE 892 in order to gate the register labeled CTR.D(ST) to cable 196. The CC-12 pulse extends through OR-circuit 876 to GATE 682 in order to gate register No. 1 to cable 198. The CC-12 pulse extends through OR-circuit 1000 to GATE 516 in order to gate cables 196 and 198 to the adder 664. The same pulse also extends to GATE 646 in order to gate the adder to cable 152. The CC-12 pulse extends through OR-circuit 948 to GATE 1220 in order to gate cable 152 to the register labeled CTR.F(LIM).

The CC-13 pulse extends through OR-circuit 912 to GATE 906 in order to gate the register labeled CTR.E(ST) to cable 196. The CC-13 pulse extends through OR-circuit 1224 to GATE 980 in order to gate the shift register 976 to cable 198. The CC-13 pulse extends through OR-circuit 1000 to GATE 516 in order to gate cables 196 and 198 to the adder 664. The same pulse also extends to GATE 666 in order to gate the adder to cable 152. The CC-13 pulse extends through OR-circuit 960 to GATE 954 in order to gate cable 152 to counter G.

The CC-14 pulse extends through OR-circuit 966 to GATE 956 in order to gate counter G to cable 198. The CC-14 pulse extends through OR-circuit 212 to GATE 214 in order to gate cable 198 to the memory address register.

The CC-15 pulse extends through OR-circuit 396 in order to give a read command to the memory.

The CC-16 pulse extends through OR-circuit 398 to GATE 264 in order to gate the memory data register to cable 152. The CC-16 pulse extends through OR-circuit 1014 to GATE 1032 in order to gate cable 152 to the $a$ register in the correlate unit 1044.

The CC-17 pulse extends through OR-circuit 946 to GATE 936 in order to gate counter F to cable 198. The CC-17 pulse extends through OR-circuit 212 to GATE 214 in order to gate cable 198 to the memory address register.

The CC-18 pulse extends through OR-circuit 396 to provide a read command for the memory.

The CC-19 pulse extends through OR-circuit 398 to GATE 264 in order to gate the memory data register to cable 152. The CC-19 pulse extends through OR-circuit 1016 to GATE 1036 in order to gate cable 152 to the $b$ register in the correlate unit 1044.

The CC-20 pulse extends through OR-circuit 1028 in order to give a summation command to the correlate unit 1044.

The CC-21 pulse extends through OR-circuit 942 in order to increment counter F. The CC-21 pulse extends through OR-circuit 962 in order to increment counter G.

The CC-22 pulse extends thrugh OR-circuit 944 to GATE 938 in order to gate counter F to cable 152. The CC-22 pulse extends through OR-circuit 950 to GATE 952 in order to gate the register labeled CTR.F(LIM) to cable 198. The CC-22 pulse extends through OR-circuit 312 to GATE 280 in order to gate cables 196 and 198 to the compare unit 278. A delayed CC-22 pulse is applied to GATE 1066 in order to test the output of the compare unit 278. If counter F is greater than the register labeled CTR.F(LIM), a pulse will appear on wire 854. If this is not the case, a pulse will appear on wire 856. If a pulse appears on wire 856, it will extend through OR-circuit 1184 and restart the pulse generator 1186. If a pulse occurs on wire 854, it will extend through OR-circuit 1226 and turn "on" single shot 1154. In this manner, the circuit reverts back to CSR-37.

The next sequence to be described is the "CD" sequence.

The CD-1 pulse extends through OR-circuit 310 to GATE 254 in order to gate register No. 1 to cable 152. The CD-1 pulse extends through OR-circuit 1018 to GATE 1040 in order to gate cable 152 to the La register of the correlate unit 1044.

The CD-2 pulse extends through OR-circuit 662 to GATE 250 in order to gate register No. 2 to cable 152. The CD-2 pulse extends through OR-circuit 1020 to GATE 1042 in order to gate cable 152 to the Lb register in the correlate unit 1044. The CD-2 pulse extends through OR-circuit 1022 to GATE 1030 in order to gate cable 152 to the OV register of the correlate unit 1044.

The CD-3 pulse extends through OR-circuit 916 to GATE 694 in order to gate counter J to cable 198. The CD-3 pulse extends through OR-circuit 212 to GATE 214 in order to gate cable 198 to the memory address register.

The CD-4 pulse extends through OR-circuit 396 in order to give the read command to the memory. The CD-4 pulse extends through OR-circuit 914 in order to increment counter J. The CD-5 pulse extends through OR-circuit 398 to GATE 264 in order to gate the memory data register to cable 152. The CD-5 pulse extends through OR-circuit 1024 to GATE 1034 in order to gate cable 152 to the Ma register of the correlate unit 1044.

The CD-6 pulse extends through OR-circuit 924 to GATE 922 in order to gate counter K to cable 198. The CD-6 pulse extends through OR-circuit 212 to GATE 214 in order to gate cable 198 to the memory address register.

The CD-7 pulse extends through OR-circuit 396 in order to give a read command to the memory. The CD-7 pulse extends through OR-circuit 920 in order to increment counter K.

The CD-8 pulse extends through OR-circuit 398 to GATE 264 in order to gate the memory data register to cable 152. The CD-8 pulse extends through OR-circuit 154 to GATE 156 in order to gate cable 152 to register No. 3.

The CD-9 pulse extends through OR-circuit 880 to GATE 878 in order to gate register No. 2 to cable 198. The CD-9 pulse extends through OR-circuit 886 to GATE 884 in order to gate register No. 3 to cable 196. The CD-9 pulse extends through OR-circuit 1004 to GATE 1008 in order to gate cables 196 and 198 to the multiplier 1006. The same pulse also extends to GATE 1010 in order to gate the multiplier to cable 152. The CD-9 pulse extends through OR-circuit 890 to GATE 888 in order to gate cable 152 to register No. 4.

The CD-10 pulse extends through OR-circuit 874 to GATE 658 in order to gate register No. 1 to cable 196. The CD-10 pulse extends through OR-circuit 474 to GATE 440 in order to gate register No. 4 to cable 198. The CD-10 pulse extends through OR-circuit 1012 to GATE 706 in order to gate cables 196 and 198 to the divider 708. The same pulse also extends to GATE 710 in order to gate the output of the divider to cable 152. The CD-10 pulse extends through OR-circuit 1026 to GATE 1038 in order to gate cable 152 to the Mb register in the correlate unit 1044.

The CD-11 pulse extends through OR-circuit 898 to GATE 892 in order to gate the register labeled CTR.D(ST) to cable 196. The CD-11 pulse extends through OR-circuit 1224 to GATE 980 in order to gate the shift register 976 to cable 198. The CD-11 pulse extends through OR-circuit 1000 to GATE 516 in order to gate cables 196 and 198 to the adder 664. The same pulse is also applied to GATE 666 in order to gate the adder to cable 152. The CD-11 pulse extends through OR-circuit 940 to GATE 934 in order to gate cable 152 to counter F.

The CD-12 pulse extends through OR-circuit 912 to GATE 906 in order to gate the register labeled CTR.E(ST) to cable 196. The CD-12 pulse extends through OR-circuit 880 to GATE 878 in order to gate register No. 2 to cable 198. The CD-12 pulse extends through OR-circuit 1000 to GATE 516 in order to gate cables 196 and 198 to the adder 664. The same pulse extends to GATE 666 in order to gate the adder to cable 152. The CD-12 pulse extends through OR-circuit 968 to GATE 1222 in order to gate cable 152 to the register labeled CTR.G(LIM).

The CD-13 pulse extends through OR-circuit 910 to GATE 908 in order to gate the register labeled CTR.E(ST) to cable 152. The CD-13 pulse extends through OR-circuit 960 to GATE 954 in order to gate cable 152 to counter G.

The CD-14 pulse extends through OR-circuit 946 to GATE 936 in order to gate counter F to cable 198. The CD-14 pulse extends through OR-circuit 212 to GATE 214 in order to gate cable 198 to the memory address register.

The CD-15 pulse extends through OR-circuit 396 in order to give a read command to the memory.

The CD-16 pulse extends through OR-circuit 398 to GATE 264 in order to gate the memory data register to cable 152. The CD-16 pulse extends through OR-circuit 1014 to GATE 1032 in order to gate cable 152 to the register in the correlate unit 1044.

The CD-17 pulse extends thrugh OR-circuit 966 to GATE 956 in order to gate counter G to cable 198. The CD-17 pulse extends through OR-circuit 212 to GATE 214 in order to gate cable 198 to the memory address register.

The CD-18 pulse extends through OR-circuit 396 to give a read command to the memory. The CD-19 pulse extends through OR-circuit 398 to GATE 264 in order to gate the memory data register to cable 152. The CD-19 pulse extends through OR-circuit 1016 to GATE 1036 in order to gate cable 152 to the b register in the correlate unit 1044.

The CD-20 pulse extends through OR-circuit 1028 to give a summation command to the correlate unit 1044.

The CD-21 pulse extends through OR-circuit 942 to increment counter F. The CD-21 pulse extends through OR-circuit 962 to increment counter G.

The CD-22 pulse extends through OR-circuit 964 to GATE 958 in order to gate counter G to cable 152. The CD-22 pulse also extends through OR-circuit 970 to GATE 972 in order to gate the register labeled CTR.G(LIM) to cable 198. The CD-22 pulse extends through OR-circuit 312 to GATE 280 in order to gate cables 152 and 198 to the compare unit 278. A delayed CD-22 pulse is applied to GATE 1068 in order to test the compare unit 278. If counter G is greater than the register labeled CTR.G(LIM), a pulse will appear on wire 858. If this is not the case, a pulse will appear on wire 860. A pulse on wire 860 will pass through OR-circuit 1190 to again turn "on" the pulse generato 1192. A pulse on wire 858 will pass through OR-circuit 1226 and turn "on" single shot 1154. In this manner, the program is returned to CSR-37.

This is the end of the "CD" sequence. The next sequence to be described will be the "CE" sequence.

The CE-1 pulse extends through OR-circuit 662 to GATE 250 in order to gate register No. 2 to cable 152. The CE-1 pulse extends through OR-circuit 1018 to GATE 1040 in order to gate cable 152 to the La register in the correlate unit 1044.

The CE-2 pulse extends through OR-circuit 310 to GATE 254 in order to gate register No. 1 to cable 152. The CE-2 pulse extends through OR-circuit 1020 to GATE 1042 in order to gate cable 152 to the Lb register in the correlate unit 1044.

The CE-3 pulse extends through OR-circuit 882 to GATE 660 in order to gate register No. 2 to cable 196. The CE-3 pulse extends through OR-circuit 1224 to GATE 980 in order to gate the shift register 976 to cable 198. The CE-3 pulse extends through OR-circuit 1002 to GATE 390 in order to gate cables 196 and 198 to the subtractor 428. This same pulse extends to GATE 392 in order to gate the subtractor to cable 152. The CE-3 pulse extends through OR-circuit 1022 to GATE 1030 in order to gate cable 152 to the OV register in the correlate unit 1044.

The CE-4 pulse extends through OR-circuit 942 to GATE 922 in order to gate counter K to cable 198. The CE-4 pulse extends through OR-circuit 212 to GATE 214 in order to gate cable 198 to the memory address register.

The CE-5 pulse extends through OR-circuit 396 to give a read command to the memory. The CE-5 pulse extends through OR-circuit 920 to increment counter K.

The CE-6 pulse extends through OR-circuit 874 to GATE 658 in order to gate register No. 1 to cable 196. The CE-6 pulse extends through OR-circuit 1224 to GATE 980 in order to gate the shift register 976 to cable 198. The CE-6 pulse extends through OR-circuit 1000 to GATE 516 in order to gate cables 196 and 198 to the adder 664. The same pulse also extends to GATE 666 in order to gate the adder to cable 152. The CE-6 pulse extends through OR-circuit 154 to GATE 156 in order to gate cable 152 to register No. 3.

The CE-7 pulse extends through OR-circuit 880 to GATE 878 in order to gate register No. 2 to cable 198. The CE-7 pulse also extends through OR-circuit 1076 to GATE 1078 in order to gate the memory data register to cable 196. The CE-7 pulse extends through OR-circuit 1004 to GATE 1008 in order to gate cables 196 and 198 to the multiplier 1006. The same pulse extends to GATE 1010 in order to gate the multiplier to cable 152. The CE-7 pulse extends through OR-circuit 890 to GATE 888 in order to gate cable 152 to register No. 4.

The CE-8 pulse extends through OR-circuit 886 to GATE 884 in order to gate register No. 3 to cable 196. The CE-8 pulse extends through OR-circuit 474 to GATE 440 in order to gate register No. 4 to cable 198. The CE-8 pulse extends through OR-circuit 1012 to GATE 706 in order to gate cables 196 and 198 to the divider 708. The same pulse extends to GATE 710 in order to gate the divider to cable 152. The CE-8 pulse extends through OR-circuit 1024 to GATE 1034 in order to gate cable 152 to the Ma register of the correlate unit 1044.

The CE-9 pulse extends through OR-circuit 916 to GATE 694 in order to gate counter J to cable 198. The CE-9 pulse extends through OR-circuit 212 to GATE 214 in order to gate cable 198 to the memory address register.

The CE-10 pulse extends through OR-circuit 396 to give a read command to the memory. The CE-10 pulse extends through OR-circuit 914 to increment counter J.

The CE-11 pulse extends through OR-circuit 876 to GATE 682 in order to gate register No. 1 to cable 198. The CE-11 pulse extends through OR-circuit 1076 to GATE 1078 in order to gate the memory data register to cable 196. The CE-11 pulse extends through OR-circuit 1004 to GATE 1008 in order to gate cables 196 and 198 to the multiplier 1006. The same pulse extends to GATE 1010 in order to gate the multiplier to cable 152. The CE-11 pulse extends through OR-circuit 890 to GATE 888 in order to gate cable 152 to register No. 4.

The CE-12 pulse extends through OR-circuit 886 to GATE 884 in order to gate register No. 3 to cable 196. The CE-12 pulse extends through OR-circuit 474 to GATE 440 in order to gate register No. 4 to cable 198. The CE-12 pulse extends through OR-circuit 1012 to GATE 706 in order to gate cables 196 and 198 to the divider 708. The same pulse is applied to GATE 710 in order to gate the divider to cable 152. The CE-12 pulse extends through OR-circuit 1026 to GATE 1038 in order to gate cable 152 to the Mb register in the correlate unit 1044.

The CE-13 pulse extends through OR-circuit 896 to GATE 894 in order to gate the register labeled CTR.D(ST) to cable 152. The CE-13 pulse extends through OR-circuit 940 to GATE 934 in order to gate cable 152 to counter F.

The CE-14 pulse extends through OR-circuit 912 to GATE 906 in order to gate the register labeled CTR.E(ST) to cable 196. The CE-14 pulse extends through OR-circuit 880 to GATE 878 in order to gate register No. 2 to cable 198. The CE-14 pulse extends through OR-circuit 1000 to GATE 516 in order to gate cables 196 and 198 to the adder 664. The same pulse extends to GATE 666 in order to gate the adder to cable 152. The CE-14 pulse extends through OR-circuit 968 to GATE 1222 in order to gate cable 152 to the register labeled CTR.G(LIM).

The CE-15 pulse extends through OR-circuit 912 to GATE 906 in order to gate the register labeled CTR.E(ST) to cable 196. The CE-15 pulse extends through OR-circuit 1224 to GATE 980 in order to gate the shift register 976 to cable 198. The CE-15 pulse extends through OR-circuit 1000 to GATE 516 in order to gate cables 196 and 198 to the adder 664. The same pulse extends to GATE 666 in order to gate the adder to cable 152. The CE-15 pulse extends through OR-circuit 960 to GATE 954 in order to gate cable 152 to counter G.

The CE-16 pulse extends through OR-circuit 966 to GATE 956 in order to gate counter G to cable 198. The CE-16 pulse is sent through OR-circuit 212 to GATE 214 in order to gate cable 198 to the memory address register.

The CE-17 pulse extends through OR-circuit 396 to give a read command to the memory. The CE-18 pulse extends through OR-circuit 398 to GATE 264 in order to gate the memory data register to cable 152. The CE-18 pulse extends through OR-circuit 1014 to GATE 1032 in order to gate cable 152 to the a register in the correlate unit 1044,.

The CE-19 pulse extends through OR-circuit 946 to GATE 936 in order to gate counter F to cable 198. The CE-19 pulse extends through OR-circuit 212 to GATE 214 in order to gate cable 198 to the memory address register.

The CE-20 pulse extends through OR-circuit 396 to give a read command to the memory.

The CE-21 pulse extends through OR-circuit 398 to GATE 264 in order to gate the memory data register to cable 152. The CE-21 pulse extends through OR-circuit 1016 to GATE 1036 in order to gate cable 152 to the b register in correlate unit 1044.

The CE-22 pulse extends through OR-circuit 1028 to give the summation command to the correlate unit 1044.

The CE-23 pulse extends through OR-circuit 942 to increment counter F. The CE-23 pulse extends through OR-circuit 962 to increment counter G.

The CE-24 pulse extends through OR-circuit 964 to GATE 958 in order to gate counter G to cable 152. Also, the CE-24 pulse extends through OR-circuit 970 to GATE 972 in order to gate the register labeled CTR.G(LIM) to cable 198. The CE-24 pulse extends through OR-circuit 312 to GATE 280 in order to gate cables 198 and 152 to the compare unit 278. A delayed CE-24 pulse is applied to GATE 1070 in order to test the output of the compare unit. If counter G is greater than the register labeled CTR.G(LIM), a pulse will appear on wire 862. If this is not the case, a pulse will appear on wire 864. A pulse on wire 864 will pass through OR-circuit 1196 to again start pulse generator 1198. A pulse on wire 862 passes through OR-circuit 1226 and turns "on" single shot 1154. In this manner, the program reverts back TO CSR-37.

This completes the description of the "CE" sequence. The next sequence to be described will be the "CF" sequence.

The CF-1 pulse extends through OR-circuit 310 to GATE 254 in order to gate register No. 1 to cable 152. The CF-1 pulse extends through OR-circuit 1018 to GATE 1040 in order to gate cable 152 to the La register in the correlate unit 1044.

The CF-2 pulse passes through OR-circuit 662 to GATE 250 in order to gate register No. 2 to cable 152. The CF-2 pulse passes through OR-circuit 1020 to GATE 1042 in order to gate cable 152 to the Lb register of the correlate unit 1044.

The CF-3 pulse extends through OR-circuit 874 to GATE 658 in order to gate register No. 1 to cable 196. The CF-3 pulse passes through OR-circuit 1224 to GATE 980 in order to gate the shift register 976 to cable 198. The CF-3 pulse passes through OR-circuit 1002 to GATE 390 in order to gate the cables 196 and 198 to the subtractor 428. The same pulse also extends to GATE 392 in order to gate the subtractor to cable 152. The CF-3 pulse passes through OR-circuit 1022 to GATE 1030 in order to gate cable 152 to the OV register in the correlate unit 1044.

The CF-4 pulse extends through OR-circuit 916 to GATE 694 in order to gate counter J to cable 198. The CF-4 pulse extends through OR-circuit 212 to GATE 214 in order to gate cable 198 to the memory address register.

The CF-5 pulse extends through OR-circuit 396 to give a read command to the memory. The CF-5 pulse extends through OR-circuit 914 in order to increment counter J.

The CF-6 pulse extends through OR-circuit 882 to GATE 660 in order to gate register No. 2 to cable 196. The CF-6 pulse extends through OR-circuit 1224 to GATE 980 in order to gate the shift register 976 to cable 198. The CF-6 pulse extends through OR-circuit 1000 to GATE 516 in order to gate cables 196 and 198 to the adder 664. The same pulse extends to GATE 666 in order to gate the adder to cable 152. The CF-6 pulse extends through OR-circuit 154 to GATE 156 in order to gate cable 152 to register No. 3.

The CF-7 pulse extends through OR-circuit 876 to GATE 682 in order to gate register No. 1 to cable 198. The CF-7 pulse extends through OR-circuit 1076 to GATE 1078 in order to gate the memory data register to cable 196. The CF-7 pulse extends through OR-circuit 1004 to GATE 1008 in order to gate cables 196 and 198 to the multiplier 1006. The same pulse extends to GATE 1010 in order to gate the multiplier to cable 152. The CF-7 pulse extends through OR-circuit 890 to GATE 888 in order to gate cable 152 to register No. 4.

The CF-8 pulse extends through OR-circuit 886 to GATE 884 to gate register No. 3 to cable 196. The CF-8 pulse extends through OR-circuit 474 to GATE 440 in order to gate register No. 4 to cable 198. The CF-8 pulse extends through OR-circuit 1012 to GATE 706 in order to gate cables 196 and 198 to the divider 708. The same pulse is applied to GATE 710 in order to gate the divider to cable 152. The CF-8 pulse extends through OR-circuit 1024 to GATE 1034 in order to gate cable 152 to the Ma register in the correlate unit 1044.

The CF-9 pulse extends through OR-circuit 924 to GATE 922 in order to gate counter K to cable 198. The CF-9 pulse extends through OR-circuit 212 to GATE 214 in order to gate cable 198 to the memory address register.

The CF-10 pulse extends through OR-circuit 396 to give a read command to the memory. The CF-10 pulse extends through OR-circuit 920 to increment counter K.

The CF-11 pulse extends through OR-circuit 880 to GATE 878 in order to gate register No. 2 to cable 198. The CF-11 pulse extends through OR-circuit 1076 to GATE 1078 in order to gate the memory data register to cable 196. The CF-11 pulse extends through OR-circuit 1004 to gate 1008 in order to gate cables 196 and 198 to the multiplier 1006. The same pulse is applied to GATE 1010 in order to gate the multiplier to cable 152. The CF-11 pulse extends through OR-circuit 890 to GATE 888 in order to gate cable 152 to register No. 4.

The CF-12 pulse extends through OR-circuit 886 to GATE 884 in order to gate register No. 3 to cable 196. The CF-12 pulse extends through OR-circuit 474 to GATE 440 in order to gate register No. 4 to cable 198. The CF-12 pulse extends through OR-circuit 1012 to GATE 706 in order to gate cables 196 and 198 to the divider 708. The same pulse extends to GATE 710 in order to gate the divider to cable 152. The CF-12 pulse extends through OR-circuit 1026 to GATE 1038 in order to gate cable 152 to the Mb register in the correlate unit 1044.

The CF-13 pulse extends through OR-circuit 910 to GATE 908 in order to gate the register labeled CTR.E(ST) to cable 152. The CF-13 pulse extends through OR-circuit 960 to GATE 954 in order to gate cable 152 to counter G.

The CF-14 pulse extends through OR-circuit 898 to GATE 892 in order to gate the register labeled CTR.D(ST) to cable 196. The CF-14 pulse extends through OR-circuit 876 to GATE 682 in order to gate regiter No. 1 to cable 198. The CF-14 pulse extends through OR-circuit 1000 to GATE 516 in order to gate cables 196 and 198 to the adder 664. The same pulse also extends to GATE 666 in order to gate the adder to cable 152. The CF-14 pulse extends through OR-circuit 948 to GATE 1220 in order to gate cable 152 to the register labeled CTR.F(LIM).

The CF-15 pulse extends through OR-circuit 898 to GATE 892 in order to gate the register labeled CTR.D(ST) to cable 196. The CF-15 pulse extends through OR-circuit 1224 to GATE 980 in order to gate the shift register 976 to cable 198. The CF-15 pulse extends through OR-circuit 1000 to GATE 516 in order to gate cables 196 and 198 to the adder 664. The same pulse is also applied to GATE 666 in order to gate the adder to cable 152. The CF-15 pulse extends through OR-circuit 940 to GATE 934 in order to gate cable 152 to counter F.

The CF-16 pulse extends through OR-circuit 946 to GATE 936 in order to gate counter F to cable 198. The CF-16 pulse extends through OR-circuit 212 to GATE 214 in order to gate cable 198 to the memory address register.

The CF-17 pulse extends through OR-circuit 396 to give a read command to the memory.

The CF-18 pulse extends through OR-circuit 398 to GATE 264 in order to gate the memory data register to cable 152. The CF-18 pulse extends through OR-circuit 1014 to GATE 1032 in order to gate cable 152 to the $a$ register of the correlate unit 1044.

The CF-19 pulse extends through OR-circuit 966 to GATE 956 in order to gate counter G to cable 198. The CF-19 pulse extends through OR-circuit 212 to GATE 214 in order to gate cable 198 to the memory address register.

The CF-20 pulse extends through OR-circuit 396 to give a read command to the memory.

The CF-21 pulse passes through OR-circuit 398 to GATE 264 in order to gate the memory data register to cable 152. The CF-21 pulse extends through OR-circuit 1016 to GATE 1036 in order to gate cable 152 to the $b$ register in the correlate unit 1044.

The CF-22 pulse extends through OR-circuit 1028 to give a summation command to the correlate unit 1044.

The CF-23 pulse extends through OR-circuit 942 to increment counter F. The CF-23 pulse extends through OR-circuit 962 to increment counter G.

The CF-24 pulse extends through OR-circuit 944 to GATE 938 in order to gate counter F to cable 152. The CF-24 pulse extends through OR-circuit 950 to gate 952 in order to gate the register labeled CTR.F(LIM) to cable 198. The CF-24 pulse extends through OR-circuit 312 to GATE 280 in order to gate cables 152 and 198 to the compare unit 278. A delayed CF-24 pulse is applied to GATE 1072 in order to test the output of the compare unit 278. If counter F is greater than the register labeled CTR.F(LIM), a pulse will appear on wire 866. If this is not the case, a pulse will appear on wire 868. A pulse on wire 868 passes through OR-circuit 1202 to again start pulse generator 1204. A pulse on wire 866 passes through OR-circuit 1226 to turn "on" single shot 1154. In this manner, the program reverts back to CSR-37.

This completes the description of the "CF" sequence. The next sequence to be described will be the "CG" sequence.

The CG-1 pulse extends through OR-circuit 662 to GATE 250 in order to gate register No. 2 to cable 152. The CG-1 pulse extends through OR-circuit 1018 to GATE 1040 in order to gate cable 152 to the La register of the correlate unit 1044.

The CG-2 pulse extends through OR-circuit 310 to GATE 254 in order to gate register No. 1 to cable 152. The CG-2 pulse extends through OR-circuit 1020 to GATE 1042 in order to gate cable 152 to the Lb register of the correlate unit 1044.

The CG-3 pulse extends through OR-circuit 874 to GATE 658 in order to gate register No. 1 to cable 196. The CG-3 pulse extends through OR-circuit 1224 to GATE 980 in order to gate the shift register 976 to cable 198. The CG-3 pulse extends through OR-circuit 1002 to GATE 390 in order to gate cables 196 and 198 to the subtractor 428. The same pulse is applied to GATE 392 in order to gate the subtractor to cable 152. The CG-3 pulse also extends through OR-circuit 1022 to GATE 1030 in order to gate cable 152 to the OV register of the correlate unit 1044.

The CG-4 pulse extends through OR-circuit 924 to GATE 922 in order to gate counter K to the cable 198. The CG-4 pulse extends through OR-circuit 212 to GATE 214 in order to gate cable 198 to the memory address register.

The CG-5 pulse extends through OR-circuit 396 to give a read command to the memory. The CG-5 pulse extends through OR-circuit 920 to increment counter K.

The CG-6 pulse extends through OR-circuit 882 to GATE 660 in order to gate register No. 2 to cable 196. The CG-6 pulse extends through OR-circuit 1224 to GATE 980 in order to gate the shift register 976 to cable 198. The CG-6 pulse extends through OR-circuit 1000 to GATE 516 in order to gate cables 196 and 198 to the adder 664. The same pulse extends to GATE 666 in order to gate the adder to cable 152. The CG-6 pulse extends through OR-circuit 154 to GATE 156 in order to gate cable 152 to register No. 3.

The CG-7 pulse extends through OR-circuit 880 to GATE 878 in order to gate register No. 2 to cable 198. The CG-7 pulse extends through OR-circuit 1076 to GATE 1078 in order to gate the memory data register to cable 196. The CG-7 pulse extends through OR-circuit 1004 to GATE 1008 in order to gate cables 196 and 198 to the multiplier 1006. The same pulse extends to GATE 1010 in order to gate the multiplier to cable 152. The CG-7 pulse extends through OR-circuit 890 to GATE 888 in order to gate cable 152 to register No. 4.

The CG-8 pulse extends through OR-circuit 886 to gate 884 in order to gate register No. 3 to cable 196. The CG-8 pulse extends through OR-circuit 474 to GATE 440 in order to gate register No. 4 to cable 198. The CG-8 pulse extends through OR-circuit 1012 to GATE 706 in order to gate cables 196 and 198 to the divider 708. The same pulse extends to gate 710 in order to gate the divider to cable 152. The CG-8 pulse extends through OR-circuit 1024 to GATE 1034 in order to gate cable 152 to the Ma register of correlate unit 1044.

The CG-9 pulse extends through OR-circuit 916 to GATE 694 in order to gate counter J to cable 198. The CG-9 pulse extends through OR-circuit 212 to GATE 214 in order to gate cable 198 to the memory address register.

The CG-10 pulse extends through OR-circuit 396 to give a read command to the memory. The CG-10 pulse extends through OR-circuit 914 to increment counter J.

The CG-11 pulse extends through OR-circuit 876 to GATE 682 in order to gate register No. 1 to cable 198. The CG-11 pulse extends through OR-circuit 1076 to GATE 1078 in order to gate the memory data register to cable 196. The CG-11 pulse extends through OR-circuit 1004 to GATE 1008 in order to gate cables 196 and 198 to the multiplier 1006. The same pulse extends to GATE 1010 in order to gate the multiplier to cable 152. The CG-11 pulse extends through OR-circuit 890 to GATE 888 in order to gate cable 152 to register No. 4.

The CG-12 pulse extends through OR-circuit 886 to GATE 884 in order to gate register No. 3 to cable 196. The CG-12 pulse extends through OR-circuit 474 to GATE 440 in order to gate register No. 4 to cable 198. The CG-12 pulse extends through OR-circuit 1012 to GATE 706 in order to gate cables 196 and 198 to the divider 708. The same pulse extends to GATE 710 in order to gate the divider to cable 152. The CG-12 pulse extends through OR-circuit 1026 to GATE 1038 in order to gate cable 152 to the Mb register in the correlate unit 1044.

The CG-13 pulse extends through OR-circuit 910 to GATE 908 in order to gate the register labeled CTR.E(ST) to cable 152. The CG-13 pulse extends through OR-circuit 960 to GATE 954 in order to gate cable 152 to counter G.

The CG-14 pulse extends through OR-circuit 898 to GATE 892 in order to gate the register labeled CTR.D(ST) to cable 196. The CG-14 pulse extends through OR-circuit 876 to GATE 682 in order to gate register No. 1 to cable 198. The CG-14 pulse extends through OR-circuit 1000 to GATE 516 in order to gate cables 196 and 198 to the adder 664. The same pulse extends to GATE 666 in order to gate the adder to cable 152. The CG-14 pulse extends through OR-circuit 948 to GATE 1220 in order to gate cable 152 to the register labeled CTR.F(LIM).

The CG-15 pulse extends through OR-circuit 898 to GATE 892 in order to gate the register labeled CTR.D(ST) to cable 196. The CG-15 pulse extends through OR-circuit 1224 to GATE 980 in order to gate the shift register 976 to cable 198. The CG-15 pulse extends through OR-circuit 1000 to GATE 516 in order to gate cables 196 and 198 to the adder 664. The same pulse extends to GATE 666 in order to gate the adder to cable 152. The CG-15 pulse extends through OR-circuit 940 to GATE 934 in order to gate cable 152 to counter F.

The CG-16 pulse extends through OR-circuit 966 to GATE 956 in order to gate counter G to cable 198. The CG-16 pulse extends through OR-circuit 212 to GATE 214 in order to gate cable 198 to the memory address register.

The CG-17 pulse extends through OR-circuit 396 to give a read command to the memory.

The CG-18 pulse extends through OR-circit 398 to GATE 264 in order to gate the memory data register to cable 152. The CG-18 pulse extends through OR-circuit 1014 to GATE 1032 in order to gate cable 152 to the $a$ register in the correlate unit 1044.

The CG-19 pulse extends through OR-circuit 946 to GATE 936 in order to gate counter F to cable 198. The CG-19 pulse extends through OR-circuit 212 to GATE 214 in order to gate cable 198 to the memory address register.

The CG-20 pulse extends through OR-circuit 396 to give a read command to the memory.

The CG-21 pulse extends through OR-circuit 398 to GATE 264 in order to gate the memory data register to cable 152. The CG-21 pulse extends through OR-circuit 1016 to GATE 1036 in order to gate cable 152 to the $b$ register in the correlate unit 1044.

The CG-22 pulse extends through OR-circuit 1028 to give a summation command to the correlate unit.

The CG-23 pulse extends through OR-circuit 942 to increment counter F. The CG-23 pulse extends through OR-circuit 962 to increment counter G.

The CG-24 pulse extends through OR-circuit 944 to GATE 938 in order to gate counter F to cable 152. The CG-24 pulse extends through OR-circuit 950 to GATE 952 in order to gate the register labeled CTR.F(LIM) to cable 198. The CG-24 pulse extends through OR-circuit 312 to GATE 280 in order to gate cables 152 and 198 to the compare unit 278. A delayed CG-24 pulse is applied to GATE 1060 in order to test the output of the compare unit 278. If counter F is greater than the register labeled CTR.F(LIM), a pulse will appear on wire 842. If this is not the case, a pulse will appear on wire 844. A pulse on wire 844 will pass through OR-circuit 1208 to again start pulse generator 1210. A pulse on wire 842 will extend through OR-circuit 1226 to turn "on" single shot 1154. In this manner, the program returns to CSR-37.

This is the end of the description of the "CG" sequence. The next sequence to be described will be the "CH" sequence.

The CH-1 pulse extends through OR-circuit 310 to GATE 254 in order to gate register No. 1 to cable 152. The CH-1 pulse extends through OR-circuit 1018 to GATE 1040 in order to gate cable 152 to the La register of the correlate unit 1044.

The CH-2 pulse extends through OR-circuit 662 to GATE 250 in order to gate register No. 2 to cable 152. The CH-2 pulse extends through OR-circuit 1020 to GATE 1042 in order to gate cable 152 to the Lb register in the correlate unit 1044.

The CH-3 pulse extends through OR-circuit 882 to GATE 660 in order to gate register No. 2 to cable 196. The CH-3 pulse extends through OR-circuit 1224 to GATE 980 in order to gate the shift register 976 to cable 198. The CH-3 pulse extends through OR-circuit 1002 to GATE 390 in order to gate cables 196 and 198 to the subtractor 428. The same pulse is applied to GATE 392 in order to gate the subtractor to cable 152. The CH-3 pulse extends through OR-circuit 1022 to GATE 1030 in order to gate cable 152 to the OV register in the correlate unit 1044.

The CH-4 pulse extends through OR-circuit 916 to GATE 694 in order to gate counter J to cable 198. The CH-4 pulse extends through OR-circuit 212 to GATE 214 in order to gate cable 198 to the memory address register.

The CH-5 pulse extends through OR-circuit 396 to give a read command to the memory. The CH-5 pulse extends through OR-circuit 914 to increment counter J.

The CH-6 pulse extends through OR-circuit 874 to GATE 658 in order to GATE register No. 1 to cable 196. The CH-6 pulse extends through OR-circuit 1224 to GATE 980 in order to gate the shift register 976 to cable 198. The CH-6 pulse extends through OR-circuit 1000 to GATE 516 in order to gate cables 196 and 198 to the adder 664. The same pulse is applied to GATE 666 in order to gate the adder to cable 152. The CH-6 pulse extends through OR-circuit 154 to GATE 156 in order to gate cable 152 to register No. 3.

The CH-7 pulse extends through OR-circuit 876 to GATE 682 in order to gate register No. 1 to cable 198. The CH-7 pulse extends through OR-circuit 1076 to GATE 1078 in order to gate the memory data register to cable 196. The CH-7 pulse extends through OR-circuit 1004 to GATE 1008 in order to gate cables 196 and 198 to the multiplier 1006. The same pulse is applied to GATE 1010 in order to gate the multiplier to cable 152. The CH-7 pulse extends through OR-circit 890 to GATE 888 in order to gate cable 152 to register No. 4.

The CH-8 pulse extends through OR-circuit 886 to GATE 884 in order to gate register No. 3 to cable 196. The CH-8 pulse extends through OR-circuit 474 to GATE 440 in order to gate register No. 4 to cable 198. The CH-8 pulse extends through OR-circuit 1012 to GATE 706 in order to gate cables 196 and 198 to the divider 708. The same pulse is applied to GATE 710 in order to gate the divider to cable 152. The CH-8 pulse extends through OR-circuit 1024 to GATE 1034 in order to gate cable 152 to the Ma register of the correlate unit 1044.

The CH-9 pulse extends through OR-circit 924 to GATE 922 in order to gate counter K to cable 198. The CH-9 pulse extends through OR-circuit 212 to GATE 214 in order to gate cable 198 to the memory address register.

The CH-10 pulse extends through OR-circuit 396 to give the read command to the memory. The CH-10 pulse extends through OR-circuit 920 to increment counter K.

The CH-11 pulse extends through OR-circuit 880 to GATE 878 in order to gate register No. 2 to cable 198. The CH-11 pulse extends through OR-circuit 1076 to GATE 1078 in order to gate the memory data register to cable 196. The CH-11 pulse extends through OR-circuit 1004 to GATE 1008 in order to gate cables 196 and 198 to the multiplier 1006. The same pulse extends to GATE 1010 in order to gate the multiplier to cable 152. The CH-11 pulse extends through OR-circuit 890 to GATE 888 in order to gate cable 152 to register No. 4.

The CH-12 pulse extends through OR-circuit 886 to GATE 884 in order to gate register No. 3 to cable 196. The CH-12 pulse extends through OR-circuit 474 to GATE 440 in order to gate register No. 4 to cable 198. The CH-12 pulse extends through OR-circuit 1012 to GATE 706 in order to gate cables 196 and 198 to the divider 708. The same pulse extends to GATE 710 in order to gate the divider to cable 152. The CH-12 pulse extends through OR-circuit 1026 to GATE 1038 in order to gate cable 152 to the Mb register in the correlate unit 1044.

The CH-13 pulse extends through OR-circuit 896 to GATE 894 in order to gate the register labeled CTR.D(ST) to cable 152. The CH-13 pulse extends through OR-circuit 940 to GATE 934 in order to gate cable 152 to counter F.

The CH-14 pulse extends through OR-circuit 912 to GATE 906 in order to gate the register labeled CTR.E(ST) to cable 196. The CH-14 pulse extends through OR-circuit 880 to GATE 878 in order to gate register No. 2 to cable 198. The CH-6 pulse extends through OR-circuit 1000 to GATE 516 in order to gate cables 196 and 198 to the adder 664. The same pulse extends to GATE 666 in order to gate the adder to cable 152. The CH-14 pulse extends through OR-circuit 968 to GATE 1222 in order to gate cable 152 to the register labeled CTR.G(LIM).

The CH-15 pulse extends through OR-circuit 912 to GATE 906 in order to gate the register labeled CTR.E(ST) to cable 196. The CH-15 pulse extends through OR-circuit 1224 to GATE 980 in order to gate the shift register 976 to the cable 198. The CH-15 pulse extends through OR-circuit 1000 to GATE 516 in order to gate cables 196 and 198 to the adder 664. The same pulse extends to GATE 666 in order to gate the adder to cable 152. The CH-15 pulse extends through OR-circuit 960 to GATE 954 in order to gate cable 152 to counter G.

The CH-16 pulse extends through OR-circuit 946 to GATE 936 in order to gate counter F to cable 198. The CH-16 pulse extends through OR-circuit 212 to GATE 214 in order to gate cable 198 to the memory address register.

The CH-17 pulse extends through OR-circuit 396 to give a read command to the memory.

The CH-18 pulse extends through OR-circuit 398 to GATE 264 to gate the memory data register to cable 152. The CH-18 pulse extends through OR-circuit 1014 to GATE 1032 in order to gate cable 152 to the $a$ register in the correlate unit 1044.

The CH-19 pulse extends through OR-circuit 966 to GATE 956 in order to gate counter G to cable 198. The CH-19 pulse extends through OR-circuit 212 to GATE 214 in order to gate cable 198 to the memory address register.

The CH-20 pulse extends through OR-circuit 396 to give a read command to the memory.

The CH-21 pulse extends through OR-circuit 398 to GATE 264 in order to gate the memory data register to cable 152. The CH-21 pulse extends through OR-circuit 1016 to GATE 1036 in order to gate cable 152 to the $b$ register in the correlate unit 1044.

The CH-22 pulse extends through OR-circuit 1028 to give a summation command to the correlate unit 1044.

The CH-23 pulse extends through OR-circuit 942 to increment counter F. The CH-23 pulse extends through OR-circuit 962 to increment counter G. The CH-24 pulse extends through OR-circuit 964 to GATE 958 in order to gate counter G to cable 152. The CH-24 pulse extends through OR-circuit 970 to GATE 972 in order to gate the register labeled CTR.G(LIM) to cable 198. The CH-24 pulse extends through OR-circuit 312 to GATE 280 in order to gate cables 152 and 198 to the compare unit 278. A delayed CH-24 pulse is applied to GATE 1074 in order to test the compare unit 278. If counter G is greater than the register labeled CTR.G(LIM), a pulse will appear on wire 870. If this is not the case a pulse will appear on wire 872. A pulse on wire 872 would pass through OR-circuit 1214 to again turn on the pulse generator 1216. A pulse on wire 870 would pass through OR-circuit 1226 and turn "on" single shot 1154. In this manner, the program returns to CSR-37.

This completes the description of the "CH" sequence.

| COMPARE SAMPLE TO REFERENCE SUBSYSTEM CLOCK SEQUENCE (CSR) | |
|---|---|
| CSR-1 | Gate CTR.H(ST) to CTR.H |
|  | Gate CTR.I(ST) to CTR.I |
|  | Gate CTR.B(ST) to CTR.D(ST) |
|  | Gate CTR.C(ST) to CTR.E(ST) |
|  | Gate CTR.J(ST) to CTR.J |
|  | Gate CTR.K(ST) to CTR.K |
|  | Gate CTR.L(ST) to CTR.L |
|  | → CSR-2 |
| CSR-2 | Reset Register No. 3 to 00--00 |
|  | Set Register No. 4 to 30 |
|  | Set Sign Latch = "0" |
|  | Reset "Max. C" Register in Correlate Unit |
|  | → CSR-3 |
| CSR-3 | Gate CTR.I to MAR |
|  | → CSR-4 |
| CSR-4 | Read Memory |
|  | → CSR-5 |
| CSR-5 | Gate MDR to Register No. 1 |
|  | → CSR-6 |

COMPARE SAMPLE TO REFERENCE SUBSYSTEM CLOCK SEQUENCE (CSR)

| | | |
|---|---|---|
| CSR-6 | Gate CTR.H to MAR<br>→ CSR-7 | |
| CSR-7 | Read Memory<br>→ CSR-8 | |
| CSR-8 | Gate MDR to Register No. 2<br>→ CSR-9 | |
| CSR-9 | Is Register No. 1 > Register No. 2?<br>If yes → CSR-10<br>If no → CSR-20 | |
| CSR-10 | Is Register No. 1 > Register No. 4?<br>If no → CSR-11<br>If yes → CSR-25 | |
| CSR-11 | Gate CTR.L to MAR<br>Gate Register No. 3 to MDR<br>→ CSR-12 | |
| CSR-12 | Write Memory (Result list) (Ctr. L.)<br>→ CSR-13 | |
| CSR-13 | Increment CTR.H<br>Increment CTR.I<br>Increment CTR.L (Result list)<br>→ CSR-14 | |
| CSR-14 | Is CTR.I > CTR.I (LIM)?<br>If no → CSR-15<br>If yes → CSR-47 | |
| CSR-15 | Gate Register No. 1 to Adder<br>Gate CTR.D(ST) to Adder<br>Gate Adder to Register No. 3<br>→ CSR-16 | |
| CSR-16 | Gate Register No. 3 to CTR.D(ST)<br>→ CSR-17 | |
| CSR-17 | Gate Register No. 2 to Adder<br>Gate CTR E(ST) to Adder<br>Gate Adder to Register No. 3<br>→ CSR-18 | |
| CSR-18 | Gate Register No. 3 to CTR.E(ST)<br>→ CSR-2 | |
| CSR-20 | Is Register No. 2 > Register No. 4?<br>If no → CSR-11<br>If yes → CSR-21 | |
| CSR-21 | Gate Register No. 2 to Shift Register<br>→ CSR-22 | |
| CSR-22 | Shift Right Two Places<br>→ CSR-26 | |
| CSR-25 | Gate Register No. 1 to Shift Register<br>→ CSR-22 | |
| CSR-26 | Reset Right Hand 3 bits to zero<br>→ CSR-27 | |
| CSR-27 | Gate Shift Register to Disp. Counter<br>Reset right hand bit of Disp. Counter<br>→ CSR-28 | |
| CSR-28 | Reset Compare Latch in correlate unit<br>Test sign latch<br>If = 0 → CSR-30<br>If = 1 → CSR-36 | |
| CSR-30 | Gate Register No. 2 to Subtractor as minuend<br>Gate Shift Register to Subtractor as subtrahend<br>Gate Subtractor to Register No. 3<br>→ CSR-31 | |
| CSR-31 | Is Register No. 3 ≥ Register No. 1<br>If yes → subsystem CC<br>If no → CSR-32 | |
| CSR-32 | Gate Register No. 1 to Subtractor as minuend<br>Gate Shift Register to Subtractor as subtrahend<br>Gate Subtractor to Register No. 3<br>→ CSR-33 | |
| CSR-33 | Is Register No. 3 ≥ Register No. 2?<br>If yes → subsystem CD<br>If no → CSR-34 | |
| CSR-34 | Gate Register No. 1 to Adder<br>Gate Shift Register to Adder<br>Gate Adder to Register No. 3<br>→ CSR-35 | |
| CSR-35 | Is Register No. 3 ≥ Register No. 2?<br>If yes → subsystem CE<br>If no → subsystem CF | |
| CSR-36 | Is Register No. 2 > Register No. 1?<br>If yes → subsystem CG<br>If no → subsystem CH | |
| CSR-37 | Issue "C" command for correlation unit<br>→ CSR-38 (Return from C clock) | |
| CSR-38 | Is Disp. Counter = 0?<br>If no → CSR-39<br>If yes → CSR-42 | |
| CSR-39 | Is sign latch = 1?<br>If yes → CSR-40<br>If no → CSR-44 | |
| CSR-40 | Increment Shift Register by "eight"<br>→ CSR-41 | |
| CSR-41 | Decrement Disp. Counter by "1"<br>→ CSR-28 | |

COMPARE SAMPLE TO REFERENCE SUBSYSTEM CLOCK SEQUENCE (CSR)

| | | |
|---|---|---|
| CSR-42 | Gate CTR.L to MAR<br>Gate "Max. C" Register to MDR<br>→ CSR-43 | |
| CSR-43 | Write Memory<br>→ CSR-13 | |
| CSR-44 | Is Shift Register = 0?<br>If no → CSR-45<br>If yes → CSR-46 | |
| CSR-45 | Decrement Shift Register by "eight"<br>→ CSR-41 | |
| CSR-46 | Set sign latch = "1"<br>→ CSR-40 | |
| CSR-47 | Decrement CTR.L<br>→ CSR-48 | |
| CSR-48 | Gate CTR.L to CTR.L(LIM) | |

CORRELATE "C" SUBSYSTEM CLOCK SEQUENCE ("CC")

| | |
|---|---|
| CC-1 | Gate Register No. 2 to correlate unit as La<br>→ CC-2 |
| CC-2 | Gate Register No. 1 to correlate unit as Lb<br>Gate Register No. 1 to correlate unit as OV<br>→ CC-3 |
| CC-3 | Gate CTR.K to MAR<br>→ CC-4 |
| CC-4 | Read Memory<br>Increment CTR.K<br>→ CC-5 |
| CC-5 | Gate MDR to correlate unit as Ma<br>→ CC-6 |
| CC-6 | Gate CTR.J to MAR<br>→ CC-7 |
| CC-7 | Read Memory<br>Increment CTR.J<br>→ CC-8 |
| CC-8 | Gate MDR to Register No. 3<br>→ CC-9 |
| CC-9 | Gate Register No. 1 to Multiplier<br>Gate No. 3 to Multiplier<br>Gate Multiplier to Register No. 4<br>→ CC-10 |
| CC-10 | Gate Register No. 2 to Divider as Divisor<br>Gate Register No. 4 to Divider as Dividend<br>Gate Divider to Correlate unit as Mb<br>→ CC-11 |
| CC-11 | Gate CTR.D(ST) to CTR.F<br>→ CC-12 |
| CC-12 | Gate CTR.D(ST) to Adder<br>Gate Register No. 1 to Adder<br>Gate Adder to CTR.F(LIM)<br>→ CC-13 |
| CC-13 | Gate CTR.E(ST) to Adder<br>Gate Disp. to Adder<br>Gate Adder to CTR.G<br>→ CC-14 |
| CC-14 | Gate CTR.G to MAR<br>→ CC-15 |
| CC-15 | Read Memory<br>→ CC-16 |
| CC-16 | Gate MDR to correlate unit as "a"<br>→ CC-17 |
| CC-17 | Gate CTR.F to MAR<br>→ CC-18 |
| CC-18 | Read Memory<br>→ CC-19 |
| CC-19 | Gate MDR to correlate unit as "b"<br>→ CC-20 |
| CC-20 | Give E command to correlate unit<br>→ CC-21 |
| CC-21 | Increment CTR.F<br>Increment CTR.G<br>→ CC-22 |
| CC-22 | Is CTR.F > CTR.F (LIM)?<br>If no → CC-14<br>If yes → CSR-37 |

CORRELATE "D" SUBSYSTEM CLOCK SEQUENCE ("CD")

| | |
|---|---|
| CD-1 | Gate Register No. 1 to correlate unit as La<br>→ CD-2 |
| CD-2 | Gate Register No. 2 to correlate unit as Lb |

-continued

CORRELATE "D" SUBSYSTEM CLOCK SEQUENCE ("CD")

| | |
|---|---|
| | Gate Register No. 2 to correlate unit as OV<br>→ CD-3 |
| CD-3 | Gate CTR.J to MAR<br>→ CD-4 |
| CD-4 | Read Memory<br>Increment CTR.J<br>→ CD-5 |
| CD-5 | Gate MDR to correlate unit as Ma<br>→ CD-6 |
| CD-6 | Gate CTR.K to MAR<br>→ CD-7 |
| CD-7 | Read Memory<br>Increment CTR.K<br>→ CD-8 |
| CD-8 | Gate MDR to Register No. 3<br>→ CD-9 |
| CD-9 | Gate Register No. 2 to Multiplier<br>Gate Register No. 3 to Multiplier<br>Gate Multiplier to Register No. 4<br>→ CD-10 |
| CD-10 | Gate Register No. 1 to Divider as Divisor<br>Gate Register No. 4 to Divider as Dividend<br>Gate Divider to Correlate unit as Mb<br>→ CD-11 |
| CD-11 | Gate CTR.D(ST) to Adder<br>Gate Disp. to Adder<br>Gate Adder to CTR F<br>→ CD-12 |
| CD-12 | Gate CTR.E(ST) to Adder<br>Gate Register No. 2 to Adder<br>Gate Adder to CTR G (LIM)<br>→ CD-13 |
| CD-13 | Gate CTR.E(ST) to CTR G<br>→ CD-14 |
| CD-14 | Gate CTR.F to MAR<br>→ CD-15 |
| CD-15 | Read Memory<br>→ CD-16 |
| CD-16 | Gate MDR to correlate unit as "a"<br>→ CD-17 |
| CD-17 | Gate CTR.G to MAR<br>→ CD-18 |
| CD-18 | Read Memory<br>→ CD-19 |
| CD-19 | Gate MDR to correlate unit as "b"<br>→ CD-20 |
| CD-20 | Give E command to correlate unit<br>→ CD-21 |
| CD-21 | Increment CTR.F<br>Increment CTR.G<br>→ CD-22 |
| CD-22 | Is CTR.G > CTR.G (LIM)?<br>If no → CD-14<br>If yes → CSR-37 |

CORRELATE "E" SUBSYSTEM CLOCK SEQUENCE ("CE")

| | |
|---|---|
| CE-1 | Gate Register No. 2 to correlate unit as La<br>→ CE-2 |
| CE-2 | Gate Register No. 1 to correlate unit as Lb<br>→ CE-3 |
| CE-3 | Gate Register No. 2 to subtractor as minuend<br>Gate Disp. to subtractor as subtrahend<br>Gate Subtractor to correlate unit as OV<br>→ CE-4 |
| CE-4 | Gate CTR.K to MAR<br>→ CE-5 |
| CE-5 | Read<br>Increment CTR.K<br>→ CE-6 |
| CE-6 | Gate Register No. 1 to adder<br>Gate Disp. to adder<br>Gate Adder to Register No. 3<br>→ CE-7 |
| CE-7 | Gate Register No. 2 to Multiplier<br>Gate MDR to Multiplier<br>Gate Multiplier to Register No. 4<br>→ CE-8 |
| CE-8 | Gate Register No. 3 to Divider as Divisor<br>Gate Register No. 4 to Divider as Dividend<br>Gate Divider to correlate unit as Ma<br>→ CE-9 |
| CE-9 | Gate CTR.J to MAR<br>→ CE-10 |
| CE-10 | Read Memory<br>Increment CTR.J<br>→ CE-11 |

-continued

CORRELATE "E" SUBSYSTEM CLOCK SEQUENCE ("CE")

| | |
|---|---|
| CE-11 | Gate Register No. 1 to Multiplier<br>Gate MDR to Multiplier<br>Gate Multiplier to Register No. 4<br>→ CE-12 |
| CE-12 | Gate Register No. 3 to Divider as Divisor<br>Gate Register No. 4 to Divider as Dividend<br>Gate Divider to correlate unit as Mb<br>→ CE-13 |
| CE-13 | Gate CTR.D(ST) to CTR.F<br>→ CE-14 |
| CE-14 | Gate CTR.E(ST) to adder<br>Gate Register No. 2 to adder<br>Gate Adder to CTR.G(LIM)<br>→ Ce-15 |
| CE-15 | Gate CTR.E(ST) to adder<br>Gate Disp. to adder<br>Gate Adder to CTR.G<br>→ CE-16 |
| CE-16 | Gate CTR.G to MAR<br>→ CE-17 |
| CE-17 | Read Memory<br>→ CE-18 |
| CE-18 | Gate MDR to correlate unit as "a"<br>→ CE-19 |
| CE-19 | Gate CTR.F to MAR<br>→ CE-20 |
| CE-20 | Read Memory<br>→ CE-21 |
| CE-21 | Gate MDR to correlate unit as "b"<br>→ CE-22 |
| CE-22 | Give Σ command to correlate unit<br>→ CE-23 |
| CE-23 | Increment CTR.F<br>Increment CTR.G<br>→ CE-24 |
| CE-24 | Is CTR.G > CTR.G(LIM)?<br>If no → CE-16<br>If yes → CSR-37 |

CORRELATE "F" SUBSYSTEM CLOCK SEQUENCE ("CF")

| | |
|---|---|
| CF-1 | Gate Register No. 1 to correlate unit as La<br>→ CF-2 |
| CF-2 | Gate Register No. 2 to correlate unit as Lb<br>→ CF-3 |
| CF-3 | Gate Register No. 1 to subtractor as minuend<br>Gate Disp. to subtractor as subtrahend<br>Gate Subtractor to correlate unit as OV<br>→ CF-4 |
| CF-4 | Gate CTR.J to MAR<br>→ CF-5 |
| CF-5 | Read Memory<br>Increment CTR.J<br>→ CF-6 |
| CF-6 | Gate Register No. 2 to adder<br>Gate Disp. to adder<br>Gate Adder to Register No. 3<br>→ CF-7 |
| CF-7 | Gate Register No. 1 to Multiplier<br>Gate MDR to Multiplier<br>Gate Multiplier to Register No. 4<br>→ CF-8 |
| CF-8 | Gate Register No. 3 to Divider as Divisor<br>Gate Register No. 4 to Divider as Dividend<br>Gate Divider to correlate unit as Ma<br>→ CF-9 |
| CF-9 | Gate CTR.K to MAR<br>→ CF-10 |
| CF-10 | Read<br>Increment CTR.K<br>→ CF-11 |
| CF-11 | Gate Register No. 2 to Multiplier<br>Gate MDR to Multiplier<br>Gate Multiplier to Register No. 4<br>→ CF-12 |
| CF-12 | Gate Register No. 3 to Divider as Divisor<br>Gate Register No. 4 to Divider as Dividend<br>Gate Divider to correlate unit as Mb<br>→ CF-13 |
| CF-13 | Gate CTR.E(ST) to CTR.G<br>→ CF-14 |
| CF-14 | Gate CTR.D(ST) to adder<br>Gate Register No. 1 to adder<br>Gate Adder to CTR.F(LIM)<br>→ CF-15 |
| CF-15 | Gate CTR.D(ST) to adder<br>Gate Disp. to adder |

| CORRELATE "F" SUBSYSTEM CLOCK SEQUENCE ("CF") | |
|---|---|
| | Gate Adder to CTR.F<br>→ CF-16 |
| CF-16 | Gate CTR.F to MAR<br>→ CF-17 |
| CF-17 | Read Memory<br>→ CF-18 |
| CF-18 | Gate MDR to correlate unit as "a"<br>→ CF-19 |
| CF-19 | Gate CTR.G to MAR<br>→ CF-20 |
| CF-20 | Read Memory<br>→ CF-21 |
| CF-21 | Gate MDR to correlate unit as "b"<br>→ CF-22 |
| CF-22 | Give Σ command to correlate unit<br>→ CF-23 |
| CF-23 | Increment CTR F<br>Increment CTR G<br>→ CF-24 |
| CF-24 | Is CTR. F > CTR.F(LIM)?<br>If no → CF-16<br>If yes → CSR-37 |

| CORRELATE "G" SUBSYSTEM CLOCK SEQUENCE "CG" | |
|---|---|
| CG-1 | Gate Register No. 2 to correlate unit as La<br>→ CG-2 |
| CG-2 | Gate Register No. 1 to correlate unit as Lb<br>→ CG-3 |
| CG-3 | Gate Register No. 1 to subtractor as minuend<br>Gate Disp. to subtractor as subtrahend<br>Gate Subtractor to correlate unit as OV<br>→ CG-4 |
| CG-4 | Gate CTR. K to MAR<br>→ CG-5 |
| CG-5 | Read Memory<br>Increment CTR. K<br>→ CG-6 |
| CG-6 | Gate Register No. 2 to adder<br>Gate Disp. to adder<br>Gate Adder to Register No. 3<br>→ CG-7 |
| CG-7 | Gate Register No. 2 to Multiplier<br>Gate MDR to Multiplier<br>Gate Multiplier to Register No. 4<br>→ CG-8 |
| CG-8 | Gate Register No. 3 to Divider as Divisor<br>Gate Register No. 4 to Divider as Dividend<br>Gate Divider to correlate unit as Ma<br>→ CG-9 |
| CG-9 | Gate CTR. J to MAR<br>→ CG-10 |
| CG-10 | Read Memory<br>Increment CTR. J<br>→ CG-11 |
| CG-11 | Gate Register No. 1 to Multiplier<br>Gate MDR to Multiplier<br>Gate Multiplier to Register No. 4<br>→ CG-12 |
| CG-12 | Gate Register No. 3 to Divider as Divisor<br>Gate Register No. 4 to Divider as Dividend<br>Gate Divider to correlate unit as Mb<br>→ CG-13 |
| CG-13 | Gate CTR.E(ST) to CTR.G<br>→ CG-14 |
| CG-14 | Gate CTR.D(ST) to adder<br>Gate Register No. 1 to adder<br>Gate Adder to CTR.F(LIM)<br>→ CG-15 |
| CG-15 | Gate CTR.D(ST) to adder<br>Gate Disp. to adder<br>Gate Adder to CTR. F<br>→ CG-16 |
| CG-16 | Gate CTR. G to MAR<br>→ CG-17 |
| CG-17 | Read Memory<br>→ CG-18 |
| CG-18 | Gate MDR to correlate unit as "a"<br>→ CG-19 |
| CG-19 | Gate CTR. F to MAR<br>→ CG-20 |
| CG-20 | Read Memory<br>→ CG-21 |
| CG-21 | Gate MRD to correlate unit as "b"<br>→ CG-22 |
| CG-22 | Give Σ command to correlate unit<br>→ CG-23 |

| CORRELATE "G" SUBSYSTEM CLOCK SEQUENCE "CG" | |
|---|---|
| CG-23 | Increment CTR. F<br>Increment CTR. G<br>→ CG-24 |
| CG-24 | Is CTR. F > CTR.F(LIM)?<br>If no → CG-16<br>If yes → CSR-37 |

| CORRELATE "H" SUBSYSTEM CLOCK SEQUENCE ("CH") | |
|---|---|
| CH-1 | Gate Register No. 1 to correlate unit as La<br>→ CH-2 |
| CH-2 | Gate Register No. 2 to correlate unit as Lb<br>→ CH-3 |
| CH-3 | Gate Register No. 2 to subtractor as minuend<br>Gate Disp. to subtractor as subtrahend<br>Gate Subtractor to correlate unit as OV<br>→ CH-4 |
| CH-4 | Gate CTR.J to MAR<br>→ CH-5 |
| CH-5 | Read Memory<br>Increment CTR.J<br>→ CH-6 |
| CH-6 | Gate Register No. 1 to adder<br>Gate Disp. to adder<br>Gate Adder to Register No. 3<br>→ CH-7 |
| CH-7 | Gate Register No. 1 to Multiplier<br>Gate MDR to Multiplier<br>Gate Multiplier to Register No. 4<br>→ CH-8 |
| CH-8 | Gate Register No. 3 to Divider as Divisor<br>Gate Register No. 4 to Divider as Dividend<br>Gate Divider to correlate unit as Ma<br>→ CH-9 |
| CH-9 | Gate CTR.K to MAR<br>→ CH-10 |
| CH-10 | Read Memory<br>Increment CTR K<br>→ CH-11 |
| CH-11 | Gate Register No. 2 to Multiplier<br>Gate MDR to Multiplier<br>Gate Multiplier to Register No. 4<br>→ CH-12 |
| CH-12 | Gate Register No. 3 to Divider as Divisor<br>Gate Register No. 4 to Divider as Dividend<br>Gate Divider to correlate unit as Mb<br>→ CH-13 |
| CH-13 | Gate CTR.D(ST) to CTR.F<br>→ CH-14 |
| CH-14 | Gate CTR.E(ST) to adder<br>Gate Register No. 2 to adder<br>Gate Adder to CTR.G(LIM)<br>→ CH-15 |
| CH-15 | Gate CTR.E(ST) to adder<br>Gate Disp. to adder<br>Gate Adder to CTR<br>→ CH-16 |
| CH-16 | Gate CTR. F to MAR<br>→ CH-17 |
| CH-17 | Read Memory<br>→ CH-18 |
| CH-18 | Gate MDR to correlate unit as "a"<br>→ CH-19 |
| CH-19 | Gate CTR. G to MAR<br>→ CH-20 |
| CH-20 | Read Memory<br>→ CH-21 |
| CH-21 | Gate MDR to correlate unit as "b"<br>→ CH-22 |
| CH-22 | Give Σ command to correlate unit<br>→ CH-23 |
| CH-23 | Increment CTR. F<br>Increment CTR. G<br>→ CH-24 |
| CH-24 | Is CTR. G > CTR. G (LIM)?<br>If no → CH-16<br>If yes → CSR-37 |

CONCLUSIONS

From the preceding detailed description of the operation of the presently disclosed preferred embodiment of the invention which is capable of performing a signature verification function, it will be apparent that the present system requires a great deal of highly complex and specialized hardware for performing very specific tasks in accordance with the requirements of the invention. However, it will be recognized that in any such large system an experienced system designer can materially change the appearance of the hardware while performing essentially the same function.

It should be clearly understood that signature dynamics form the basis of the present handwriting verification system and in particular the utilization of acceleration components is the basis of the verification technique. Even more particularly, the muscle force durations of the person's hand during the signature writing process is measured and compared as a function of the time durations between zero crossings of the acceleration curve as represented by a periodic sampling of a person's signature during said rating process. It should be clearly understood however that the actual physical manifestation which it is desired to measure are the muscle force durations. At this time, measuring zero crossings of the acceleration curve has been found to be the best way of achieving this goal.

It should be reiterated that even though one has decided to attempt to compare such zero crossings, it is by no means a simple matter to effectively compare patterns of two signatures due to the many normal variations that can occur. In other words, there may be difficulty in obtaining the exact registration of two signatures. The presently disclosed concept of segmentizing the sample and reference signals, and then doing the comparison (correlation) over a range of displacements, penalizing results based on the amount of the displacement and finally selecting the maximum value is a highly novel concept. This analysis approach is novel and is believed to be the only practical, accurate handwriting analysis system to be produced within the present state of the art. It should of course be clearly understood as stated in the general description of the various subsystems that the specific amount of shifting, i.e., 25 percent, are only exemplary and many other figures could be utilized without departing from the spirit and scope of the invention.

Although the displacement and subsequent shifting have been described as beginning at one maximum value and proceeding to the opposite maximum value, it will be apparent that the correlation calculation would begin at zero and proceed to the aforesaid maxima in various possible sequences.

Also, the particular segmentation scheme utilized in the present embodiment based on pen lifts is currently thought to be the best way of approaching the segmentation problem because it provides the best matching criteria. However, it is quite possible for segmentation to be done on a straight division basis, i.e., dividing the total number of sampling points for a given signature into a fixed number of uniform segments (e.g. 3, 5, or some other convenient integer.) Due to the strong random component of pen lifts, some means of reconciling different pen lift patterns must be employed. This embodiment uses a scheme based on adding additional pen lifts. It would be equally practical to subtract them, or combinations and variations of these ideas could also be made to work.

It should also be understood that some of the statistical approaches to doing the cross-correlation operations themselves could also vary somewhat, using coarser approximations for example, especially in the areas of computation of the M and M* values and the specific way they are utilized in the correlation formulas. It should also be noted that while the present invention essentially resides in providing the basic overall correlation total for a given segment against a reference signature, that further mathematical operations can be performed on the correlation output based on the various factors, to arrive at a final result.

To make the final decision on acceptance of a putative signature, the cross-correlation results for the various segments must be combined. This particular branch of mathematics, statistical decision theory, is well understood.

If the result vector is $$C = (C_1, C_2, \ldots C_k),$$

consisting of the segment cross-correlations, and the reference lengths are $$N = (N_1, \ldots, N_k)$$

which assumes each part of the signature to be equally important. One approach is to compute the geometric mean of the correlations:

$$\log V = \sum_{i=1}^{N} \frac{N_i}{N_{tot}} \log|C_i|$$

where $$N_{tot} = \sum_{i=1}^{N} N_i$$

The quantity V may then be compared to a threshold chosen during the analysis phase for that individual. The rule for setting the threshold may be varied according to the cost of accepting a forger versus the cost of rejecting a true signer.

Variations on these basic rules will occur at once to those skilled in the art, e.g., terms contributed by segments with small $N_i$ can be neglected, one or more low scores can be forgiven for very long signatures, the weighting based on segment length could be more or less severe, and the formula could be changed to use an arithmetic mean rather than a geometric.

It should again be remembered that the particular input device, i.e., an analog tablet providing $x$ and $y$ coordinate analog displacement signals, together with pen lifts, could readily be replaced by devices capable of giving acceleration read-outs directly.

While the present preferred embodiment utilizes vertical acceleration components (in the plane of the writing surface) only, it should be understood that $x$ acceleration components would be used or at least factored into the final result. In other words separate correlators could be done in both coordinates and the results combined in a final conclusion. Further, especially with a direct reading accelerometer equipped writing implement the acceleration coordinates could be those of the hand rather than the surface on which the signature is written without adversely affecting the system performance.

A number of additional features may also be readily incorporated in the system to improve accuracy or stated differently, automatically remove certain candidates for comparison which are considered to drastically fail in the comparison operation. Two examples of these might be a total signature time comparison between the sample and the reference whereby if the variation between the two exceeded a certain amount, there would be an automatic non-comparison or non-authorization signal.

Similarly, the number of pen lifts between a sample and a reference signature might be compared so that, if the number exceeded some predetermined checkpoint, such as five, it could be reasonably determined that the two people writing the sample and reference signature were different.

Two tests such as these would, of course, be coarse front-end tests which would catch obvious forgeries causing a non-match signal to be given before any cross-correlation operations were begun.

As will be apparent from the previous discussion, any departures from the disclosed mathematic operations carried out in performing the actual cross-correlation computations would necessitate changes in the logical and computational circuitry as well as in the control circuits performing same. However, in most instances, these changes would be quite obvious especially in the light of the presently disclosed operation and design concepts.

Thus, while the invention has been specifically set forth and described with respect to the specifically disclosed embodiment, it will be readily understood that many departures in the specific design and operation of the system other than those set forth above could readily be made by one skilled in the art without departing from the essential features of the invention.

What is claimed is:

1. A method of signature verification which comprises producing and storing a first signal set comprising a plurality of electrical signals representative of the acceleration forces transmitted by a signer's hand to a writing instrument during the writing on a writing surface of at least one signature by a known person, producing and storing a similar second set of electrical signals by a putative signer at a different time, segmenting said two signal sets for both the known and putative signatures to facilitate identifying regions of high probable correlation, individually correlating similar regions in said two sets of acceleration representative signals, combining the correlation results obtained for said regions and utilizing this combined correlation value to produce a resultant correlation level valve.

2. A signature verification method as set forth in claim 1, wherein the step of segmenting to establish regions of high probable correlation comprises utilizing contact intervals of the writing instrument on the writing surface during the signature process to divide the signals into regions.

3. A signature verification method as set forth in claim 1, including performing successive correlation on each set of similar regions in said known and putative signatures wherein the electrical signals representing said regions are displaced with respect to each other a predetermined amount prior to performing each correlation, performing each correlation only in overlapped areas of said regions, performing a plurality of correlations with different displacement values and maintaining a running account of the maximum correlation value obtained with each displacement value and selecting the maximum value obtained as the best correlation possible for each of said set of similar regions and utilizing said best correlation to obtain a final correlation value for the two signatures.

4. A signature verification method as set forth in claim 1, wherein the producing of said two sets of signals representative of muscle force durations comprises periodically obtaining acceleration components of the writing instrument during the writing of said known and putative signatures, whereby the interval between zero crossings of the functions approximated by said acceleration components is representative of said muscle force durations.

5. A signature verification method as set forth in claim 1, including the step of obtaining said acceleration components in the coordinates of the writing instrument.

6. A signature verification method as set forth in claim 4, wherein said acceleration components are taken in the coordinates of the writing surface.

7. A method of signature verification which comprises producing and storing a first signal set comprising a plurality of electrical signals representing acceleration data taken at predetermined intervals from a writing instrument motion produced by a known signer's hand and transmitted to said writing instrument during the writing of a signature, producing and storing a similar second set of electrical signals representing such acceleration data produced by a putative signer, comparing the electrical signals of said first and second sets by cross-correlation techniques to determine the extent of correlation between the two sets of acceleration representative signals, said comparing step including successively displacing said first and second signal sets and comparing said signals at a plurality of relative displacements, selecting the maximum correlation value obtained, determining a final correlation value including weighting regions of high and low correlation based on the degree of displacement and comparing said final correlation value to a predetermined correlation level to determine if the final correlation value indicated that the putative signature is valid.

8. A method for verifying signatures as set forth in claim 5, including the step of correlating said two sets of signals at each of the sampled acceleration intervals, and further including the steps of segmenting both of said sets of signals into subsets whereby each set has the same number of subsets of substantially the same size, and performing the correlation on individual pairs of said subsets and combining all of said subset correlation values into a final single correlation value for the two sets.

9. A signature verification method as set forth in claim 8, including for each pair of subsets the steps of displacing the two subset members of each pair a predetermined amount with respect to each other prior to performing the correlation step, performing the correlation step over only overlapped areas of said two displaced subsets and successively changing the displacement a predetermined amount until all displacements between a predetermined positive and negative displacement have been considered, accumulating the correlation values for each displacement condition and selecting the maximum correlation value obtained during the range of displacements and correlations as the best correlation possible for that subset pair.

10. A signature verification system comprising means for periodically sampling and storing the acceleration component values imparted to a writing instrument on a writing surface during the writing of a known and a putative signature as first and second signal sets respectively, means for accessing said acceleration representative signal sets and for performing a cross-correlation analysis thereon for said known and putative signatures, said last-named means including means for locating and computing the correlation values for areas of high probable correlation, and means for giving a predetermined weighting to said high probable correlation values and for totalizing same into a total correlation value for said two signatures.

11. A signature verification system as set forth in claim 10, including means for segmenting the signal sets representing the stored acceleration components for the known and putative signatures so that each signal set comprises an equal number of segments of approximately the same length and wherein said means for performing the stepwise cross-correlation analysis includes means for sequentially accessing and performing said cross-correlation analyses on successive segment pairs from said two signals sets.

12. A signature verification system as set forth in claim 11, wherein said means for segmenting said signal sets includes means for detecting when the writing instrument is raised from the writing surface during the writing of a signature.

13. A signature verification system as set forth in claim 12, including means operative to cause each member of a segment pair to be successively displaced with respect to each other, means providing that only overlapped portions of each segment pair are made available to the cross-correlation analysis means and means for determining the maximum cross-correlation value obtained for successive cross-correlations of a given pair and further means for saving this value and utilizing same in a final summation of cross-correlation values for all segments of the two signatures.

14. A signature verification system as set forth in claim 13, including means for quantizing the acceleration component values including means for determining the maximum acceleration value sampled in a given signal set representing the acceleration components, means for determining the quantitative relationship of each and every member of the set with respect to a predetermined portion of said maximum value and means for assigning a predetermined fixed magnitude signal to replace the original signal in accordance with said determination.

15. A signature verification system as set forth in claim 14, including means for determining a resultant dc level (M) for each segment including means for summing all of the individually sampled acceleration component values making up said segment and means for dividing this quantity by the number of members in said segment.

16. A signature verification system as set forth in claim 15, including means for adjusting the dc level (M) to a new level (M*) to properly reflect the effective dc level depending upon the boundary conditions (overlap) existing during a particular correlation computation.

17. A signature verification system as set forth in claim 16, including means for computing the overlap (OV) present with a given boundary condition to be utilized in a particular correlation calculation, means for computing the total length of the known or reference signature segment, means for computing the total length of the unknown or sample signature segment, means for computing the adjusted dc levels ($M^*_a$, $M^*_b$) for both the known and unknown signature segments with a given boundary condition, and means for sequentially accessing the actual acceleration component values comprising the two signal sets stored in memory for said known and unknown signature segments.

18. A signature verification system as set forth in claim 17, including means for selectively actuating a plurality of subsystems in accordance with a particular boundary condition and displacement present for a particular segment pair being currently considered the means for actuating said plurality of subsystems including means for testing which member of the signature segment pair is the longer and whether the current displacement condition being considered is positive, negative or zero, the result of said determination being operative to actuate a particular boundary condition subsystem.

19. A signature verification system as set forth in claim 17, wherein said means for performing said cross-correlation analysis includes computational means for computing the individual correlation values, $c_{ab}(k)$, for each condition of displacement as expressed by $$c_{ab}(k) = \frac{1}{L} \sum_i (a_i - M_a)(b_{i-k} - M_b). \quad (1)$$

selecting the maximum correlation value, $C_{ab}$, obtained for each segment after all conditions of displacement have been considered and finally computing a final correlation value:

$$C_{ab} = \frac{\max_k c_{ab}(k)}{\sqrt{c_{aa}(0) c_{bb}(0)}} \quad (2)$$

wherein
k is the shift variable (displacement)
where:
$a_i$ = ith acceleration member of longer segment,
$b_i$ = ith acceleration member of shorter segment,
$L_a$ = length of longer segment,
$L_b$ = length of shorter segment,
$L = L_a + L_b - OV$,
whereby the final correlation function has been adjusted to penalize individual segment correlation results for partial overlap of the segments due to the boundary condition for a particular computation.

20. A signature verification as set forth in claim 19, wherein said system includes means for accepting periodically obtained displacement data from said writing instrument and means for computing acceleration data from said displacement data utilizing a predetermined time interval between said sampling points.

21. A signature verification system comprising means for periodically sampling and storing the acceleration component values imparted to a writing instrument during the writing of a known signature as a first signal set and a putative signature as a second signal set respectively, means for segmenting the signal sets representing said stored acceleration component values for the known and putative signatures so that each signal set comprises an equal number of segments of approximately the same length, means for accessing said acceleration component value data and for performing a cross-correlation analysis on said two signal sets representing said known and putative signatures including means for sequentially accessing and performing said cross-correlation analyses on successive segment pairs from said two signal sets, further means operative to cause the two signal sets comprising a segment pair to be successively displaced with respect to each other and means operative to cross correlate only the overlapped portions of said segments, means for determining the maximum cross-correlation value obtained for the successive cross-correlations of a given segment pair, means for weighting said maximum cross-correlation value including means for determining the dc level ($M_a$, $M_b$) for each segment including means for summing all of the individually sampled acceleration component values making up said segment and means for dividing this quantity by the number of individual signals in said segment and further means for computing an adjusted dc level ($M^*_a$, $M^*_b$) to properly reflect the effective dc level depending upon the boundary conditions for a particular correlation computation, said means performing the function $$M^*_a = M_a \cdot OV/L_a;$$

$$M^*_b = M_b \cdot OV/L_b$$

where: $L_a$ and $L_b$ equal the length of the two segments respectively, and OV equals the number of signal values which overlap during a particular boundary condition, and means for accumulating successive maximum cross-correlation values and for combining same to produce a resultant cross-correlation value for all segments of said two signal sets.

22. A signature verification system as set forth in claim 21, including means for accessing consecutive acceleration component signal values comprising said two signal sets beginning with the first value representing the overlapped portion of said two segments and terminating at the final value representing said overlapped portions.

23. A signature verification system as set forth in claim 22, wherein said means for segmenting said two signals sets includes means for detecting proximity of the writing instrument to the writing surface for said two signatures and utilizing said proximity detections as segment pointers in said stored signal sets, said pointers for each set being stored as two pointer lists.

24. A signature verification system as set forth in claim 23, wherein said means for segmenting said two signals sets includes means for detecting when the writing instrument is in contact with the writing surface.

25. A signature verification system as set forth in claim 22, wherein said means for segmenting said two signal sets includes means for dividing each signal set into the same number of segments of approximately equal length.

26. A signature verification system as set forth in claim 23, including means for automatically causing said two signal sets to be divided into an equal number of segments which comprises means for examining the segment pointers for each signal set in a stepwise fashion, and means for determining if any pair of pointers are displaced by more than a predetermined distance, means operative upon such a determination to automatically insert a pointer in a pointer list for that signal set whose pointer had the larger value, and means for successively accessing said pointer pairs in performing said displacement test and making required pointer insertions until at least all of the pointers in the shorter of said two pointer lists has been accessed.

27. A signature verification system as set forth in claim 23, where said means for performing said cross-correlation analysis includes computational means for computing the individual correlation values for each condition of displacement as expressed by $$c_{ab}(k) = \frac{1}{L} \sum_i (a_i - M_a)(b_{i+k} - M_b)$$

selecting the maximum correlation value obtained for each segment after all conditions of displacement have been considered and finally computing a final correlation value:

$$C_{ab} = \frac{\max_k c_{ab}(k)}{\sqrt{c_{aa}(0) c_{bb}(0)}}$$

wherein:
 $a_i$ is the ith acceleration component value of the longer segment,
 $b_i$ is the ith acceleration component value of the shorter segment,
wherein
 k is the shift variable (displacement),
where
 $L = L_a + L_b - OV$, whereby the final correlation function has been adjusted to penalize individual segment correlation results for partial overlap of the segments due to the predetermined boundary condition existing for a particular computation.

28. A signature verification system as set forth in claim 21, including means for quantizing the individual acceleration values comprising said two signal sets which comprises comparing each value in a given signal set against a reference value, and means for automatically assigning a fixed predetermined magnitude to the signal if said signal is greater than the reference signal, the sign being determined by the sign of the reference signal and for assigning a value of zero if the test signal is less than the reference value regardless of sign.

29. A signature verification system as set forth in claim 28, including means for determining the maximum value of any of the members of a given signal set and means for assigning a reference value for said quantizing determination as a predetermined function of said maximum value detected.

30. A signature verification system as set forth in claim 27, including means for specifically determining the boundary conditions existing between a particular segment pair prior to performing the cross-correlation computation, and means for branching to one of a plurality of subsystem operations depending upon the particular boundary condition which is found to exist with a given segment displacement, each of said subsystems being operative to compute the overlap value (OV), and the adjusted dc level values ($M^*_a$, $M^*_b$) relevant to the particular boundary condition which caused said subsystem to become operative, said subsystem further including means for automatically computing the beginning and end addresses for each segment depending upon the particular boundary condition existing whereby only the overlapped portions of the segment are gated from the storage means and transferred to the correlation means.

* * * * *